(12) United States Patent
Ji et al.

(10) Patent No.: US 11,676,756 B2
(45) Date of Patent: Jun. 13, 2023

(54) COUPLED INDUCTOR AND POWER SUPPLY MODULE

(71) Applicant: Delta Electronics (Shanghai) Co., Ltd., Shanghai (CN)

(72) Inventors: Pengkai Ji, Shanghai (CN); Jinping Zhou, Shanghai (CN); Shouyu Hong, Shanghai (CN); Jianhong Zeng, Shanghai (CN); Mingzhun Zhang, Shanghai (CN); Min Zhou, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 602 days.

(21) Appl. No.: 16/735,723

(22) Filed: Jan. 7, 2020

(65) Prior Publication Data

US 2020/0219648 A1 Jul. 9, 2020

(30) Foreign Application Priority Data

Jan. 7, 2019 (CN) .......................... 201910013070.3
Aug. 27, 2019 (CN) .......................... 201910796711.7

(51) Int. Cl.
*H01F 27/28* (2006.01)
*H01F 27/30* (2006.01)
(Continued)

(52) U.S. Cl.
CPC ............. *H01F 27/306* (2013.01); *G05F 1/30* (2013.01); *H01F 3/08* (2013.01); *H01F 3/14* (2013.01);
(Continued)

(58) Field of Classification Search
CPC . H01F 27/306; H01F 3/08; H01F 3/14; H01F 5/06; H01F 17/04; H01F 27/266;
(Continued)

(56) References Cited

U.S. PATENT DOCUMENTS 5,111,278 A    5/1992  Eichelberger
5,568,111 A *  10/1996 Metsler ................. H01F 17/04
                                                 336/83

(Continued)

FOREIGN PATENT DOCUMENTS

CN    1637969 A    7/2005
CN    1921035 A    2/2007
(Continued)

OTHER PUBLICATIONS

Corresponding India office action dated Aug. 31, 2021.
(Continued)

*Primary Examiner* — Mang Tin Bik Lian
(74) *Attorney, Agent, or Firm* — CKC & Partners Co., LLC

(57) ABSTRACT

Provided are a coupled inductor and a power module including the coupled inductor. A coupled inductor includes: a magnetic core, a first winding and a second winding, where a first passage is formed in the magnetic core; a part of the first winding and a part of the second winding pass through the first passage, and the first winding crosses with the second winding outside the first passage. Another coupled inductor includes: a magnetic core, a first winding and a second winding, where the magnetic core has a first passage and a second passage in parallel, both run through the magnetic core from one end face thereof to another opposite end face, where the first winding and the second winding both penetrate the first passage and the second passage, such that differently-named terminals of the windings are located on the same end face of the magnetic core.

20 Claims, 41 Drawing Sheets

(51) Int. Cl.
*H01F 27/26* (2006.01)
*H01F 27/32* (2006.01)
*H01F 17/04* (2006.01)
*H01F 27/29* (2006.01)
*H01F 3/08* (2006.01)
*G05F 1/30* (2006.01)
*H02M 3/158* (2006.01)
*H01F 5/06* (2006.01)
*H01F 3/14* (2006.01)

(52) U.S. Cl.
CPC .............. *H01F 5/06* (2013.01); *H01F 17/04* (2013.01); *H01F 27/266* (2013.01); *H01F 27/29* (2013.01); *H01F 27/324* (2013.01); *H02M 3/158* (2013.01); *H01F 2017/048* (2013.01)

(58) Field of Classification Search
CPC .. H01F 27/29; H01F 27/324; H01F 2017/048; H01F 27/255; H01F 27/303; H01F 27/28; H01F 27/2847; G05F 1/30; H02M 3/158; H02M 1/0064; H02M 1/009; H02M 3/1582; H02M 3/1584
See application file for complete search history.

(56) References Cited

U.S. PATENT DOCUMENTS

| | | | |
|---|---|---|---|
| 5,939,966 | A | 8/1999 | Shin' Ei |
| 6,627,984 | B2 | 9/2003 | Bruce |
| 6,806,580 | B2 | 10/2004 | Joshi et al. |
| 7,173,333 | B2 | 2/2007 | Hata et al. |
| 7,525,406 | B1 | 4/2009 | Cheng |
| 7,898,379 | B1 | 3/2011 | Stratakos et al. |
| 8,736,040 | B2 | 5/2014 | Hauenstein et al. |
| 2001/0007287 | A1 | 7/2001 | Hoche |
| 2005/0161785 | A1 | 7/2005 | Kawashima et al. |
| 2006/0232942 | A1 | 10/2006 | Nakatsu et al. |
| 2011/0127678 | A1 | 6/2011 | Shim et al. |
| 2011/0148560 | A1* | 6/2011 | Ikriannikov .......... H01F 27/306 336/192 |
| 2011/0279212 | A1 | 11/2011 | Ikriannikov et al. |
| 2012/0014059 | A1 | 1/2012 | Zeng et al. |
| 2012/0161128 | A1 | 6/2012 | Macheiner et al. |
| 2013/0049137 | A1 | 2/2013 | Uno et al. |
| 2013/0094269 | A1 | 4/2013 | Maeda et al. |
| 2014/0266552 | A1 | 9/2014 | Silva et al. |
| 2015/0055306 | A1 | 2/2015 | Burns et al. |
| 2015/0235753 | A1* | 8/2015 | Chatani .............. H01F 17/0033 336/200 |
| 2016/0020013 | A1 | 1/2016 | Berdy et al. |
| 2016/0307690 | A1* | 10/2016 | Madsen ................ H01F 19/00 |
| 2017/0064808 | A1 | 3/2017 | Rizza et al. |
| 2017/0178794 | A1* | 6/2017 | Yan ...................... H01F 41/02 |
| 2018/0102349 | A1 | 4/2018 | Cho |
| 2018/0182945 | A1 | 6/2018 | Shimabukuro |
| 2018/0204741 | A1 | 7/2018 | Chew et al. |
| 2018/0323147 | A1* | 11/2018 | Kirby ................ H01F 17/0033 |
| 2019/0108939 | A1 | 4/2019 | Fujimoto et al. |
| 2019/0189334 | A1* | 6/2019 | Miyashita ................ H05K 1/18 |
| 2019/0214181 | A1* | 7/2019 | Wang ........................ H01F 3/14 |
| 2019/0385775 | A1* | 12/2019 | Roth ..................... H01L 23/645 |

FOREIGN PATENT DOCUMENTS

| | | |
|---|---|---|
| CN | 101038880 A | 9/2007 |
| CN | 101197205 A | 6/2008 |
| CN | 101330075 A | 12/2008 |
| CN | 101378049 A | 3/2009 |
| CN | 101414602 A | 4/2009 |
| CN | 101483381 A | 7/2009 |
| CN | 101615612 A | 12/2009 |
| CN | 201532825 U | 7/2010 |
| CN | 102369790 A | 3/2012 |
| CN | 103081325 A | 5/2013 |
| CN | 103298258 A | 9/2013 |
| CN | 103681535 A | 3/2014 |
| CN | 103730434 A | 4/2014 |
| CN | 103887292 A | 6/2014 |
| CN | 104051363 A | 9/2014 |
| CN | 105575943 A | 5/2016 |
| CN | 105679738 A | 6/2016 |
| CN | 105914185 A | 8/2016 |
| CN | 205752461 U | 11/2016 |
| CN | 107006118 A | 8/2017 |
| CN | 107086212 A | 8/2017 |
| CN | 107452481 A | 12/2017 |
| CN | 107919350 A | 4/2018 |
| CN | 108231607 A | 6/2018 |
| CN | 108492965 A | 9/2018 |
| CN | 108962773 A | 12/2018 |
| EP | 1168384 A1 | 1/2002 |
| EP | 2482312 A2 | 8/2012 |
| JP | H11340085 A | 12/1999 |
| JP | 2007171159 A | 7/2007 |
| JP | 2009225612 A | 10/2009 |
| JP | 2012152104 A | 8/2012 |
| TW | 201537722 A | 10/2015 |
| TW | 201837934 A | 10/2018 |
| WO | 2008139393 A1 | 11/2008 |
| WO | 2018043318 A1 | 3/2018 |
| WO | 2018190075 A1 | 10/2018 |

OTHER PUBLICATIONS

Corresponding India office action dated Oct. 25, 2021.
Corresponding India office action dated Apr. 7, 2021.
Corresponding China office action dated May 24, 2021.
Corresponding China Office Action dated Mar. 17, 2022 with its English translation.
Corresponding China Office Action dated Mar. 21, 2022 with its English translation.
Corresponding China Notice of Allowance dated Jan. 20, 2022.
Corresponding U.S. office action dated Mar. 19, 2021.
Corresponding China office action dated May 31, 2021.
Corresponding China office action dated Jun. 3, 2021.
Corresponding China office action dated Nov. 3, 2022.
Corresponding China Notice of Allowance dated Nov. 14, 2022.
Corresponding U.S. office action dated Sep. 12, 2022.

* cited by examiner

Buck circuit

Boost Circuit

Buck/Boost Circuit

COUPLED INDUCTOR AND POWER SUPPLY MODULE

CROSS-REFERENCE TO RELATED APPLICATION

This application claims priority to Chinese Patent Application No. 201910013070.3, filed on Jan. 7, 2019, and Chinese Patent Application No. 201910796711.7, filed on Aug. 27, 2019. All of the aforementioned patent applications are hereby incorporated by reference in their entireties.

TECHNICAL FIELD

The present disclosure relates to a coupled inductor and a power module, and belongs to the technical field of power electronics.

BACKGROUND

The inductor is a common electronic element in an integrated circuit that converts electrical energy into magnetic energy for storage. For instance, the inductor is an important component in a power supply module (i.e., a voltage regulating module (VRM), or a voltage converter) for realizing transformation between high voltage and low voltage. However, operational characteristics, such as current ripple, efficiency and dynamic operating speed, etc., of the power supply modules are subject to features such as inductor size, loss, inductance, etc. In this industry, magnetically coupled coils are typically used in manufacturing a coupled inductor to reduce the size of the inductor, so as to improve the performance of the power supply module.

Each winding in a coupled inductor may be measured, when the other windings are open or non-powered, to obtain a fixed inductance, known as self-inductance. The self-inductance may be decomposed into two components, all magnetic flux that corresponds to one of the two components passes through cross sections of the other windings, and thus this component is coupled with all the other windings, and may be referred to as magnetizing inductance (Lm). Another component is in no way coupled with the other windings, and may be referred to as leakage inductance (LK). Typically, the magnetizing inductance is much larger than the leakage inductance. By manipulating a ratio between, and magnitudes of, the magnetizing inductance and the leakage inductance, a waveform and a magnitude of a current ripple corresponding to a winding can be changed.

When the coupled inductor is used in a power supply module, there can be two types of coupling, i.e., a type of direct coupling and a type of inverse coupling, based on a connection mode of the switching unit and the inductors. An inversely coupled inductor refers to a coupled inductor connected as such that a current enters two windings from differently-named terminals of the windings, e.g., from a dotted terminal of one winding and a non-dotted terminal of the other winding, and the magnetic fluxes generated by the two windings cancel out each other. When a current enters through two terminals into two windings, respectively, to create magnetic fluxes that enhance each other, the two terminals are referred to as same-named terminals, e.g., the dotted terminals of the two windings, or the non-dotted terminals of the two windings. Put in another way, when the magnetic fluxes thus created weaken each other, the two terminals are referred to as differently-named terminals.

In an application of the VRM (voltage regulating module), the inversely coupled inductor can realize separation of dynamic inductance from static inductance, so that the same inductor can achieve smaller inductance in a dynamic state to improve the response speed, as well as increased inductance in a static state to achieve a smaller ripple current, thereby combining both dynamic responsiveness and small static ripples. In addition, the size can be reduced by the magnetic integration and the cancellation effect from the flux reversal. Hence in VRM applications, the technology of inversely coupled inductors is a hot spot in researches.

In a power supply module where an inversely coupled inductor is used, the input terminals of the coupled inductor should be differently-named terminals, i.e., a dotted terminal and a non-dotted terminal. However, in the layout of the existing inversely coupled inductor, it is inevitably required that the two input terminals (one of which is a dotted terminal while the other is a non-dotted terminal) of the inversely coupled inductor are disposed on different sides of the inductor in order to make the two electric currents, which are provided in parallel in the passage formed by the magnetic core, be in different directions to achieve the reversal and the cancellation effect of the magnetic flux in the magnetic core. This leads to different path lengths after the two-phase circuit is connected to the main board, and thus the impedances of the two phases will also be different, which is disadvantageous in current equalization.

SUMMARY

The present disclosure provides an inversely coupled inductor and a power supply module to address the above or other potential problems of the prior art.

It is an objective of the present disclosure to provide a coupled inductor including: a magnetic core, a first winding and a second winding, where a first passage is formed in the magnetic core; a part of the first winding and a part of the second winding pass through the first passage, and the first winding crosses with the second winding outside the first passage.

In a coupled inductor as described above, the magnetic core includes two side legs and two pillars which are oppositely arranged, respectively; and the two pillars are arranged between, and perpendicular to, the two side legs, and the first passage is defined by the side legs and the pillars.

In a coupled inductor as described above, the first winding includes a first section and a second section, which are oppositely arranged, and a third section, which is positioned between, and electrically connected to, the first section and the second section; the second winding includes a fourth section and a fifth section, which are oppositely arranged, and a sixth section, which is positioned between, and electrically connected to, the fourth section and the fifth section; the first section and the fourth section penetrate the first passage; and the third section crosses with the sixth section outside the first passage.

In a coupled inductor as described above, an electric current flows through the first section of the first winding in a direction opposite to an electric current flowing through the fourth section of the second winding.

In a coupled inductor as described above, a second passage is further formed in the magnetic core along a first direction, where the second passage is located on a right side of, and is parallel with, the first passage; the second section and the fifth section penetrate the second passage; and the third section crosses with the sixth section outside the first passage and the second passage.

In a coupled inductor as described above, an electric current flows through the second section of the first winding in a direction opposite to an electric current flowing through the fifth section of the second winding.

In a coupled inductor as described above, the magnetic core includes two side legs and at least three pillars, where the first passage is a space formed by the two side legs and two adjacent ones of the pillars; and the second passage is a space formed by the two side legs and another two adjacent ones of the pillars.

In a coupled inductor as described above, a decoupling leg is formed on at least one of the pillars and extends towards another adjacent one of the pillars, the decoupling leg being perpendicular to the pillar and forming, together with the adjacent pillar or a decoupling leg on the adjacent pillar, an air gap for adjusting an inversely coupling coefficient.

In a coupled inductor as described above, the first section, the second section, and the third section are integrally formed into one piece, and/or the fourth section, the fifth section and the sixth section are integrally formed into one piece.

In a coupled inductor as described above, the third section and the sixth section are plates, and the sixth section is located above the third section; the sixth section is formed with a first bump electrically connected to the fourth section and a second bump electrically connected to the fifth section, or, the fourth section includes a first bump and the fifth section includes a second bump; and the third section is formed with a first escape groove for the first bump to pass through and a second escape groove for the second bump to pass through.

In a coupled inductor as described above, the sixth section is a plate, the sixth section is provided with a through hole, the third section is provided in the through hole, a direction of an electric current flowing through the sixth section intersects with a direction of an electric current flowing through the third section.

In a coupled inductor as described above, the third section and the sixth section are mutually insulated and form a unibody structure.

In a coupled inductor as described above, the first section and the second section of the first winding and the fourth section and the fifth section of the second winding are injection-molded with the magnetic core into a unibody structure.

In a coupled inductor as described above, the inversely coupling coefficient is adjusted by controlling a width of a gap between the first section and the fourth section, or by controlling a width of a gap between the second section and the fifth section.

In a coupled inductor as described above, filler for adjusting the inversely coupling coefficient is filled between the first section and the fourth section, or between the second section and the fifth section.

In a coupled inductor as described above, the coupled inductor further includes a plurality of pads for input/output currents, and the plurality of pads are provided on one side of the first passage.

In a coupled inductor as described above, the magnetic core includes two side legs and a plurality of pillars, and the first winding crosses with the second winding on one of the pillars.

In a coupled inductor as described above, the first winding crosses with the second winding on one side of the first passage, or the first winding crosses with the second winding on both sides of the first passage.

In a coupled inductor as described above, the third section of the first winding and the sixth section of the second winding are provided separately on two sides of the first passage, and a vertical projection on the second winding by the third section of the first winding crosses with the sixth section of the second winding.

In a coupled inductor as described above, the first winding and/or the second winding are primarily made from a material having composite electric conductivity and/or strength.

Still another aspect of the present disclosure provides a coupled inductor, including: a magnetic core, a first winding and a second winding, where: a first passage and a second passage, which extend along a first direction, are formed in the magnetic core; the first passage includes a first end face and a second end face, which are oppositely arranged; the second passage is arranged in parallel with the first passage, and extends from the first end face to the second end face; a portion of the first winding and a portion of the second winding penetrate the first passage and the second passage, respectively, where the first winding runs through the first passage for N times while the second winding runs through the first passage for N+1 times, and the second winding runs through the second passage for N times while the first winding runs through the second passage for N+1 times, where N is an integer greater than or equal to one; two terminals of the first winding are provided on the first end face and the second end face, respectively, accordingly forming a first terminal and a second terminal of the coupled inductor; two terminals of the second winding are provided on the first end face and the second end face, respectively, accordingly forming a third terminal and a fourth terminal of the coupled inductor, where one of the first terminal and the third terminal of the coupled inductor is a dotted terminal and the other one is a non-dotted terminal, and the first terminal and the third terminal are both provided on the first end face.

In a coupled inductor as described above, the first terminal to the fourth terminal of the coupled inductor include a first pad to a fourth pad for electrical connection.

In a coupled inductor as described above, the first direction is a height direction.

In a coupled inductor as described above, the magnetic core is a flat type magnetic core.

In a coupled inductor as described above, the portion of the first winding located in the first passage and the portion of the second winding located in the first passage are provided alternatively with each other, and the portion of the first winding located in the second passage and the portion of the second winding located in the second passage are provided alternatively with each other.

In a coupled inductor as described above, the first winding further includes a connecting portion for connecting the portions of the first winding that penetrate the first passage and the second passage, and the second winding further includes a connecting portion for connecting the portions of the second winding that penetrate the first passage and the second passage.

In a coupled inductor as described above, the connecting portion of the first winding is located on the same side as the first end face or the second end face of the magnetic core and is exposed to air, the connecting portion of the second winding is located on the same side as the first end face or the second end face of the magnetic core and is exposed to air.

In a coupled inductor as described above, the connecting portions of the first winding and the second winding which are located on the same side as the first end face are arranged in parallel, the connecting portions of the first winding and the second winding which are located on the same side as the second end face are arranged in parallel.

In a coupled inductor as described above, the connecting portion of the first winding on the same side as the first end face crosses with the connecting portion of the second winding on the same side as the second end face, the connecting portion of the first winding on the same side as the second end face crosses with the connecting portion of the second winding on the same side as the first end face.

In a coupled inductor as described above, the first passage and the second passage are both filled with a magnetic material which dads the portions of the first winding and the second winding that are located in the first passage and the second passage.

In a coupled inductor as described above, the portions of the first winding and the second winding that are located in the first passage and the second passage are both formed as cylinders.

In a coupled inductor as described above, the magnetic core is a dust type magnetic core that has a relative permeability of less than 200 and has distributed air gaps.

In a coupled inductor as described above, the magnetic core includes two side legs which are oppositely arranged, and at least three pillars arranged between the two side legs, and the first passage and the second passage are defined by the adjacent three pillars and the two side legs.

In a coupled inductor as described above, air gaps are formed in both of the two side legs to communicate with the first passage and the second passage.

In a coupled inductor as described above, the first passage and the second passage are both filled with a magnetic material, and the air gaps run through the magnetic material.

In a coupled inductor as described above, an air gap is formed in two pillars which are separated by one pillar, respectively, to communicate with the first passage and the second passage.

In a coupled inductor as described above, air gaps are formed in the pillar separating the two pillars, the air gaps communicating at two ends with the first passage and the second passage, respectively.

In a coupled inductor as described above, one of the side legs and a portion of the three pillars are integrally formed into an "E" shaped magnetic core.

In a coupled inductor as described above, the magnetic core is a ferrite type magnetic core having a relative permeability of greater than 200.

In a coupled inductor as described above, an outer surface of the magnetic core is provided with a pin for electrical connection.

In a coupled inductor as described above, the first winding and the second winding are fabricated by a printed circuit board (PCB) printing process.

In a coupled inductor as described above, the coupled inductor is a multi-phase coupled inductor.

An aspect of the disclosure provides a power supply module, including a first switching unit, a second switching unit and the coupled inductor as described above, where a first winding of the coupled inductor includes a first terminal and a second terminal, a second winding of the coupled inductor includes a third terminal and a fourth terminal, and one of the first terminal and the third terminal of the coupled inductor is a dotted terminal and the other one is a non-dotted terminal, the first terminal is connected to the first switching unit, the third terminal is connected to the second switching unit, the second terminal and the fourth terminal serve as outputs for the power supply module.

The power supply module as described above further includes: a main board, a packaged chip module and a heatsink, where the coupled inductor, the packaged chip module and the heatsink are stacked in the same order over the main board.

According to the coupled inductor and the power supply module provided in the present disclosure, two windings can intersect outside the first passage of the magnetic core, allowing for a dotted terminal and a non-dotted terminal of the input/output pins of the coupled inductor to be located on the same side, which is convenient to use and advantageous in current equalization. Additionally, a dotted terminal and a non-dotted terminal of the two windings may also be provided on the same end face of the inversely coupled inductor, so that no extra pin or connecting wire is needed when a power chip or a switching unit is located between the inversely coupled inductor and the heatsink, which is advantageous in reducing direct current impedance and improving space utilization.

Advantages of additional aspects of the present disclosure will be set forth in part in the description which follows, and some of the advantages will become apparent from the following descriptions, or be acquired in practicing the present disclosure.

BRIEF DESCRIPTION OF DRAWINGS

Referring to the following descriptions about the attached drawings, the above and other objectives, features and advantages of the embodiments of the present disclosure will become more comprehensible. In the drawings, various embodiments of the present disclosure will be described illustratively and non-restrictively, in which:

FIG. 32b is an exploded view of FIG. 32a;

FIG. 32c is a top view of FIG. 32a;

FIG. 32f illustrate an optional method for fabricating the coupled inductor of FIG. 32a;

FIG. 33b is an exploded view of FIG. 33a;

FIG. 33c is a top view of FIG. 33a;

FIG. 34b is an exploded view of FIG. 34a;

FIG. 34c is a sectional view along A-A' in FIG. 34a;

FIG. 35b is an exploded view of FIG. 35a;

FIG. 35c is a sectional view along A-A' in FIG. 35a;

FIG. 36b is a sectional view along A-A' in FIG. 36a;

FIG. 37b is an exploded view of FIG. 37a;

FIG. 37c illustrate an optional method for fabricating the coupled inductor of FIG. 37a;

FIG. 38b is a top view of FIG. 38a;

FIG. 39b is a schematic structural view of a semi-finished product of FIG. 39a;

FIG. 39c is a schematic structural view of a finished product of FIG. 39a;

DETAILED DESCRIPTION

Figure 1:
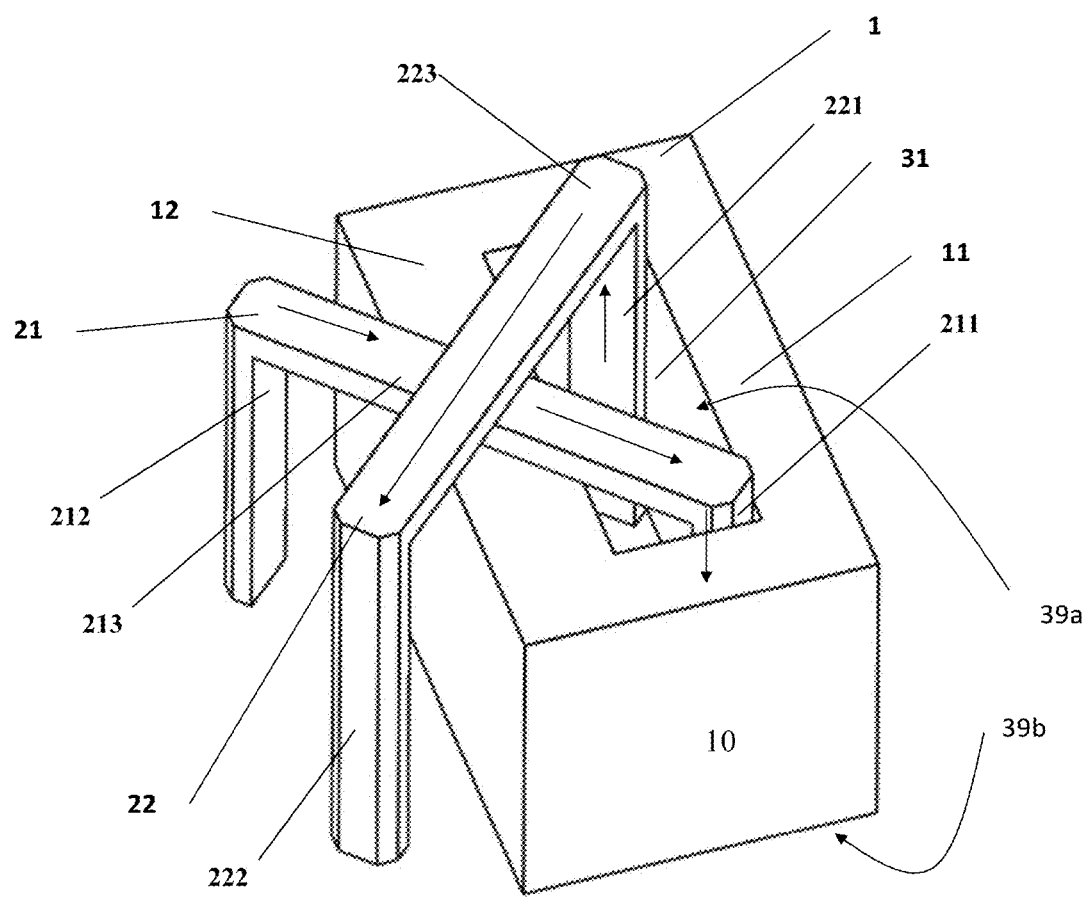
FIG. 1 is a schematic structural view of an inversely coupled inductor according to an embodiment of the present disclosure.

The embodiments of the present disclosure will be described in detail below, and examples of the embodiments are illustrated in the drawings, where the same or similar reference numerals throughout the specification are used to represent the same or similar elements, or elements having the same or similar functions. The embodiments described below with reference to the drawings are intended to be illustrative of the present disclosure, rather than to be construed as limiting.

In the description of the present disclosure, it is to be understood that the terms "upper", "lower", "front", "back", "left", "right", "vertical", "horizontal", "top", "bottom", "inside", "outside" and/or the like indicate orientations or positional relationships based on the orientations or positional relationships shown in the drawings for the mere purpose of facilitating and simplifying the description of the present disclosure, rather than indicating or implying that the device or element has to have a particular orientation or be configured and/or operated in a particular orientation, and hence may not be construed as limiting the present disclosure.

In addition, the terms "first" and "second" are used for descriptive purposes only and are not to be construed as indicating or implying a relative importance or implicitly indicating the number of technical features being indicated. Thus, features qualified by "first" and "second" may include at least one of the features, either explicitly or implicitly. In the description of the present disclosure, "a plurality" means at least two, such as two, three, etc., unless specifically defined otherwise.

Unless explicitly stated and defined otherwise, in the present disclosure, the terms "installed", "coupled", "connected", "fixed" and the like shall be understood broadly, e.g., they may indicate a fixed connection, a detachable connection, a unibody, a direct connection, an indirect connection via an intermediate medium, a communication within two elements or the interaction between two elements, unless explicitly defined otherwise. For persons of ordinary skill in the art, the specific meanings of the above terms in the present disclosure can be understood on a case-by-case basis.

In the description of the present specification, the description with reference to the terms "an embodiment", "some embodiments", "example", "specific example", "some examples" or the like means a specific feature, structure, material or characteristic described in connection with the embodiment or example is included in at least one embodiment or example of the present disclosure. In the present specification, the schematic representation of the above terms is not necessarily directed to the same embodiment or example. Furthermore, the specific feature, structure, material or characteristic described may be combined in a suitable manner in any one or more embodiments or examples. In addition, various embodiments or examples or features thereof described in the specification may be combined by persons skilled in the art if no conflict is thus created.

FIG. 1 is a schematic structural view of a coupled inductor. As shown in FIG. 1, the coupled inductor provided in this example is a coupled inductor in which same type terminals are located on the same side of the inversely coupled inductor, and that includes a magnetic core 1, a first winding 21 and a second winding 22. In this embodiment, the same type terminals can all be input terminals or can all be output terminals. In other embodiment, one terminal of the same type terminals is a dotted terminal while the other terminal is a non-dotted terminal.

The magnetic core 1 includes two side legs 10 disposed opposite to each other, and pillars 11 and 12 that are disposed between, and perpendicular to, the two side legs 10. Both ends of the side legs 10 are joined to both ends of the pillars 11 and 12 to form a complete magnetic loop, that is, the side legs 10 and the pillars 11 and 12 define a first passage 31. In some examples, a "U" shaped magnetic leg may be used instead of the side legs 10 and the pillars 11 and 12. When the "U" shaped magnetic leg is used, only two magnetic legs engaged together are needed to form the magnetic core 1 having the first passage 31. The first passage 31 has two opposite end faces, namely a first end face 39a of the passage and a second end face 39b of the passage.

A portion of the first winding 21 and a portion of the second winding 22 are both penetrate the first passage 31, and another portion of the first winding 21 and another portion of the second winding 22 cross with each other outside the first passage 31. Taking FIG. 1 as an example, the first winding 21 and the second winding 22 are both wound on the pillar 12 on the left, and the first winding 21 and the second winding 22, which are mutually insulated, cross with each other on the side of the first end face 39a of the passage outside the first passage 31.

Figure 2:
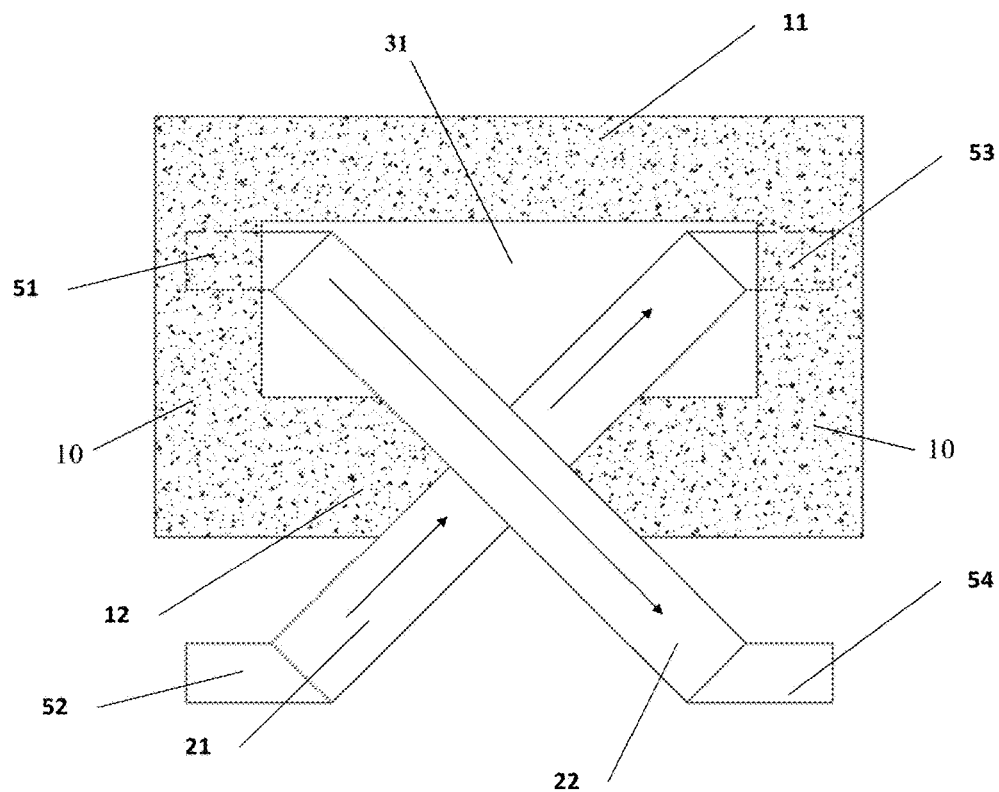
FIG. 2 is a top view of FIG. 1.

FIG. 2 is a top view of FIG. 1, illustrating the arrangement of the terminals (or pins, pads) at the same time. The first winding 21 and the second winding 22 cross with each other on the side of the first end face 39a of the passage, and on the opposite side, i.e., the side of the second end face 39b of the passage, pads 51 to 54 are provided as input and output pins of the coupled inductor. Specifically, pads 51 and 52 are provided as input pins on the left side in FIG. 2, and pads 53 and 54 are provided as output pins on the right side in FIG. 2. The first winding 21 is electrically connected at one terminal to the pad 52, and at the other terminal to the pad 53. The second winding 22 is electrically connected at one terminal to the pad 51, and at the other terminal to the pad 54. As used herein, the terms "pad" and "pin" both refer to terminals via which a unit is electrically connected to the outside. In the following, for ease of use, "pad" and "pin" will be used interchangeably, and will be both labeled with the same reference numerals.

Still referring to FIGS. 1 and 2, in this example, the first winding 21 includes a first section 211, a second section 212, and a third section 213 that is located between, and serves to join, the first section 211 and the second section 212. The second winding 22 includes: a fourth section 221, a fifth section 222, and a sixth section 223 that is located between, and serves to join, the fourth section 221 and the fifth section 222. The first section 211 of the first winding 21 and the fourth section 221 of the second winding penetrate the first passage 31 of the magnetic core 1; the third section 213 of the first winding 21 and the sixth section 223 of the second winding 22 cross with each other on the side of the first side end face 39a outside the first passage 31.

The arrows in the figures indicate the directions in which the electric currents flow through the first winding 21 and the second winding 22. The electric current flows downwards through the portion of the first winding 21 located within the first passage 31 (i.e., the first section 211), and the electric current flows upwards through the portion of the second winding 22 located within the first passage 31 (i.e., the fourth section 221). That is, in the coupled inductor provided in this embodiment, the electric currents flow in opposite directions through the portions of the first winding 21 and the second winding 22 that penetrate the first passage. The expression that the electric currents flow in opposite directions means that the two windings have opposite magnetic fluxes in the magnetic leg they encircle.

By arranging the current flow directions as the above, the magnetic fluxes induced in the magnetic core 1 by the first winding 21 and the second winding 22 are in opposite directions, forming an inversely coupled inductor. At the same time, the input pin of the first winding 21 (i.e., the pad 52) and the input pin of the second winding 22 (i.e., the pad 51) may both be located on the left side in FIG. 2, while the output pin of the first winding 21 (i.e., pad 53) and the output pin of the second winding 22 (i.e., pad 54) are both located on the right side in FIG. 2. In other words, the inductor provided in the present embodiment is inversely coupled, and by having the first winding 21 and the second winding 22 cross with each other outside the first passage 31, the same type terminals (i.e., the input terminals 52 and 51) can be located on the same side of the inductor. It not only improves the symmetry of the two-phase circuit with the inversely coupled inductor, but also offers more convenience in applications.

It should be understood that this embodiment does not limit the electric current to flow in the above manner. Rather, this embodiment merely requires that portions of the two windings pass through a passage formed by the magnetic core, and that an intersection is created outside the passage for portions of the two windings other than those penetrating the passage of the magnetic core. Any other structural features may be selected or rearranged, either individually or in combination, as long as no contradiction is created.

Figure 3:
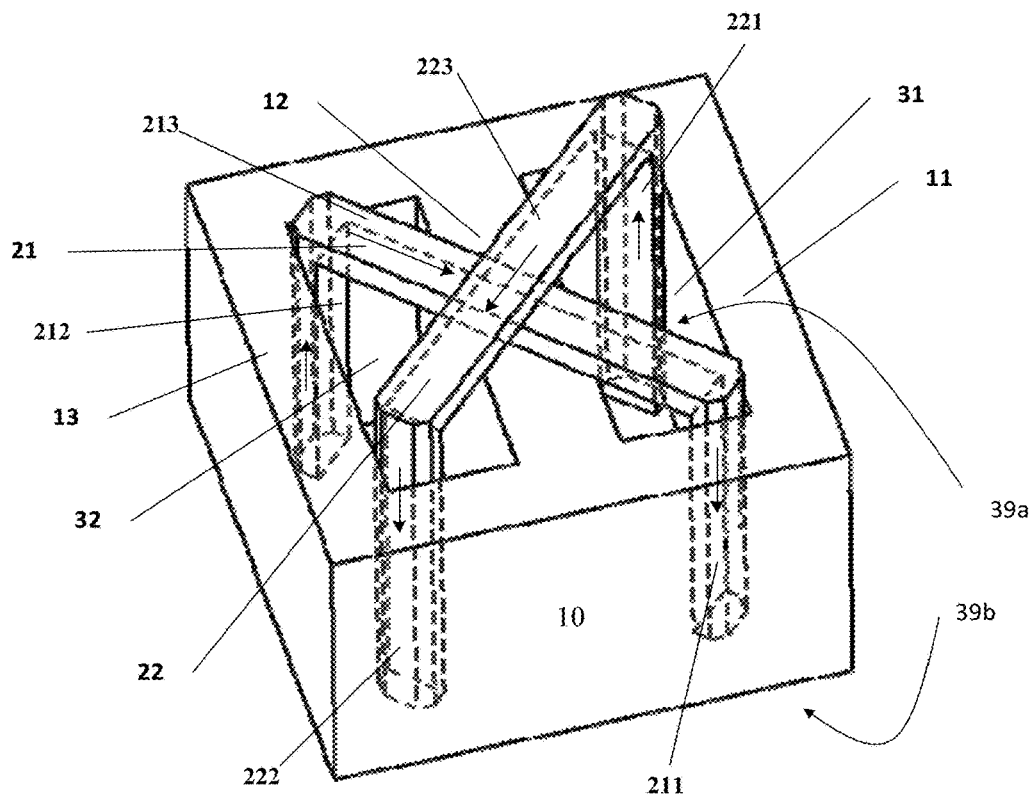
FIG. 3 is a schematic structural view of another inversely coupled inductor according to an embodiment of the present disclosure.
Figure 4:
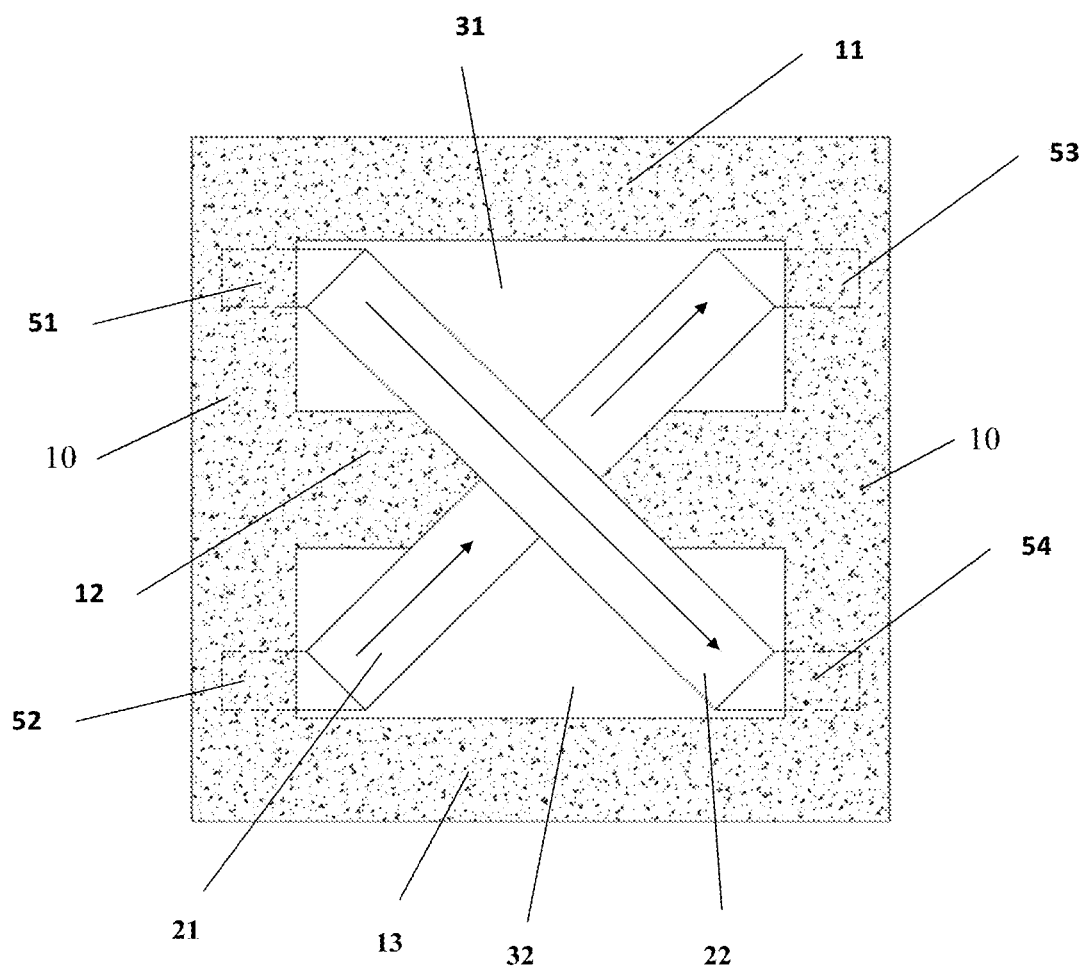
FIG. 4 is a top view of FIG. 3.

FIG. 3 is a schematic structural view of another coupled inductor, and FIG. 4 is a top view of FIG. 3. As shown in FIGS. 3 and 4, the coupled inductor of this example is different from that of FIGS. 1 and 2 in that the magnetic core 1 includes three pillars, i.e., pillars 11 to 13, where two side legs 10 and the pillars 11 and 12 form the first passage 31, and the two side legs 10 and the pillars 12 and 13 form a second passage 32. That is, the magnetic core 1 of FIGS. 3 and 4 forms an "8" shaped magnetic loop. Of course, in some examples, it is also possible to arrange more pillars 12 between the two side legs 10, so that more passages may be formed by the side legs 10 and the pillars 12. In this example, as compared against FIGS. 1 and 2, the second section 212 of the first winding 21 and the fifth section 222 of the second winding 22 also penetrate the second passage 32 of the magnetic core 1.

In this example, the electric currents flow in opposite directions not only for the first section 211 of the first winding 21 and the fourth section 221 of the second winding 22, but also for the second section 212 of the first winding 21 and the fifth section 222 of the second winding 22.

Through the above arrangement, the first winding 21 and the second winding 22 are both wound around the pillar 12, and the magnetic flux generated on the pillar 12 is simultaneously shunted to the side legs 11 and 13, which is advantageous for improving the symmetry and uniformity of the magnetic loop, and reducing magnetic loss. The first and second windings 21 and 22 are insulated from each other, and cross with each other outside the passages 31 and 32, i.e., on the side of the first end face 39a of the passage. Referring to FIG. 4, pads 51 to 54 are formed on the other side of the passages 31 and 32 (i.e., on the side of the second end face 39b of the passage).

In FIGS. 3 and 4, the arrows in the figures indicate the directions in which the electric currents flow through the first winding 21 and the second winding 22. Similar to FIGS. 1 and 2, the electric currents flow in opposite directions through the portions of the first winding 21 and the second winding 22 that are in the first passage 31 (i.e., the electric currents flow in opposite directions through the first section 211 of the first winding 21 and the fourth section 221 of the second winding 22). Similarly, the electric currents also flow in opposite directions through the portions of the first winding 21 and the second winding 22 that are in the second passage 32 (i.e., the electric currents flow in opposite directions through the second section 212 of the first winding 21 and the fifth section 222 of the second winding 22). Thus, the magnetic fluxes induced in the pillar 12 by the two windings are in opposite directions, forming an inversely coupled inductor. Compared against the embodiment shown in FIGS. 1 and 2, the inductor shown in FIGS. 3 and 4 is more conducive to achieving an inversely coupled inductor with more inductance or saturation current when the size is the same. Put in other words, it is more advantageous in reducing the size of the inductor. Since the first winding 21 and the second winding 22 are arranged to cross with each other outside the first passage 31 and the second passage 32 of the magnetic core 1, the same type terminals (i.e., the input terminals 52 and 51) can be located on the same side of the inductor. For example, pads 51 and 52 are input pins that are arranged on the left side of the inductor, while pads 53 and 54 are output pins that are arranged on the right side of the inductor.

The above arrangement is advantageous in improving the symmetry of the two-phase circuit, and is easy to use. At the same time, since the two windings 21 and 22 cross with each other outside of the passages 31 and 32 formed in the magnetic core 1 and the pins of the inductor are all disposed on the other sides of the passages, it becomes possible, when fabricating the inductor, to pre-fabricate the magnetic core 1 and windings 21 and 22 separately, and then insert the windings 21 and 22 into the passages 31 and 32 of the magnetic core 1, and form the pads 51 to 54 as input and output pins on the other sides of the passages 31 and 32, arriving at a more simplified and efficient fabricating process, and also being conducive to modular product design. Since the two windings 21 and 22 cross with each other outside of the passages 31 and 32 formed in the magnetic core 1, the mutual insulation treatment at the crossed portions of the windings is also made easier. In addition, the input and output pins (i.e., pads 51 to 54) of the windings 21 and 22 are in a plane that extends along a vertical direction. This is advantageous in conducting heat in the vertical direction, and the upper surface of the inductor (i.e., the plane where the windings 21 and 22 intersect as in FIGS. 3 and 4) may serve as a mounting plane for a heatsink to facilitate conduction and dissipation of heat in the vertical direction.

Furthermore, although the windings 21 and 22 are shown as a unibody structure in FIGS. 3 and 4, individual sections of the windings 21 and 22 may also be discrete structures. Additionally, in some examples, it is possible for one of the windings 21 and 22 to be a discrete structure while the other to be a unibody structure.

Figure 5:
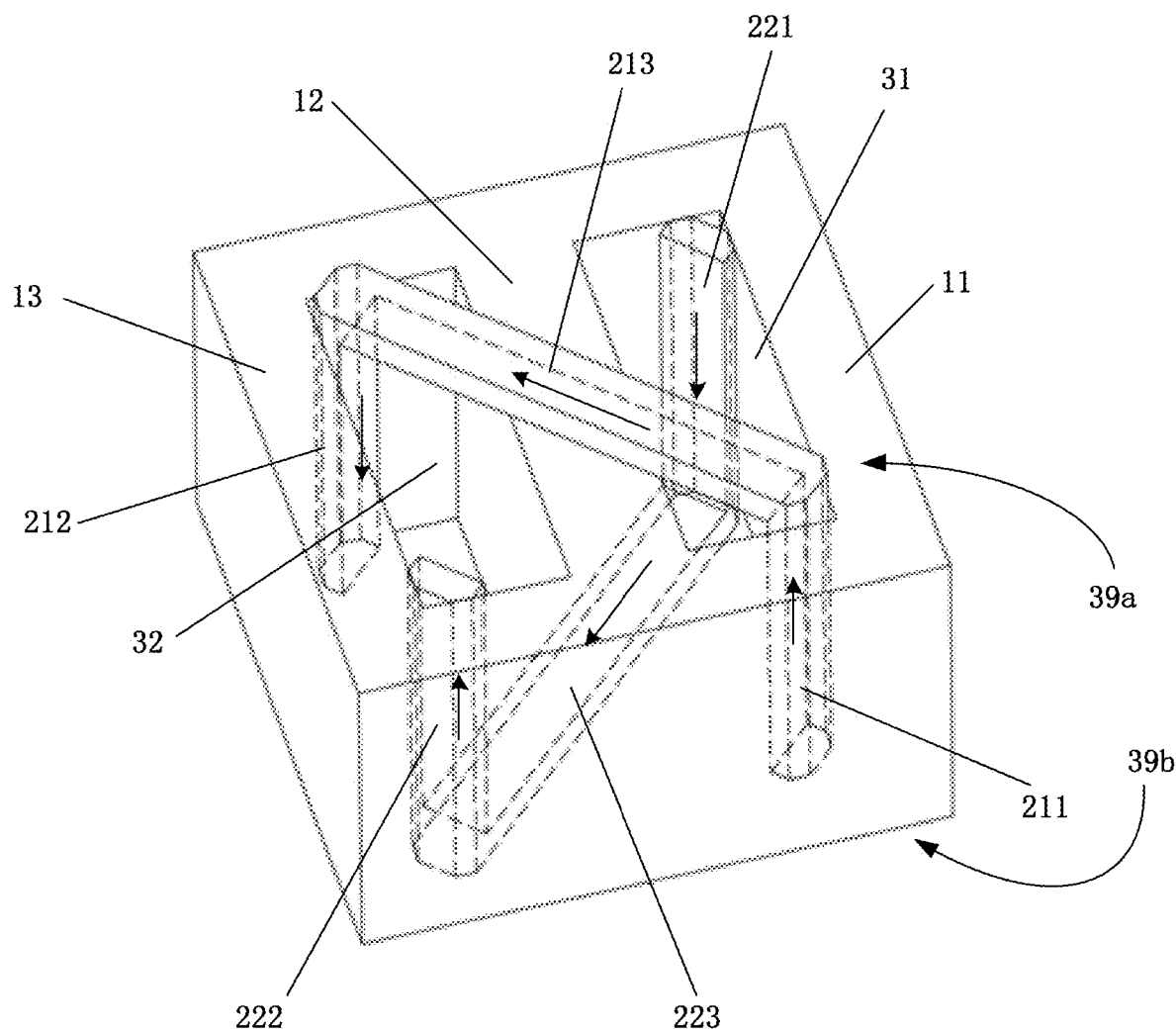
FIG. 5 is a schematic structural view of another inversely coupled inductor according to an embodiment of the present disclosure.
Figure 6:
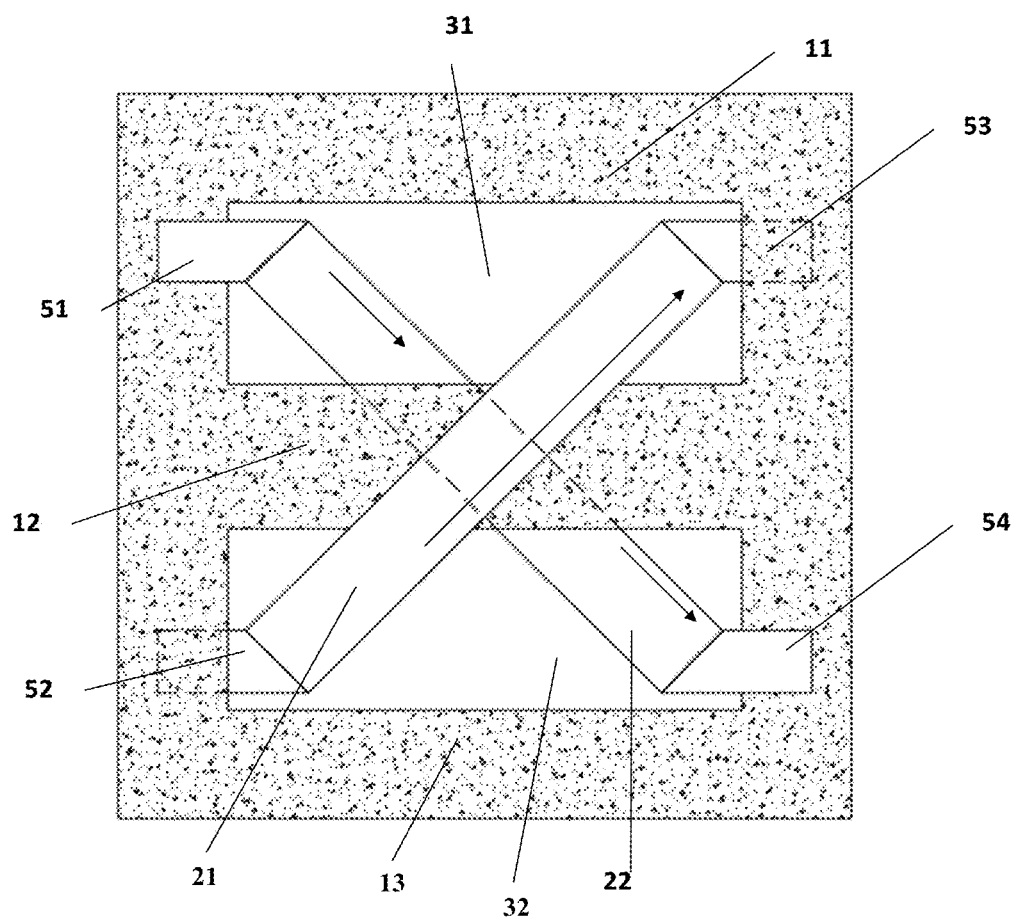
FIG. 6 is a top view of FIG. 5.

FIG. 5 is a schematic structural view of another coupled inductor, and FIG. 6 is a top view of FIG. 5. As shown in FIGS. 5 and 6, the coupled inductor of this example is different from that of FIGS. 3 and 4 in that the first winding 21 is inserted into the passages 31 and 32 of the magnetic core 1 from the side of the first end face 39a of the passage, and the second winding 22 is inserted into the passages 31 and 32 of the magnetic core 1 from the side of the second end face 39b of the passage.

Still referring to FIG. 6, in this example, the pads 51 and 54 are located on the same side of the magnetic core 1 as the first winding 21, that is, the pad 51 and the pad 54 are also located on the side of the first end face 39a of the passage. The pads 52 and 53 are located on the same side of the magnetic core 1 as the second winding 22, that is, the pads 52 and 53 are also located on the side of the second end face 39b of the passage. Although the first winding 21 and the second winding 22 are located on different end faces, the first winding 21 and the second winding 22 still achieve a crossing outside the passages 31 and 32. The pads 51 and 52, which are provided as input terminals, are both on the left side in FIG. 6, albeit on different end faces of the magnetic core 1. Similarly, the pads 53 and 54, which are provided as output terminals, are both on the right side in FIG. 6, albeit on different end faces of the magnetic core 1. Moreover, with the above arrangement, the first winding 21 and the second winding 22 can be insulated from each other without special treatment, so that the first winding 21 and the second winding 22 can be made using identical parts, thereby reducing the number of part types that need to be separately manufactured, which in turn reduces costs.

Figure 7:
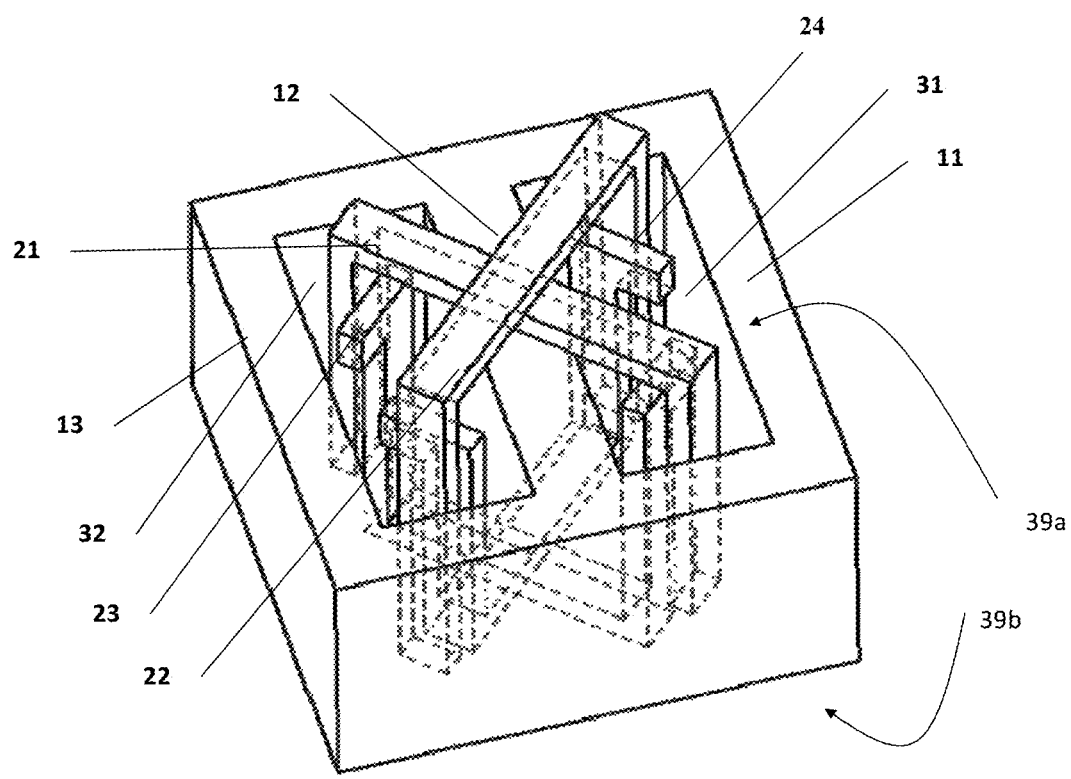
FIG. 7 is a schematic structural view of another inversely coupled inductor according to an embodiment of the present disclosure.
Figure 8:
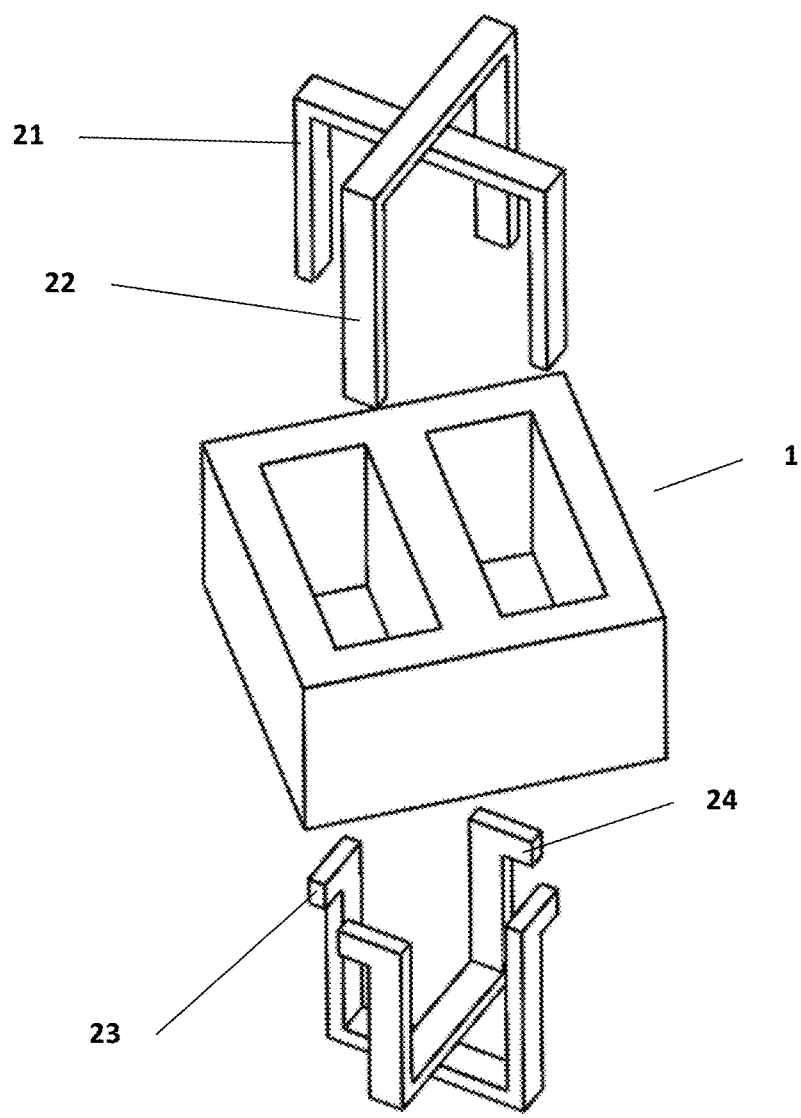
FIG. 8 is an exploded view of FIG. 7.

FIG. 7 is a schematic structural view of another coupled inductor, and FIG. 8 is an exploded view of FIG. 7. As shown in FIGS. 7 and 8, the coupled inductor of this example differs from that of FIGS. 3 and 4 in that it further includes a third winding 23 and a fourth winding 24. The first winding 21 and the second winding 22 are inserted into the passages 31 and 32 of the magnetic core 1 from the side of the first end face 39a of the passage, and the third winding 23 and the fourth winding 24 are inserted into the passages 31 and 32 of the magnetic core 1 from the side of the second end face 39b of the passage. Portions of the first winding 21 and the second winding 22 cross with each other outside the passages 31 and 32 in a manner similar to the previous embodiments. Meanwhile, portions of the third winding 23 and the fourth winding 24 also cross with each other outside the passages 31 and 32, except for that the first winding 21 and the second winding 22 cross with each other on the side of the first end face 39a of the passage, while the third winding 23 and the fourth winding 24 cross with each other on the side of the second end face 39b of the passage. By inserting more windings in the passages 31 and 32 of the magnetic core 1, a multi-phase circuit can be integrated to increase the power density. It can be understood that this example is equally applicable to an inductor having one passage or more than two passages.

Figure 9:
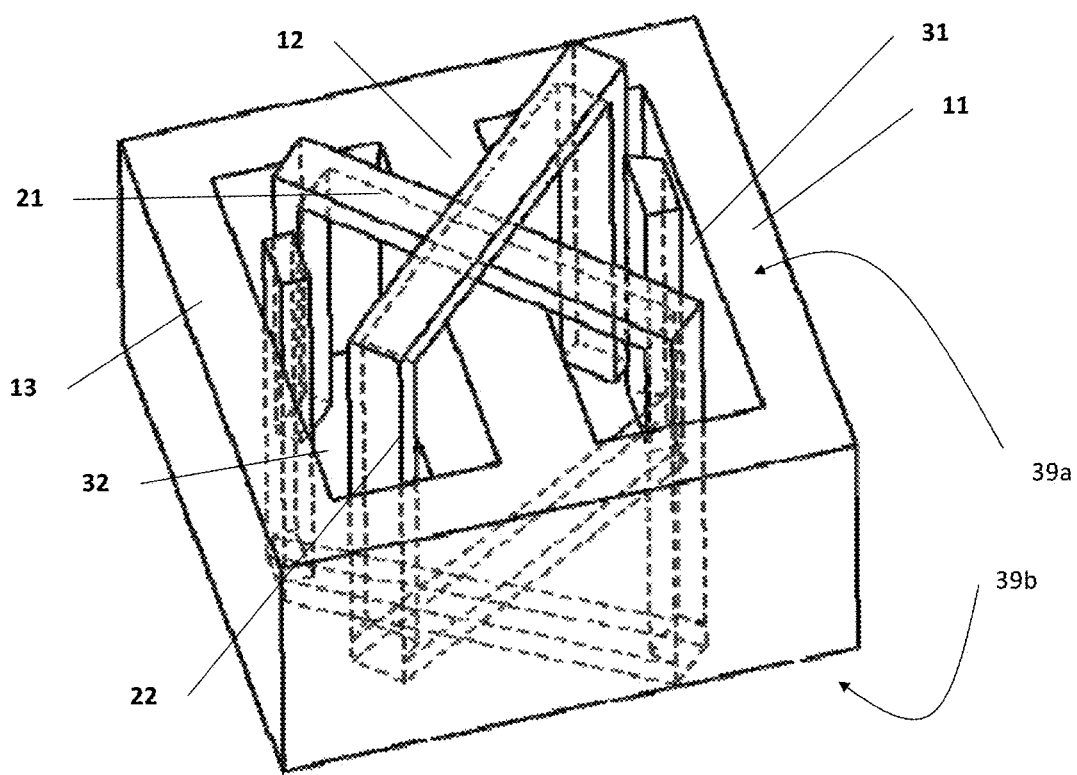
FIG. 9 is a schematic structural view of another inversely coupled inductor according to an embodiment of the present disclosure.
Figure 10:
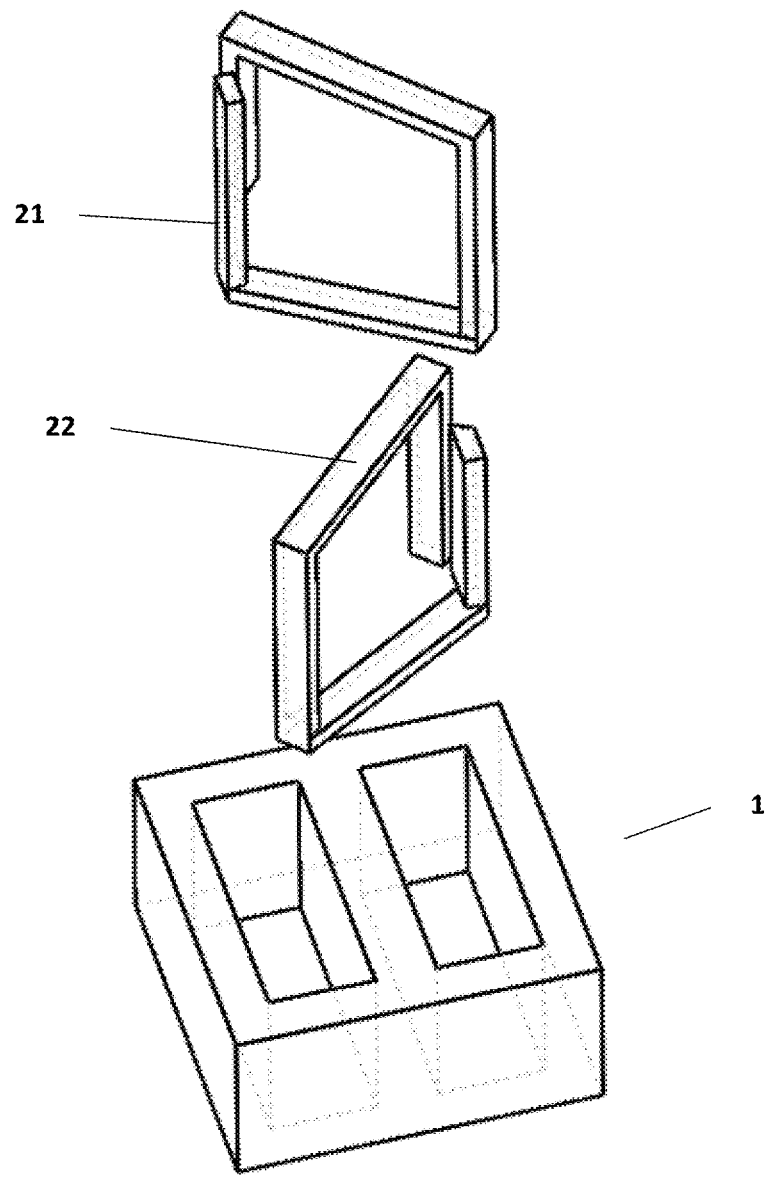
FIG. 10 is an exploded view of FIG. 9.

FIG. 9 is a schematic structural view of another coupled inductor, and FIG. 10 is an exploded view of FIG. 9. As shown in FIGS. 9 and 10, the coupled inductor provided in this example is different from that of FIGS. 3 and 4 in that at least one of the first winding 21 and the second winding 22 is a multi-turn winding wound around the pillar 12 to allow larger inductance or other properties for the inductor. It can be understood that this example does not limit the first winding 21 and the second winding 22 to have multi-turns, nor that the number of turns be equal for the first winding 21 and the second winding 22.

Figure 11:
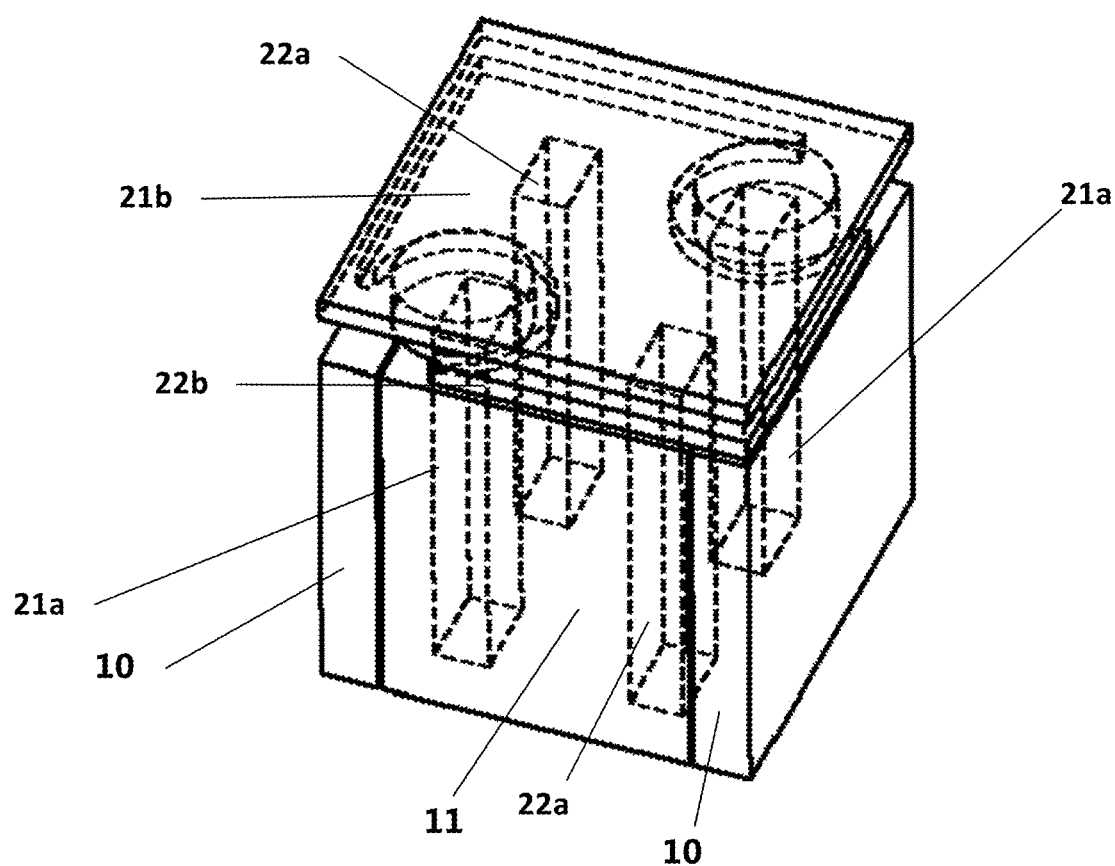
FIG. 11 is a schematic structural view of another inversely coupled inductor according to an embodiment of the present disclosure.
Figure 12:
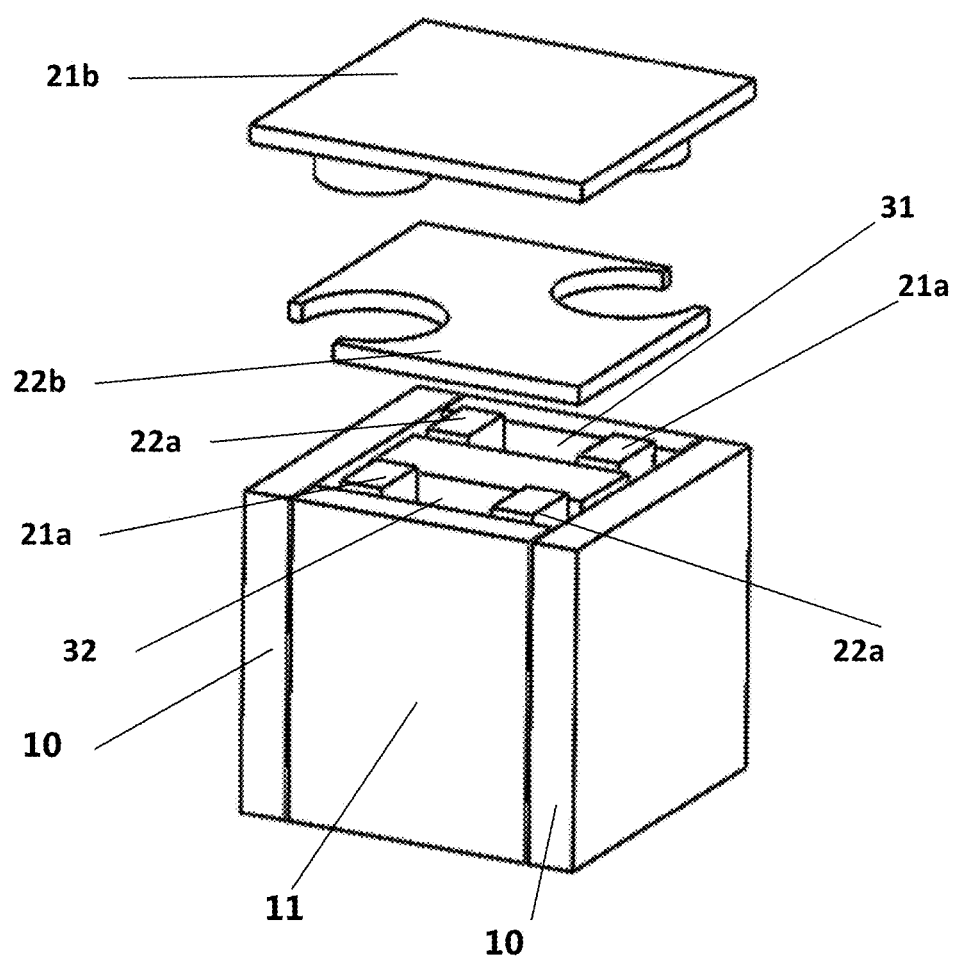
FIG. 12 is a schematic structural view after a part of the structure of FIG. 11 is dissembled.

FIG. 11 is a schematic structural view of another coupled inductor, and FIG. 12 is a schematic structural view after a part of the structure of FIG. 11 is dissembled. As shown in FIGS. 11 and 12, the coupled inductor of this example differs from that of FIGS. 3 and 4 in that the windings in FIGS. 3 and 4 are unibody structures while those in this example employ the discrete structure as below.

In this example, the portions of the windings 21b and 22b which cross with each other outside the passages 31 and 32 of the magnetic core 1 are separately fabricated from the windings 21a and 22a which penetrate the passages 31 and 32. When the inductor is being assembled, the windings 21a and 21b are electrically connected to complete the first winding 21. Similarly, the windings 22a and 22b are electrically connected to complete the second winding 22.

Specifically, as shown in FIGS. 11 and 12, the windings 21b and 22b are both provided as plate-like structures, and the windings 21b and 22b are arranged in a stacking manner, which are mutually insulated. Two bumps are provided on the winding 21b, while corresponding openings for allowing the two bumps to pass through are provided on the winding 22b. When 21b and 22b are stacked at a proper pitch, then 22b and 22a can be made electrically connected, while the winding 21b is electrically connected to the two windings 21a via the two bumps, respectively. Of course, two lower bumps may also be provided at locations on the lower surface of the winding 22b corresponding to the windings 22a for realizing electrical connection with the two windings 22a. Of course, in some examples, the above-described bumps may also be provided on the windings 21a.

Figure 13:
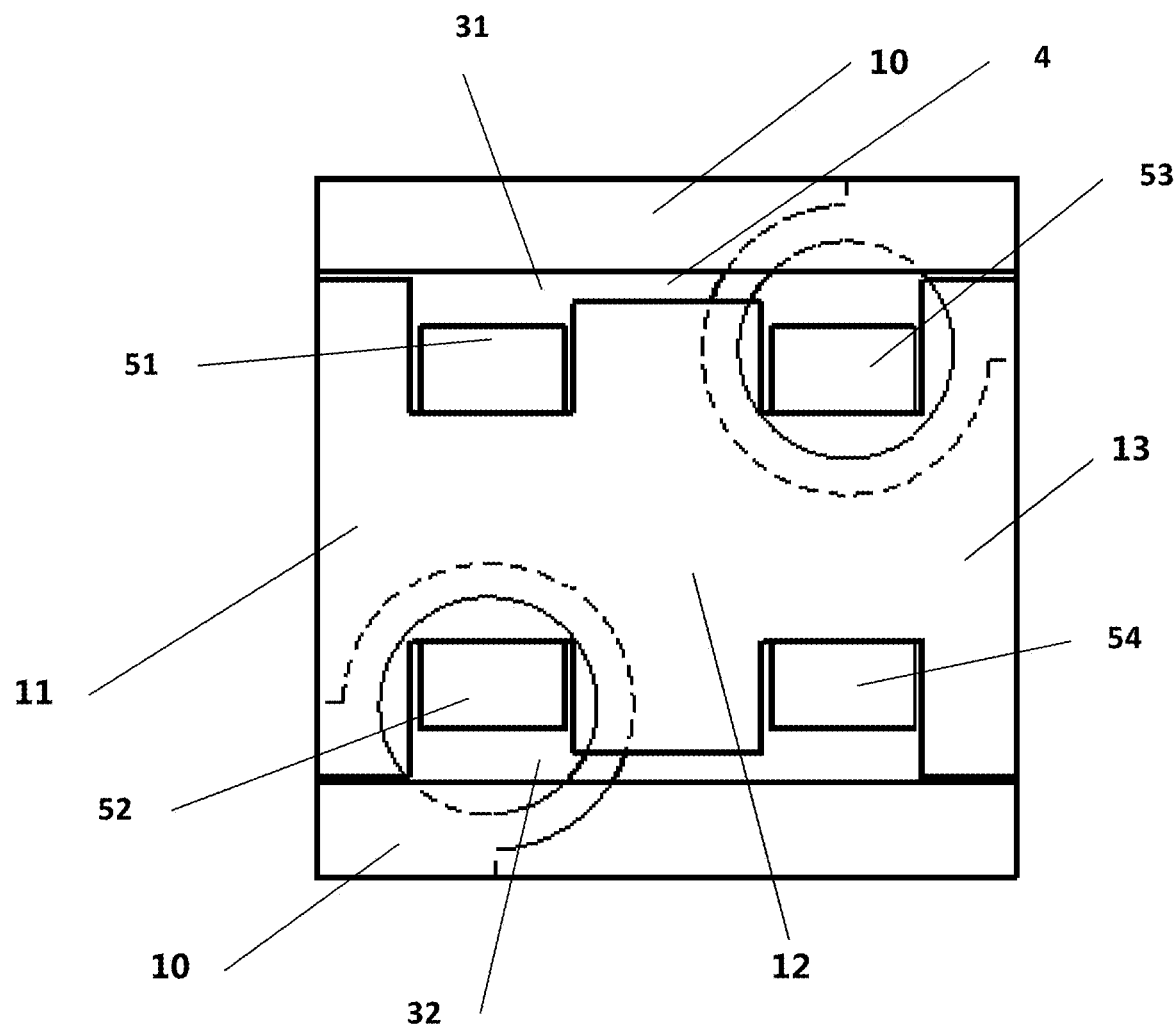
FIG. 13 is a bottom view of another inversely coupled inductor according to an embodiment of the present disclosure.

FIG. 13 is a bottom view of a coupled inductor illustrating the pinout at the bottom. Using FIG. 13 as an example, which is a bottom view of the coupled inductor shown in FIG. 11 and FIG. 12, pins 51 and 52 are same type terminals, and pins 53 and 54 are also same type terminals. Pins 51 and 54 are electrically connected via windings 22a and 22b, and pins 52 and 53 are electrically connected via windings 21a and 21b. A winding 22a electrically connected to the pin 51 and a winding 21a electrically connected to the pin 53 are disposed in the first passage 31, and a winding 21a electrically connected to the pin 52 and a winding 22a electrically connected to the pin 54 are disposed in the second passage 32.

In addition, FIG. 13 also shows that the pillars 11 to 13 disposed between the two side legs 10 in FIGS. 11 and 12 can be replaced with a double-sided "E" shaped magnetic core. Specifically, the magnetic core 1 includes a double-sided "E" shaped magnetic core, and two "I" shaped magnetic cores which are used for connecting both ends of the double-sided "E" shaped magnetic core to form a magnetic loop. As shown in FIG. 13, a passage 31 is assembled and formed on the "E" shaped side in the upper drawing, and a passage 32 is assembled and formed on the "E" shaped side in the lower drawing.

Figure 14:
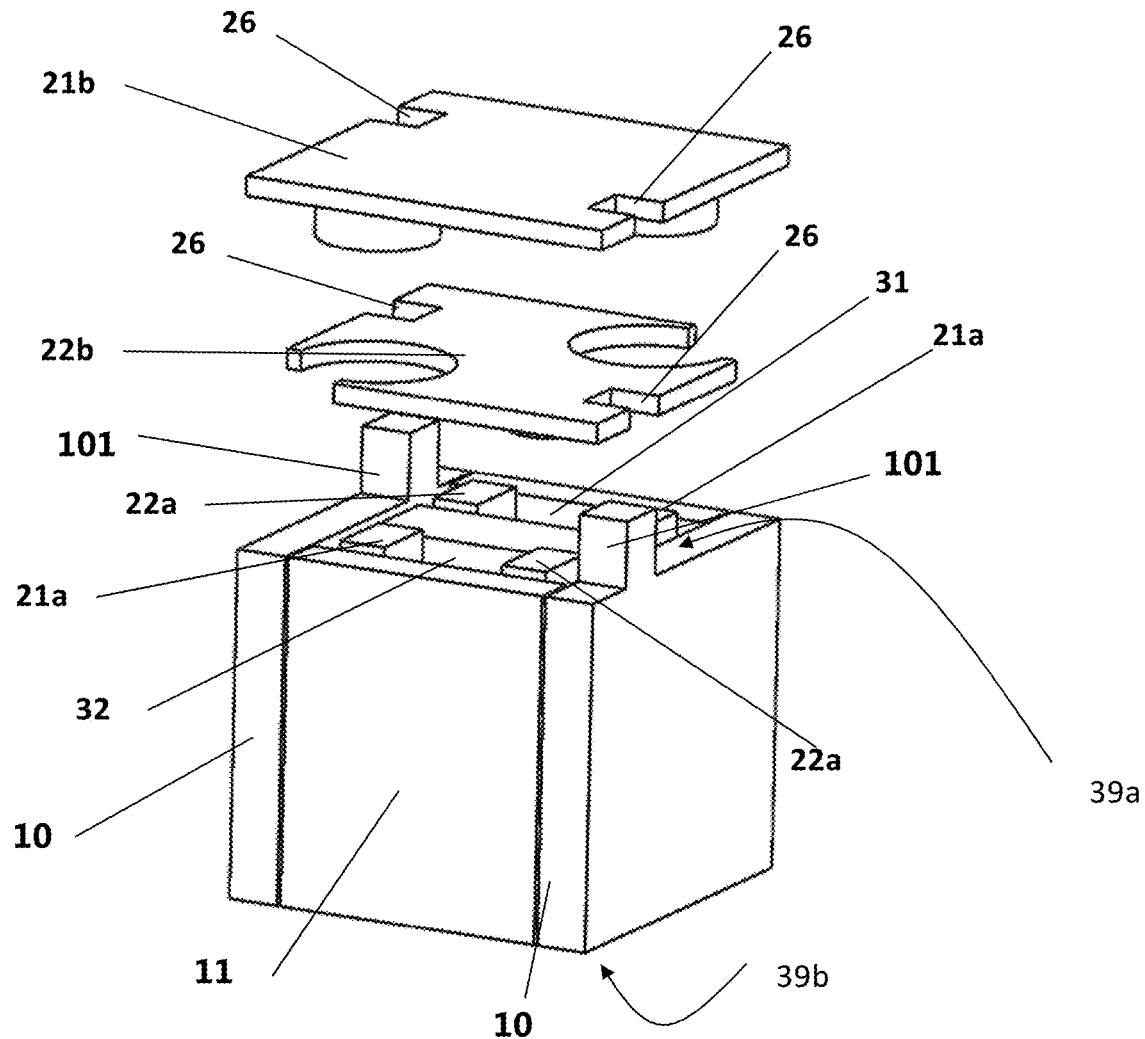
FIG. 14 is a schematic structural view of another inversely coupled inductor according to an embodiment of the present disclosure.

FIG. 14 is the structure of another coupled inductor. It is different from FIG. 12 in that both side legs 10 are provided with magnetic bumps 101 on the side of the first end face 39a of the passage, and the windings 21b and 22b are provided with positioning grooves 26. A matching between the magnetic bumps 101 and the positioning grooves 26 helps aligning the windings 21b and 22b during assembling. This may, for example, prevent the windings 21b and 22b from displacement or short-circuited to each other. Windings 21a and 22a are provided in the passages 31 and 32. The input and output pins of the inductor are drawn out on the side of the second end face 39b of the passage.

Figure 15:
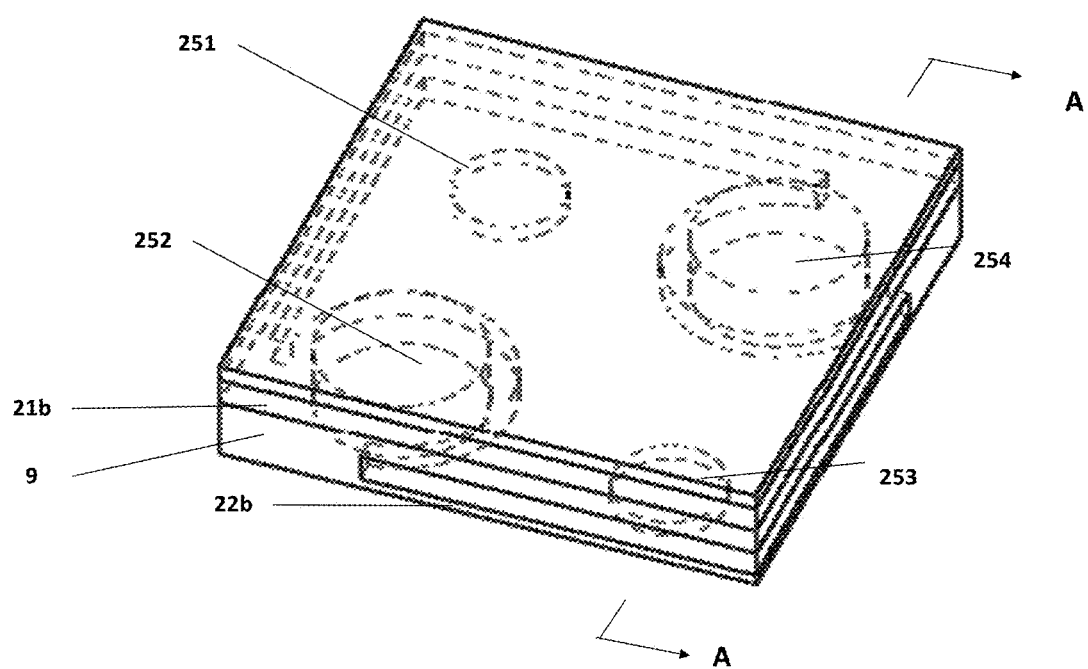
FIG. 15 is a schematic structural view of a winding component according to an embodiment of the present disclosure.
Figure 16:
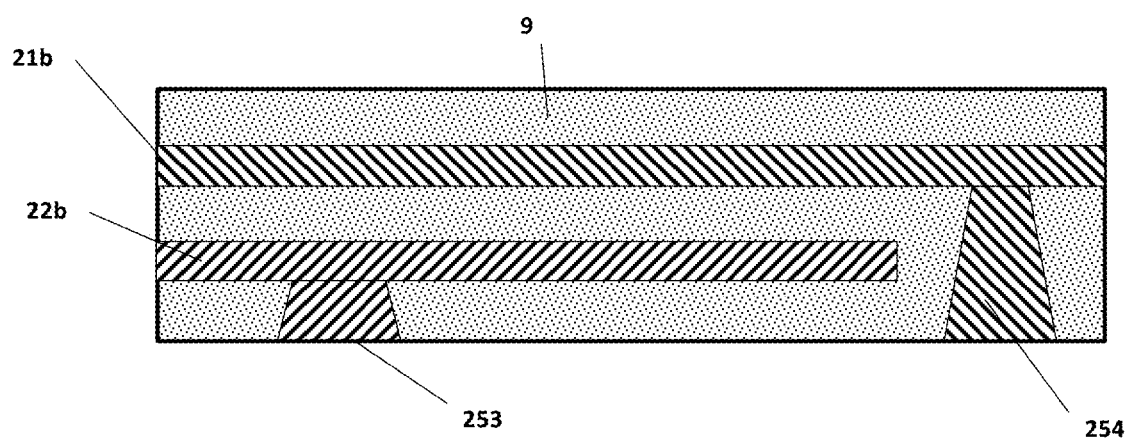
FIG. 16 is a sectional view taken along line A-A of FIG. 15.

FIG. 15 shows an alternative structure for the windings 21b and 22b. FIG. 15 differs from FIGS. 11 and 12 in that the windings 21b and 22b are integrally packaged in a unibody structure. FIG. 16 is a sectional view taken along line A-A of FIG. 15. As shown in FIG. 16, the windings 21b and 22b are both packaged in the insulating encapsulant 9, with the lower surface being provided with pads 251 to 254. The pads 252 and 254 are used to be electrically connected to the winding 21a, and the pads 251 and 253 are used to be electrically connected to the winding 22a. The electrical connection between the pads 251-254 and their respective windings can be achieved using via plating or other metallizing methods. For example, the pad 253 and the winding 22b in FIG. 16 can be electrically connected using via plating, so can the pad 254 and the winding 21b using via plating. Of course, the electrical connection can also be realized using other metallizing methods.

It should be understood that the winding module shown in FIG. 16 can also be fabricated using a conventional PCB or laminated bus bar process, or using various packaging processes such as a package process using a lead frame for packaging and extracting pads.

Figure 17:
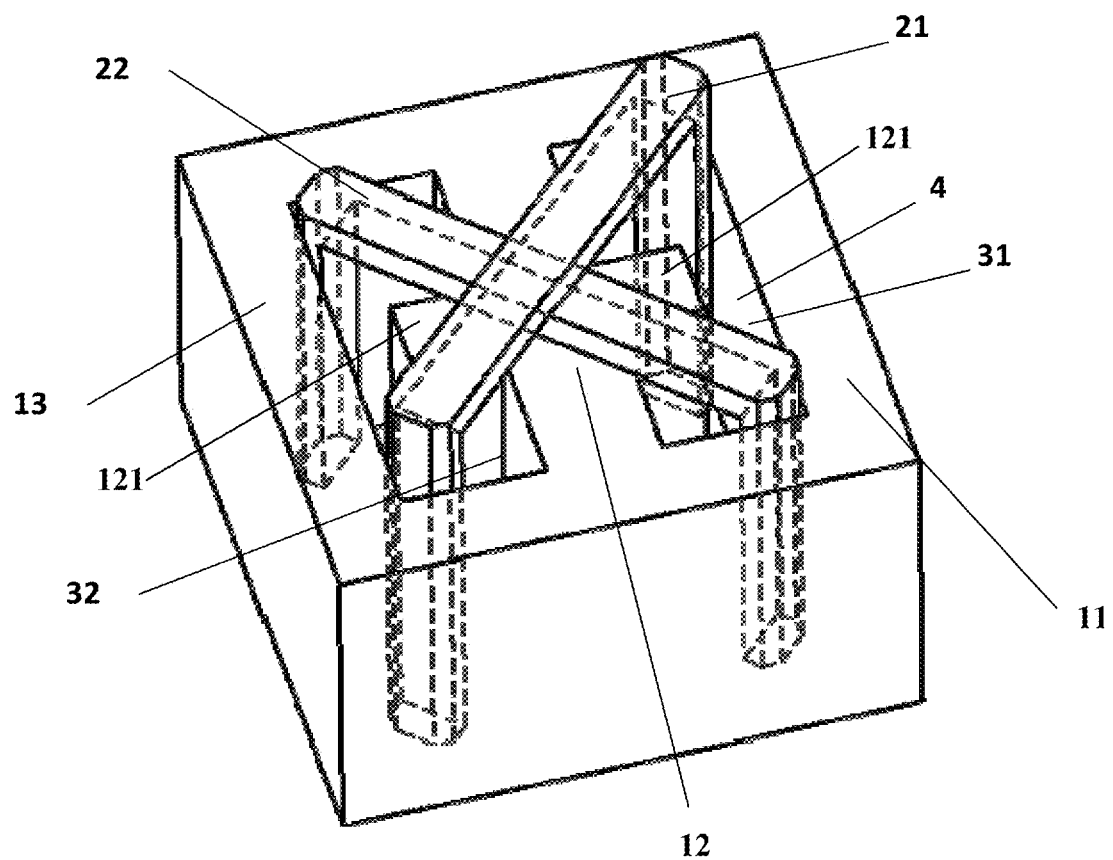
FIG. 17 is a schematic structural view of another inversely coupled inductor according to an embodiment of the present disclosure.
Figure 18:
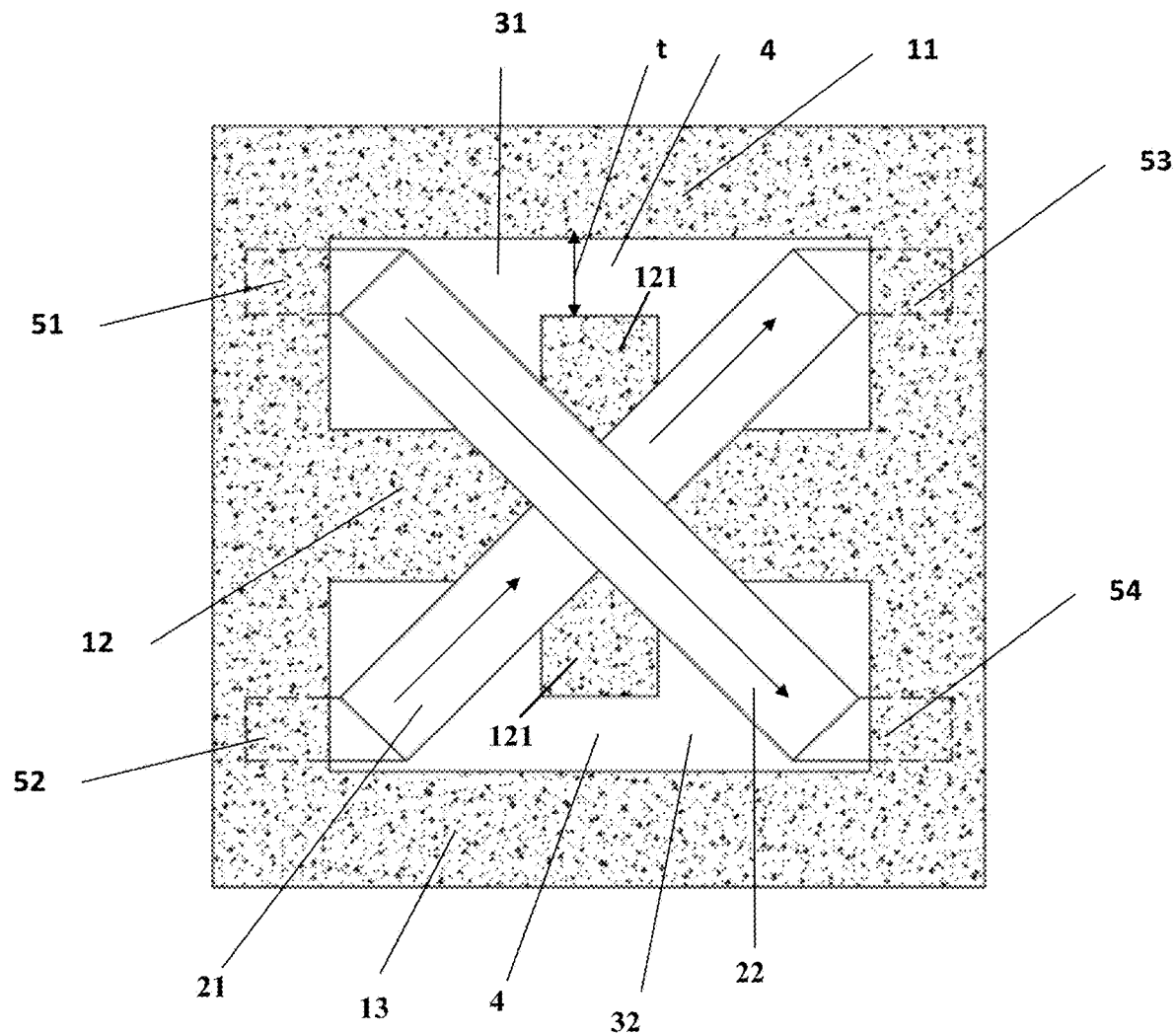
FIG. 18 is a top view of FIG. 17.

Various methods can be used to adjust the coupling coefficient for the coupled inductor of the above embodiment. FIG. 17 is a schematic structural view of a coupled inductor, and FIG. 18 is a top view of FIG. 17. FIGS. 17 and 18 differ from FIGS. 3 and 4 in that a magnetic leg is drawn from the middle of the pillar 12 towards the pillars 11 or 13, respectively, as a decoupling leg 121. The decoupling leg 121 is perpendicular to the pillar 12, and forms an air gap 4 with its opposing pillar 11 or 13. The coupling coefficient can be adjusted by controlling the height t of the air gap 4. Of course, in some examples, one or more decoupling legs 121 may also be formed on one or more of the pillars.

It should be understood that the manner of forming the air gap is not limited to the above. For example, a design in which the air gap 4 is also formed by the double-sided "E" shaped magnetic core is shown in FIG. 13.

Further, in order to adjust the coupling coefficient of the inductor, in addition to the provision of the air gap 4 and further adjustment of the height of the air gap 4, various methods may also be employed, such as adjusting the spacing between the windings or the width of the magnetic legs. That is, the coupling coefficient of the coupled inductor of this example can be adjusted by any one or more of the following methods: providing the air gap 4, adjusting the height t of the air gap 4, adjusting the spacing between the windings 21 and 22 (including but not limited to the spacing between any two of the sections of different windings, such as the first section 211 of the first winding 21, the second section 212 of the first winding 21, the fourth section 221 of the second winding 22, and the fifth section 222 of the second winding 22), adjusting the spacing between two adjacent pillars, or providing magnetic materials with different magnetic properties (e.g., magnetic permeability) between adjacent pillars. Adjusting the coupling coefficient in a variety of ways can improve the flexibility in tuning the coupled inductor, offering a wider range of applications. Moreover, the air gap 4 is within the structure of the inductor, which can reduce the magnetic field leakage, reducing the magnetic interference intensity.

Figure 19:
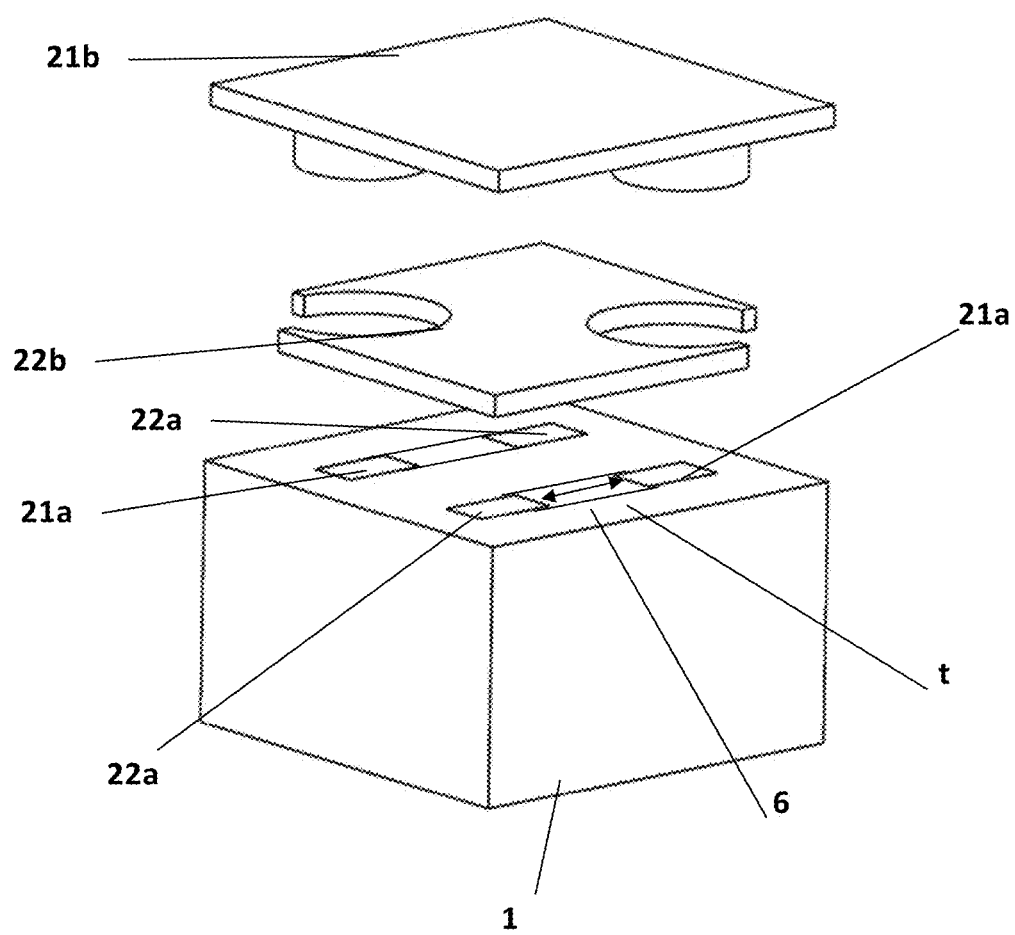
FIG. 19 is a schematic structural view of another inversely coupled inductor according to an embodiment of the present disclosure.

It should be noted that, for a distributed air gap, or a coupled inductor having the structure shown in FIG. 19, a coupling coefficient can be adjusted by altering the space between the portion of the winding 21 and the portion of the winding 22 that are located in the passage 31 or 32 of the magnetic core 1. Referring to FIG. 19, the coupled inductor differs from that of FIG. 12 in that the passages 31 and 32 are filled with filler 6, and the cross-sections of the passages 31 and 32 and the cross-section of the first winding 21a or 22a in the passages 31 and 32 are identically shaped. For the coupled inductor of the above structure shown in FIG. 19, the coupling coefficient can be controlled not only by adjusting the space t between the windings, but also by controlling the material properties of the filler 6 between the windings. For example, filling the region 6 with a non-magnetic material can increase the coupling coefficient.

Figure 20:
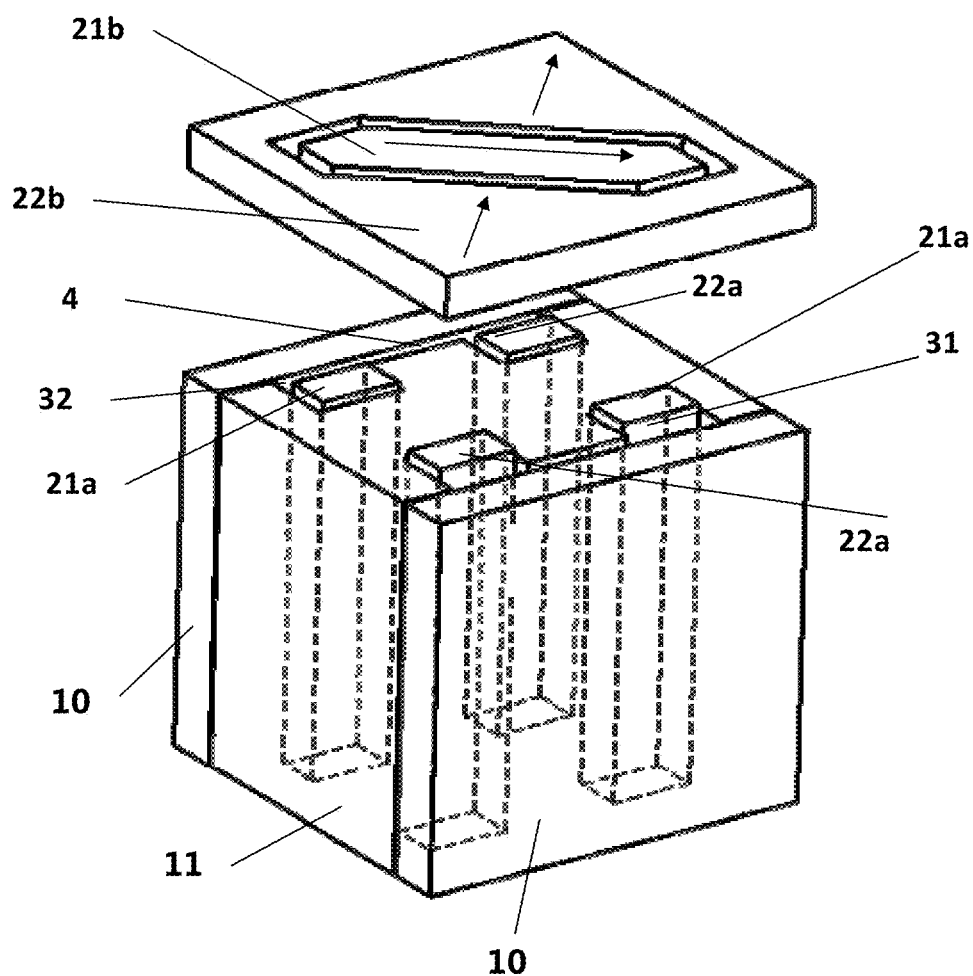
FIG. 20 is a schematic structural view of another inversely coupled inductor according to an embodiment of the present disclosure.

FIG. 20 is a schematic structural view of another coupled inductor. FIG. 20 differs from FIG. 12 in that the windings in FIG. 12 cross with each other by cross-stacking the windings 21 and 22 outside the passages 31 and 32. That is, the windings 21 and 22 cross with each other in FIG. 12 by different layers, while FIG. 20 illustrates an implementation in which the windings 21 and 22 cross with each other in the same layer (i.e., cross in the same plane).

Specifically, the windings 21b and 22b are both plate-like structures, and a through hole is formed in the winding 22b, and the winding 21b is embedded in the through hole, so that the windings 21b and 22b are in the same plane. There is a gap between the winding 22b and the winding 21b which are insulated from each other. The winding 22b is electrically connected to the winding 22a in the magnetic core 1, and the winding 21b is electrically connected to the winding 21a in the magnetic core 1. The electric currents flow through the windings 21b and 22b in the directions as indicated by the arrows in FIG. 19, which cross with each other, thus achieving the mutual crossing of the two windings in the same plane. The electric current in the winding 21b flows along the arrow, while the electric current in the winding 22b flows around the winding 21b, yet generally in a direction that crosses with the direction of the current in the winding 21b.

In addition, FIG. 20 also illustrates that the magnetic core 1 is formed by assembling three segments of magnetic legs having a centralized air gap. The coupling coefficient can be adjusted by controlling the height of the air gap 4.

Figure 21:
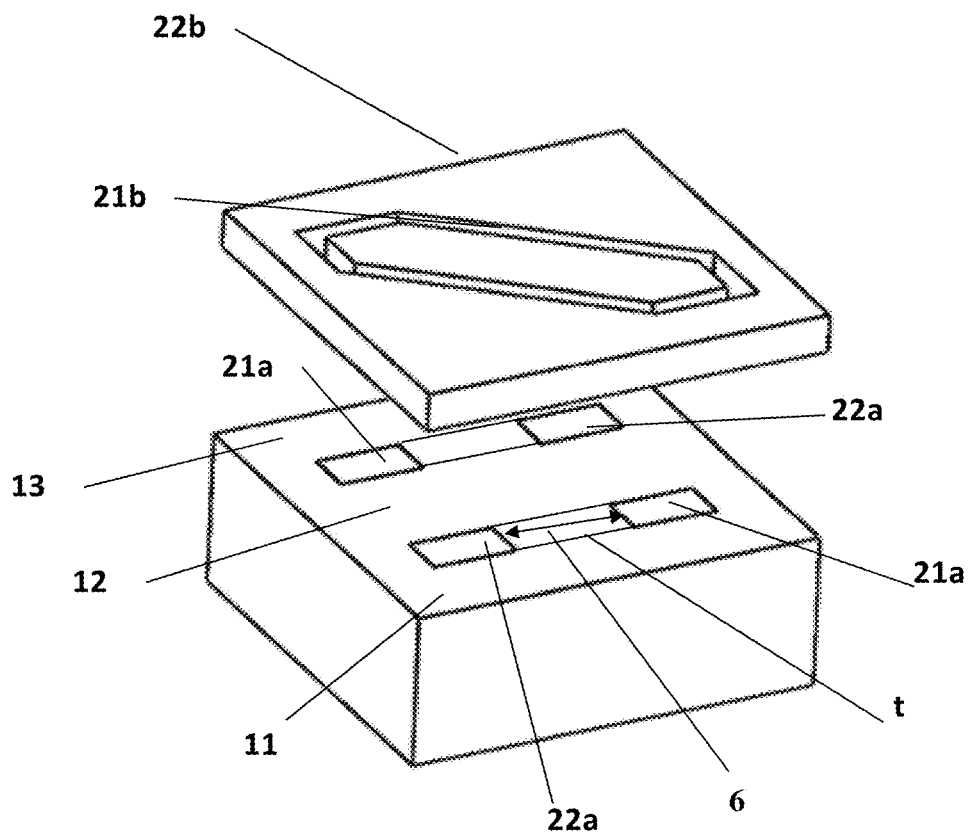
FIG. 21 is a schematic structural view of another inversely coupled inductor according to an embodiment of the present disclosure.

FIG. 21 is a schematic structural view of another coupled inductor. FIG. 21 differs from FIG. 20 in that the windings 21a and 22a are integrally injection molded, having distributed air gaps, and the coupling coefficient can be tuned by controlling the spacing t between the windings or the magnetic properties (e.g., magnetic permeability) of the filler in the region 6 between the windings.

In the coupled inductor as shown in FIGS. 20 and 21, the windings 21b and 22b cross with each other in the same plane, eliminating the stacking of the windings, which is advantageous in reducing the height of the inductor, while simplifying the fabrication of the windings 21b and 22b and the structure of the inductor.

Figure 22:
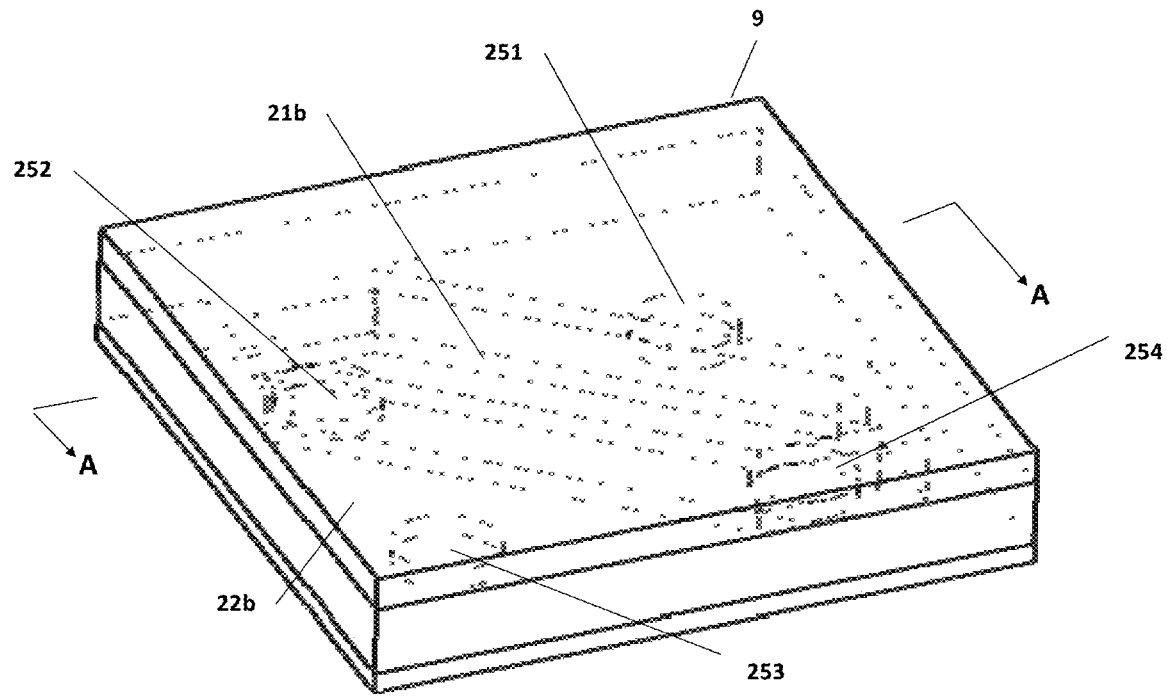
FIG. 22 is a schematic structural view of another winding component according to an embodiment of the present disclosure.

FIG. 22 is an alternative example from the windings 21b and 22b of FIGS. 20 and 21. As shown in FIG. 22, the windings 21b and 22b may be integrally formed, packaged in the insulating material 9, and then be mounted onto the magnetic core 1 below and the windings 21a and 22a as shown in FIGS. 20 and 21 to form a complete coupled inductor.

Figure 23:
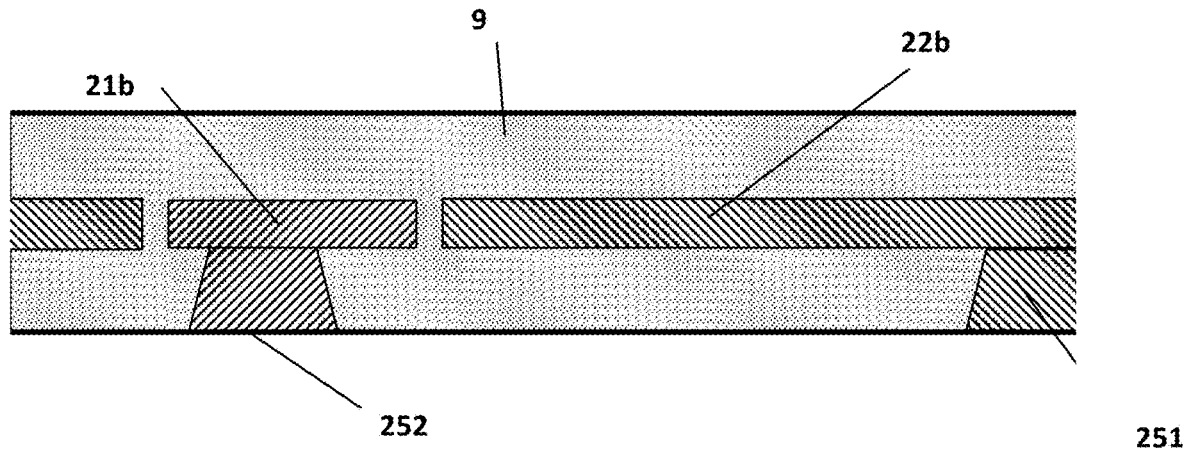
FIG. 23 is a sectional view taken along line A-A of FIG. 22.

FIG. 23 is a sectional view taken along line A-A of FIG. 22. As shown in FIG. 23, the windings 21b and 22b are both packaged in the insulating encapsulant 9, with the lower surface being provided with pads 251 to 254. The pads 252 and 254 are used to be electrically connected to the winding 21a, and the pads 251 and 253 are used to be electrically connected to the winding 22a. The electrical connection between the pads 251 to 254 and their respective windings 21 to 22 can be achieved using via plating or other metallizing methods. For example, the pad 251 and the winding 22b in FIG. 22 can be electrically connected using via plating, and so can the pad 252 and the winding 21b using via plating. Of course, the electrical connection can also be achieved using other metallizing methods.

It should be understood that the winding module shown in FIG. 23 can also be fabricated using a conventional PCB or laminated bus bar process, or using packaging processes such as a package process using a lead frame for packaging and extracting pads.

In this example, the crossed windings 21b and 22b may be integrally formed to improve the modular manufacturing process of the inductor, lower the cost, and improve the reliability of the overall structure, while simplifying the structure and facilitating the assembly process. It is also possible to form other conductive traces in the crossed-windings module. Pads can be formed over the crossed windings, and other elements, such as capacitors or resistors, can be arranged. This offers more flexible application options. The integration and space utilization of the inductor can be further improved.

Figure 24A:
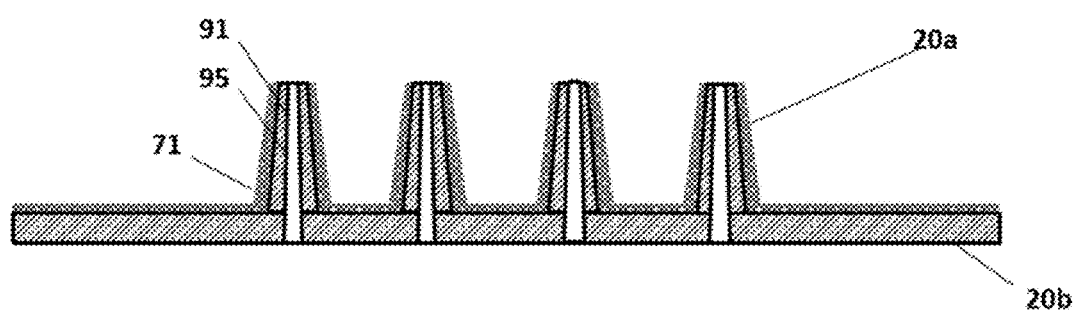
FIGS. 24a, 24b, 24c and 24d are schematic views showing a process of manufacturing an inversely coupled inductor according to an embodiment of the present disclosure.
Figure 24B:
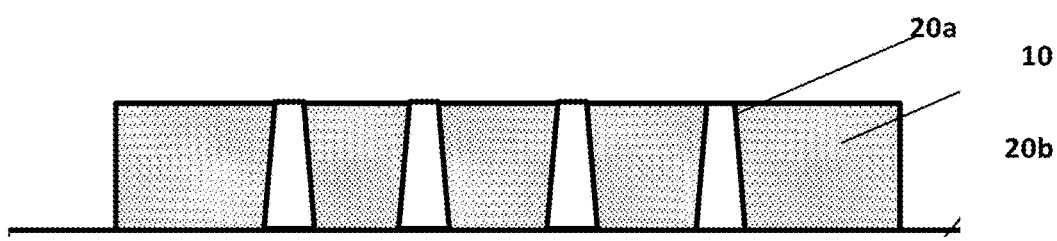

FIGS. 24a through 24d illustrate a method for fabricating a coupled inductor. A conductive structural member is given by a conductive member including a pillar 20a and a connecting piece 20b as shown in FIG. 24a or FIG. 24b. A plurality of pillars 20a are provided on a surface perpendicular to 20b, which may be made by, for example, etching on a copper sheet, or stamping, or welding or engraving or the like.

Further, it is also illustrated in FIG. 24a that in order to enhance the strength and other characteristics of the conductive leg 20a, a high-conductivity-material 95, such as copper or silver, may be coated on a high-strength material 91, such as steel. Thus, the rigidity and strength of the conductive leg 20a can be greatly improved, and the deformation of the conductive leg 20a can be reduced during the injection molding process. Although the conductivity of the core-reinforced structure 91 will be much worse than that of the high-conductivity-material 95, however, considering that, in the case of high frequency applications, electric currents flow mostly on the surface of the conductive leg 20a due to the skin effect, that is, most of the electric currents will be flowing in the highly conductive layer of 91, only a small amount of current flows in the core structure 91. Thus, this solution is suitable for the application of high frequency magnetic elements.

Additionally, a layer of other material 71 may be further coated on the outer surface of the conductive leg 20a and the connecting piece 20b before inject molding the upper magnetic material 10 as shown in FIG. 24b. The coated material 71 may be, e.g., a high-voltage-resistant insulating material to raise the voltage rating between the conductive legs 20a, or an etch-resistant material to avoid damaging the internal magnetic material characteristics when the connecting piece 20b is being etched.

Then, as shown in FIG. 24b, the magnetic material is injected into the conductive structural member shown in FIG. 24a using a mold. Since the leg 20a is structurally reliable because it is formed integrally with the connecting piece 20b, the impacts on the leg 20a during the injection molding of the magnetic material, e.g., dust type magnetic core material, can be controlled and absorbed. Particularly, when the leg 20a is of low height and a cylinder, particularly a conical cylinder, the displacement and deformation between the legs 20a are much smaller.

Figure 24C:
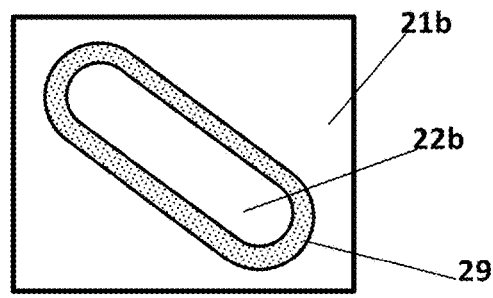

Then, as shown in FIG. 24c, a groove 29 is carved into the connecting plate 20b by etching or engraving, dividing the connecting plate into two partitions to form the cross between the windings outside the passage of the magnetic core.

Figure 24D:
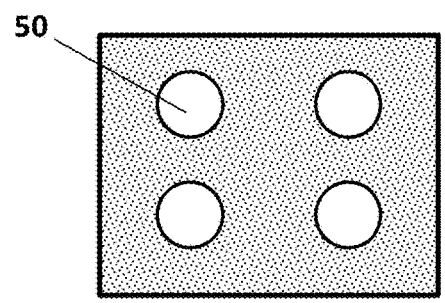

Finally, as shown in FIG. 24d, several pads 50 are formed at the other end of the passage.

It can be understood that cutting can also be performed according to the needs of the process, for example, cutting a molding member of a panel into individual magnetic units; or applying insulation treatment onto the surface after the cutting; or deflashing a conductive portion that is partially covered by magnetic material, i.e., removing a portion of the magnetic material to expose the conductive portion, such as the pads 50.

In general, the coupled inductor in the above examples have the following advantages: the crossing portion of the coupled inductor is outside the passage of the magnetic core, which facilitates the mutual insulation treatment of the crossing portion; the two-phase output pins of the coupled inductor are on the same side of the coupled inductor, offering convenience to the customer during practical application, and the improved symmetry of the two-phase circuit is conducive to current equalization; the fabrication of the windings and the magnetic core can happen in parallel, which facilitates modular product design, simplifies the process and reduces the cost. Moreover, since the windings in the passage are connected along the vertical direction to the windings for crossing outside the passage, the heat dissipation of the inductor in the vertical direction is facilitated.

FIGS. 25 to 28 are structural views of coupled inductors which are formed on the basis of the foregoing coupled inductors and have more phases. For ease of illustration, all descriptions are given using an example of integration of three coupled inductors. Of course, more coupled inductors can still be integrated as needed in practical applications. As shown in FIGS. 25 to 28, the magnetic core includes two side legs 10, and more of pillars 11 to 17, where the first winding and the second winding cross with each other on one of the pillars.

Figure 25:
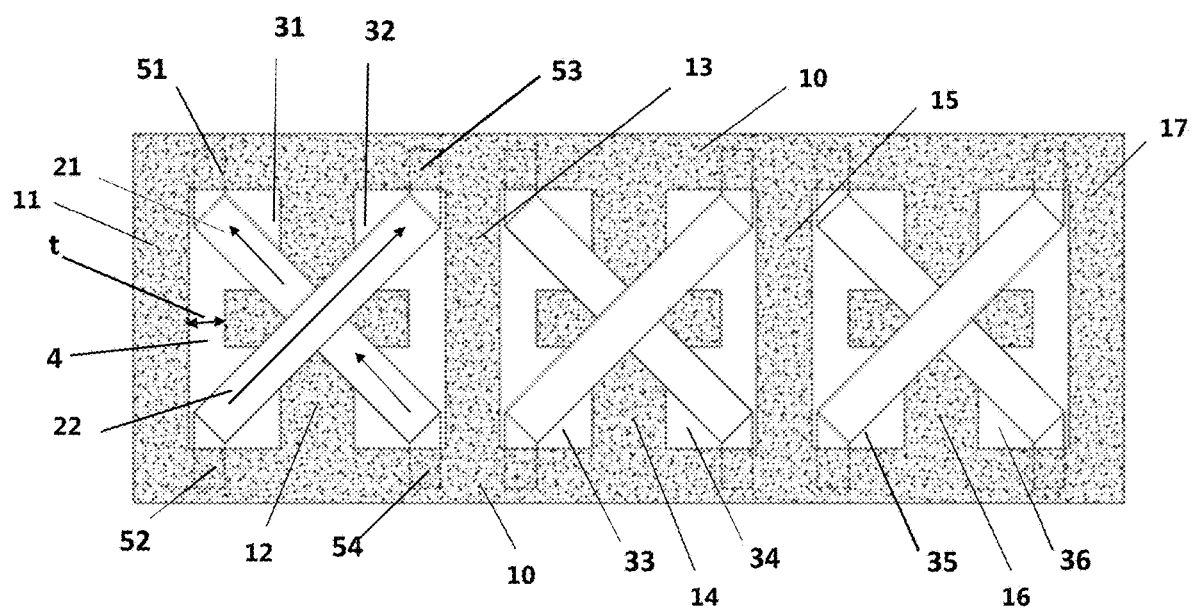
FIGS. 25, 26, 27 and 28 are schematic structural views of parts of multi-phase inversely coupled inductors according to embodiments of the present disclosure.

FIG. 25 is a schematic structural view of three coupled inductors integrated in a parallel connection, in which the pillars of two adjacent coupled inductors in tight contact are integrated together to realize magnetic loop multiplexing, thereby improving the utilization of individual magnetic loops in the multi-phase coupled inductor. This can increase the efficiency for an inductor of the same size, or reduce the size for an inductor of the same efficiency. Integration as such can shorten the total length from the left to the right of the multi-phase coupled inductor. For instance, in FIG. 25, the width of two pillars can be reduced. Moreover, the process clearance to be left when the discrete coupled inductor is arranged on the system board can be narrowed, and the size and footprint can be reduced.

Figure 26:
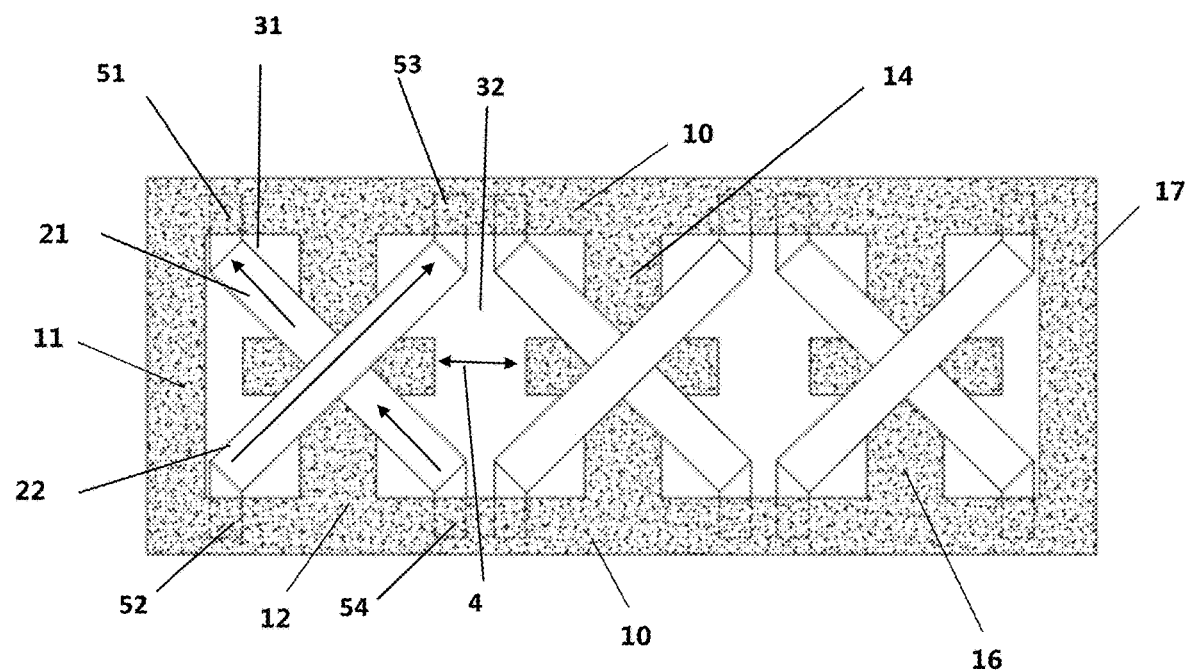

FIG. 26 is an improvement on the basis of FIG. 25, in which the pillars that are adjacent to any two coupled inductors have been canceled, leaving magnetic loop multiplexing to other remaining pillars. Specifically, in FIG. 26, the passages 32 and 33 in FIG. 25 are merged into one passage, and so are the passages 34 and 35 in FIG. 26. The left-to-right dimension of the multi-phase integrated inductor is further reduced, and so is its size.

Figure 27:
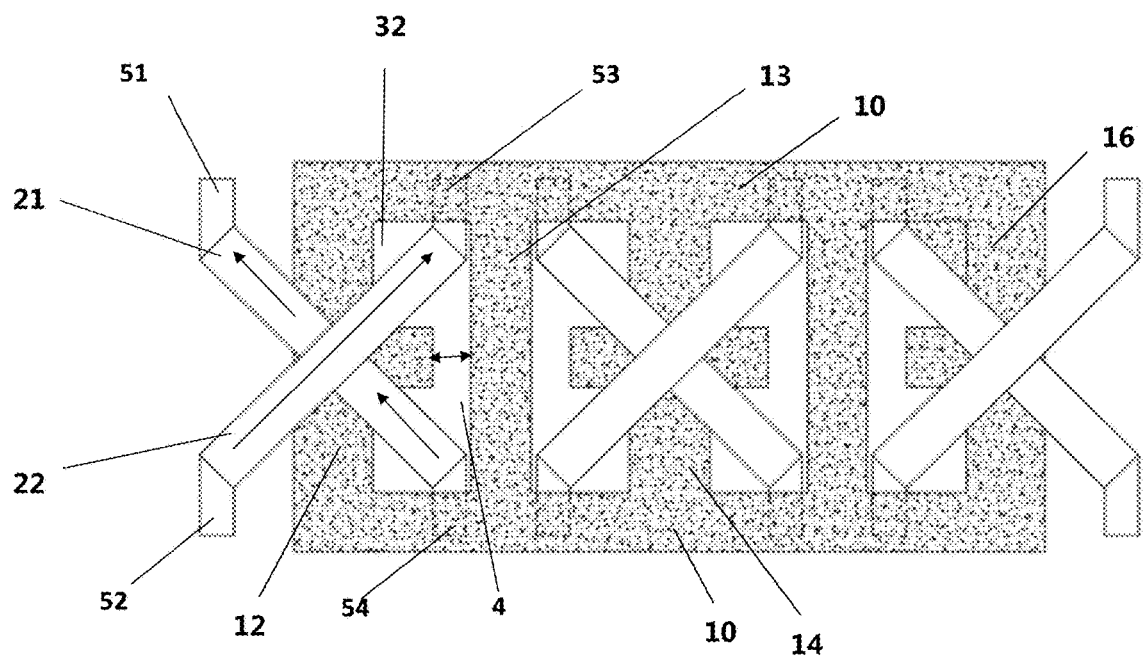

FIG. 27 is an improvement on the basis of FIG. 25, in which the left and right side pillars of the multi-phase integrated inductor are canceled to reduce the size and footprint of the inductor, leaving magnetic loop multiplexing to other remaining pillars.

Figure 28:
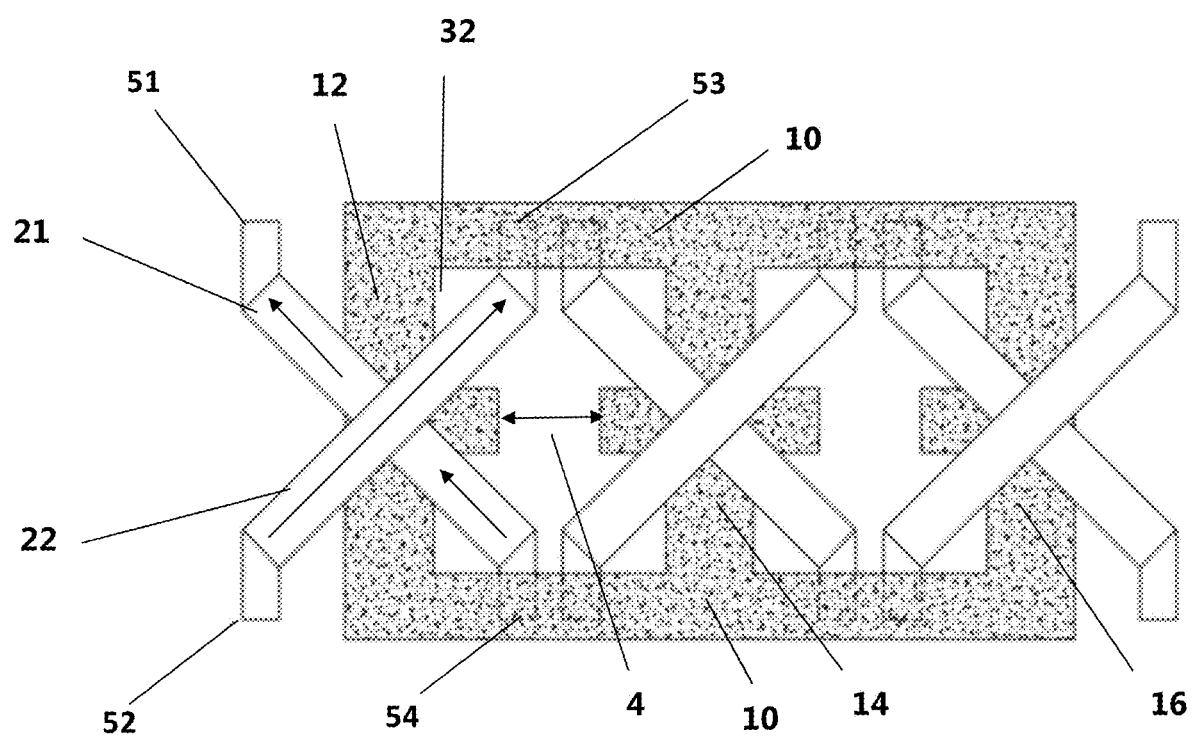

FIG. 28 is an improvement on the basis of FIG. 25, in which all pillars without windings are canceled, leaving only the pillars 12, 14 and 16 in FIG. 28. Two-phase windings are respectively arranged on the pillars 12, 14 and 16, and a multi-phase coupled inductor is formed by mutual magnetic loop multiplexing, thereby further reducing the size and footprint of the inductor.

Figure 29:
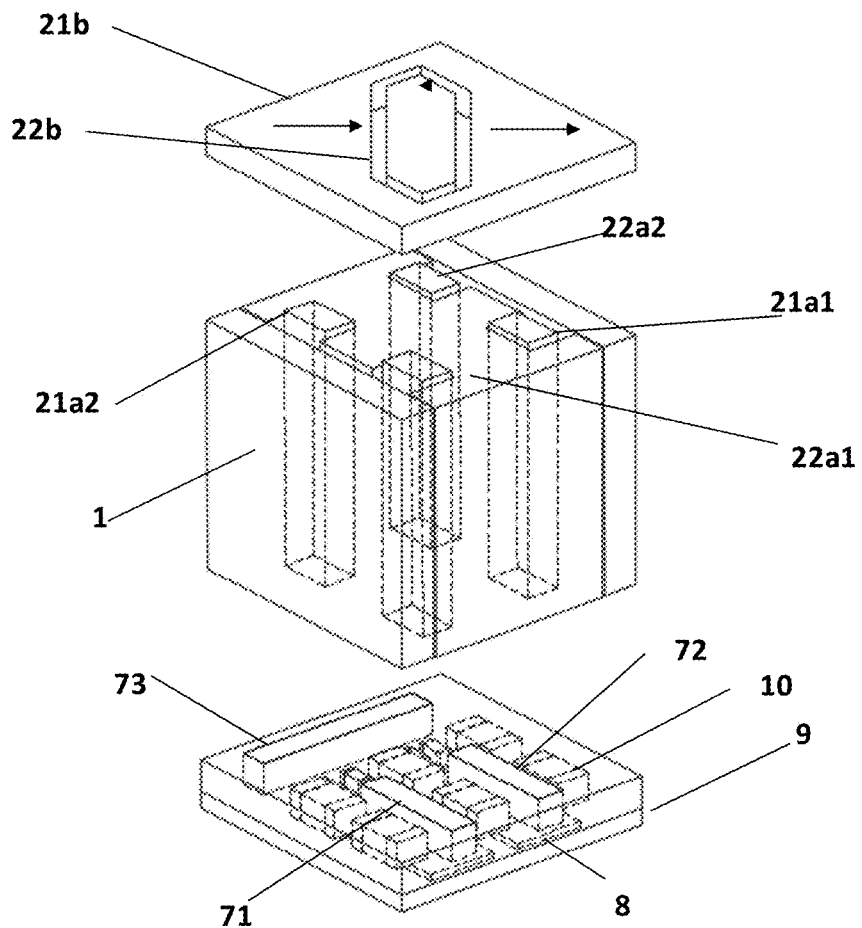
FIG. 29 is a schematic structural view of a power supply module according to an embodiment of the present disclosure.
Figure 30A:
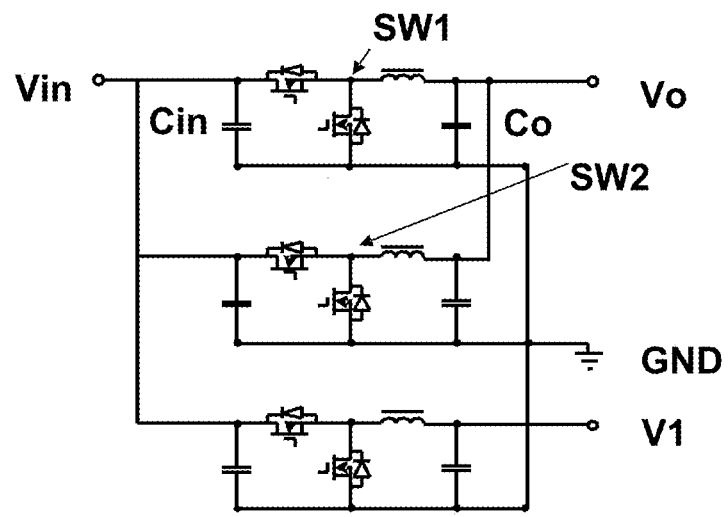
FIGS. 30a, 30b and 30c are some of the circuitry diagrams according to embodiments of the present disclosure.

FIG. 29 offers a schematic structural view showing formation of a stacked power supply module based on the coupled inductor proposed in the present disclosure. The two-phase parallel buck circuit shown in FIG. 30a is described. The parallel operation of the two-phase buck circuit is realized by the chip 8 packaged in the insulating packaging material 9 at the bottom. The two-phase buck main circuit may be implemented by a package of a plurality of chips 8 or a single chip 8. The conductive legs 71 and 72 are electrically connected to a middle point SW1 of a first switching cell and a middle point SW2 of a second switching cell of the chip 8, respectively. A plurality of input capacitors 10 may also be arranged above or within the package, the pins of which are electrically coupled to the Vin and GND pins in FIG. 30a.

The winding 22a1 of the coupled inductor in the upper part of FIG. 29 is electrically connected to the conductive leg 71, and the winding 21a1 is electrically connected to the conductive leg 72. The winding 22a1 and the winding 22a2 are electrically connected to the winding 22b, and the winding 21a2 and the winding 21a1 are electrically connected to the winding 21b. By arranging the windings 21a and 22b to cross with each other outside the passage, the same type terminals of the windings (i.e., the winding 21a1 and the winding 22a1) can be distributed on the same side of the inductor, serving as two input terminals that are electrically connected to the first switching cell and the second switching cell, respectively. The windings 21a2 and 22a2 are electrically connected to the conductive leg 73. The conductive member 73 may form a pad (not shown) at the bottom of the package to form an external output terminal for the overall power module.

Of course, the winding 22a1 in FIG. 29 can also be directly and electrically connected to the pad, which in turn is electrically connected to the SW1, on the surface of the package chip module 9, and the winding 21a1 can be directly connected to the pad, which in turn is electrically connected to the SW2, on the surface of the package chip module 9, eliminating the conductive legs 71 and 72. The windings 21a2 and 22a2 can be directly and electrically connected to the pad, which in turn is electrically connected to the output terminals, on the surface of the package insulator 1, eliminating the copper block 73. In this embodiment, a complete power module has been structured on the basis of the foregoing various coupled inductors. The SW terminals are drawn from the upper side of the package of the chip 8, and then upward to be electrically connected with the windings 21a1 and 22a1 of the inductor. Then output currents are drawn out from the same side of the module through the crossing of the first windings 22b and 21b, and then through the windings 21a2 and 22a2. The two-phase output currents of the overall module are drawn out from the same side, which is convenient for customer application, and good for the symmetry of the two-phase circuit. In addition, most of the power current of the overall module flows in the vertical direction, offering short current path, small impedance and desirable heat dissipation towards upwards and downwards. The overall assembly is easy to install, compact in structure and high in power density.

Figure 30B:
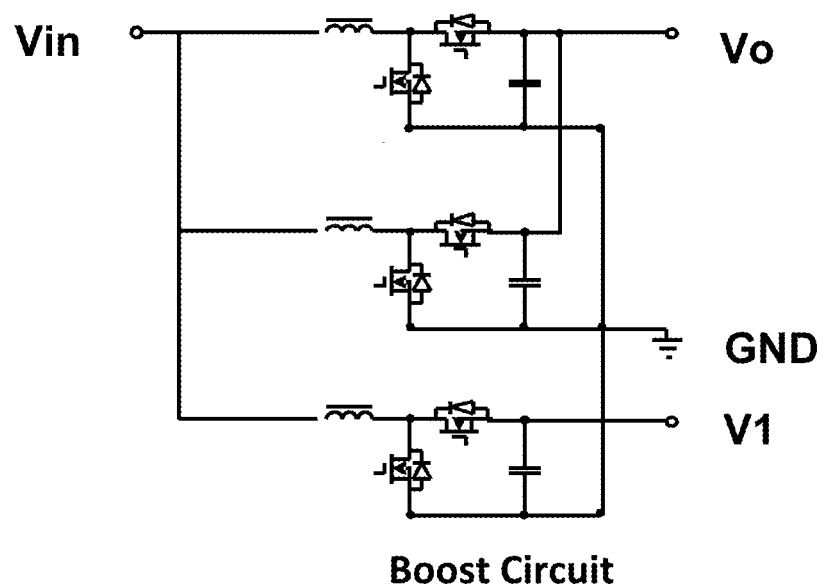
Figure 30C:
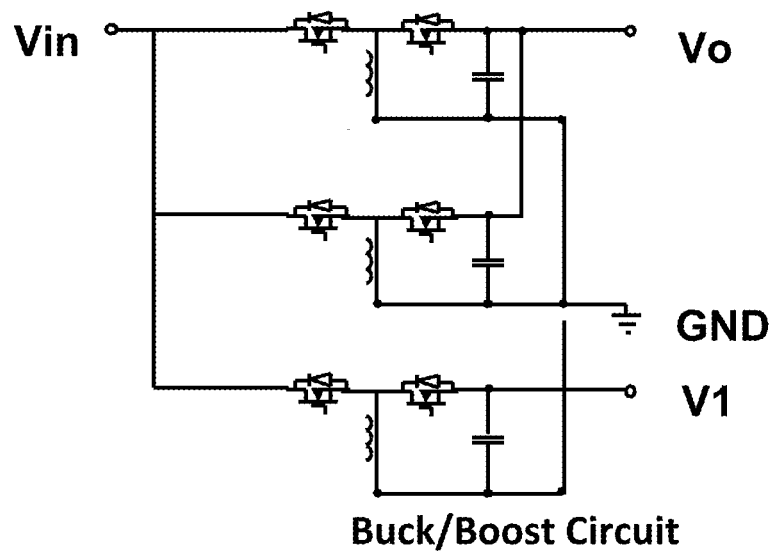

FIGS. 30a to 30c illustrate some of the application circuits of the present disclosure, but the applications are not limited to these circuits. FIG. 30a illustrates a buck circuit in which Cin represents an input capacitor, Co represents an output capacitor, Vin represents the positive input of the power supply module, GND represents the negative input of the power supply module, Vo represents the positive output of the power supply module, SW1 represents the midpoint of the first switching cell, SW2 represents the midpoint of the second switching cell, where SW1 and SW2 are electrically connected to the input terminals (i.e., a dotted terminal of the first winding and a non-dotted terminal of the second winding) of the coupled inductor, and V1 represents a positive output voltage of the power supply module having an output voltage different from that of Vo. FIG. 30b illustrates a Boost circuit. FIG. 30c illustrates a Buck/Boost circuit. Although the power supply module has been described above by taking the multi-phase parallel operation of the circuit shown in FIG. 30a as an example, the coupled inductor of the present disclosure can also be applied in other circuit topologies. For example, other circuits may include, but not limited to, the inversely coupled inductors in the circuits such as Cuk, flyback, switch capacitor, LLC and the like. By referring to similar design and analysis, it is possible to achieve similar performance and effect improvements.

Figure 31A:
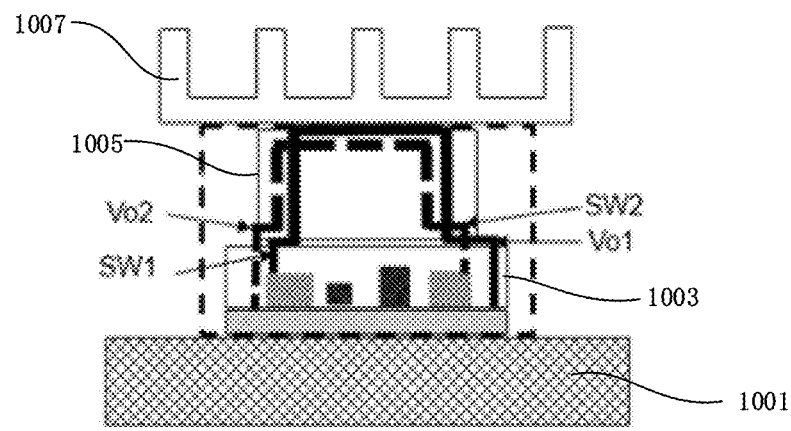
FIGS. 31a, 31b, 31c, 31d are some schematic structural views of another power supply module.

Further, FIG. 31a shows a structure of a power supply module. As shown in FIG. 31a, a packaged chip module 1003, a coupled inductor 1005 (by way of example rather than limitation, an inversely coupled inductor) and a heatsink 1007 are stacked in the same order on the main board 1001. Thus, the heat, which is primarily generated by the packaged chip module 1003 encapsulating multiple switching cells, can be conducted via the coupled inductor 1005 to, and be dispersed by, the heatsink 1007, thereby ensuring normal operation of the packaged chip module 1003. However, since the coupled inductor 1005 in a power supply module structured as such has to conduct the heat, this type of indirect conduction of heat also poses a more stringent challenge to the design of the heat dissipation.

Figure 31B:
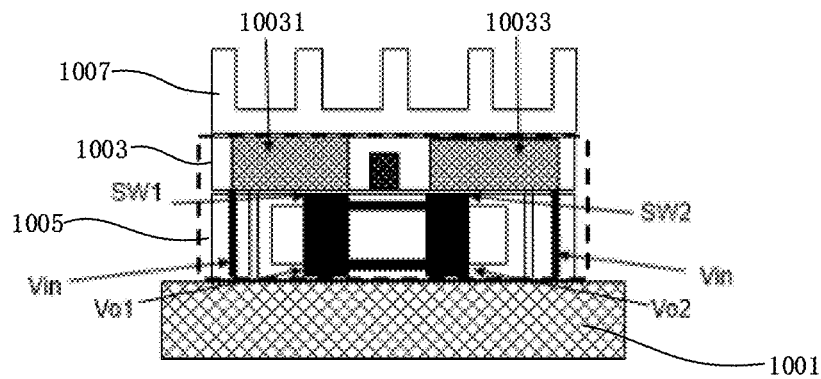
Figure 31C:
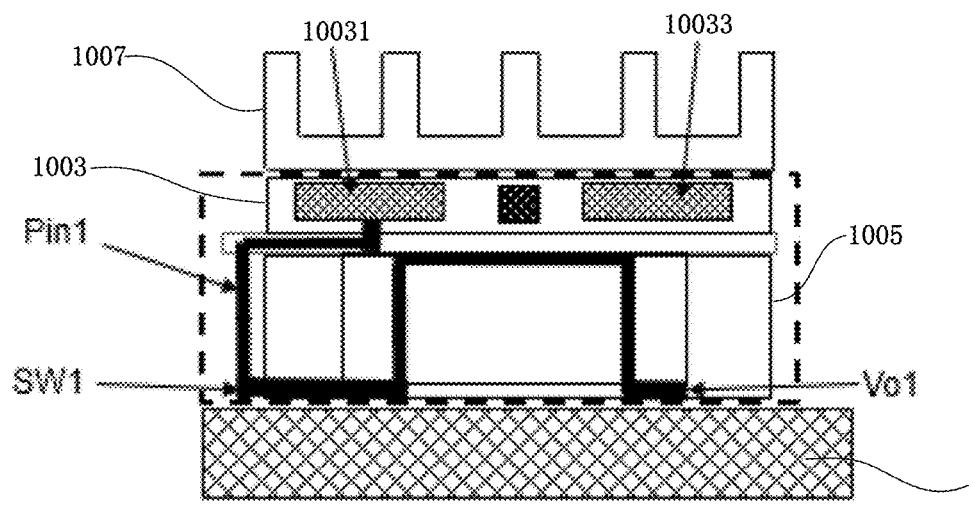
Figure 31D:
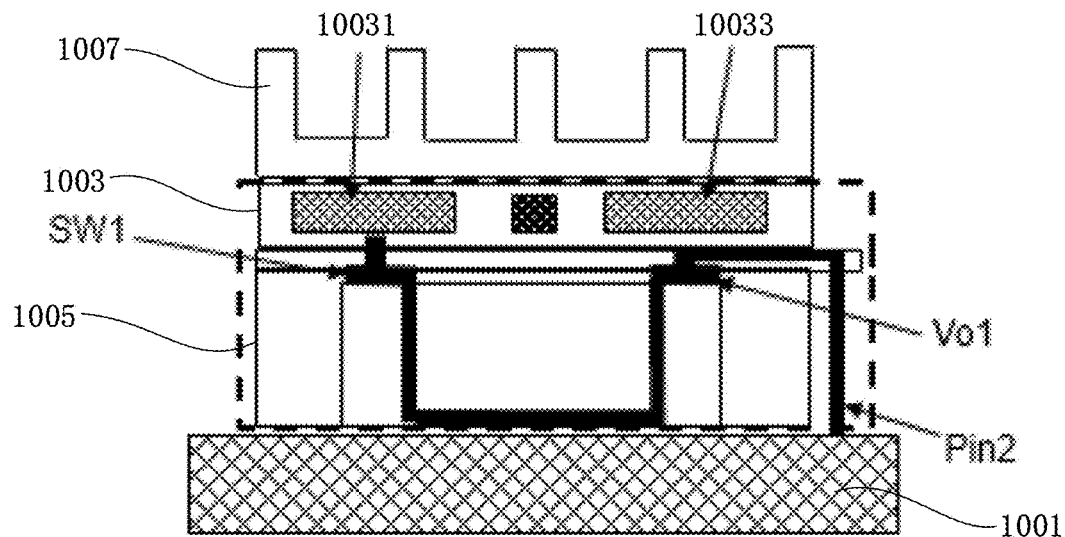

For the purpose of avoiding the defect in the structure shown in FIG. 31a, FIGS. 31b to 31d provide another power supply module structure that can improve the heat dissipation performance for the power supply module. As shown in FIGS. 31b to 31d, a coupled inductor 1005, a packaged chip module 1003 (which includes switching cells 10031 and 10033) and a heatsink 1007 are stacked in the same order on the main board 1001, so that the heat generated by the packaged chip module 1003 can be immediately dispersed via the heatsink 1007, thereby ensuring the normal operation of the packaged chip module 1003.

Since the coupled inductor in FIG. 31c and FIG. 31d are of a conventional type in that all lead out pins are on the same end face, extra connecting wires (e.g., the black thick solid lines indicated by Pin1 in FIG. 31c and Pin2 in FIG. 31d) are needed to realize the connection between the switching cells and the inductor, or the connection between the lead out pin of the inductor and the output terminal of the module.

In order to reduce the wires (e.g., the black thick solid lines indicated by Pin1 and Pin2 in the drawings), so as to reduce direct current (DC) impedance and improve space utilization, the lead out pins of the coupled inductor 1005 are arranged on two end faces of the inductor, with a dotted terminal of the first winding and a non-dotted terminal of the second winding being arranged on the same end face of the coupled inductor 1005, as shown in FIG. 31b.

Specifically, the coupled inductor provided in the present embodiment includes a magnetic core (e.g., a flat type magnetic core), a first winding (e.g., a one-turn or multi-turn winding) and a second winding (e.g., a one-turn or multi-turn winding). The magnetic core includes a first end face and a second end face, which are oppositely arranged. A first passage and a second passage are formed, which extend along a first direction and are arranged in parallel, penetrating through the first end face and the second end face. The first winding passes through the first passage for a number of times less by one than that of through the second passage. The second winding passes through the second passage for a number of times less by one than that of through the first passage, and the second winding passes through the second passage for a number of times equal to that of the first winding passing through the first passage. Two terminals of the first winding serve as the first terminal and second terminal of the coupled inductor, respectively, and two terminals of the second winding serve as the third terminal and fourth terminal of the coupled inductor, respectively. The first and third terminals of the coupled inductor are located on the first end face, and the second and fourth terminals of the coupled inductor are located on the second end face. Additionally, two terminals located on the same end face are one dotted terminal of the first winding and one non-dotted terminal of the second winding.

For example, the coupled inductor may be a hexahedron structure whose length and width are both larger than the height. Specifically, the coupled inductor includes a top end face, a bottom end face, a left side face, a right side face, a front side face and a rear side face. The coupled inductor is provided with a left passage and a right passage, both of which extend along the height direction and are arranged in parallel, and the left and right passage both penetrates the top end face and the bottom end face. A front winding and a rear winding are arranged in parallel in the left and right passage. The front winding runs through the left passage by one time and through the right passage by two times, while the rear winding runs through the left passage by two times and through the right passage by one time. The two terminals of the front winding and the rear winding are separately located on two end faces, i.e., the top end face and the bottom end face. The top terminal and bottom terminal of the front winding serve as the first terminal and the second terminal of the coupled inductor, respectively, the top terminal and bottom terminal of the rear winding serve as the third terminal and the fourth terminal of the coupled inductor, respectively. Additionally, one of the top terminal of the front winding and the top terminal of the rear winding is a dotted terminal while the other is a non-dotted terminal.

In a specific application, the first terminal of the first winding is connected to the first switching cell, the third terminal of the second winding is connected to the second switching cell, while the second terminal of the first winding and the fourth terminal of the second winding serve as the output for the power supply module. For the purpose of facilitating connection works, optionally, the first to fourth terminals of the first and second windings include first to fourth pads for electrical connections, where the first to fourth pads are used to be soldered to the main board, the packaged chip module, etc., respectively.

In the coupled inductor of this embodiment, the input/output pins are located separately on the top end face and bottom end face, eliminating the need for any extra pin or wire in realizing the electrical connection for the packaged chip module, the coupled inductor and the main board, which is advantageous in reducing the DC impedance and optimizing the space utilization for the power supply module.

Of course, in some examples, the dotted and non-dotted terminals of the coupled inductor in the power supply module may also be arranged on the opposite end faces of the coupled inductor, with electrical connections among various components by increasing the length of the connecting wires or including extra pins in the packaged chip module, as shown in FIG. 31c and FIG. 31d.

Now, several specific structures that can fulfill the requirements of the coupled inductor in FIG. 31b will be briefly introduced. However, it should be understood that the following specific implementations are not specific limitations on the present disclosure. For instance, the inversely coupled inductor shown in FIG. 9 can equally fulfill the above inventive concept. Therefore, subject to the above inventive concept, those skilled can freely replace any feature in various embodiments, or freely recombine features from different embodiments.

Figure 32A:
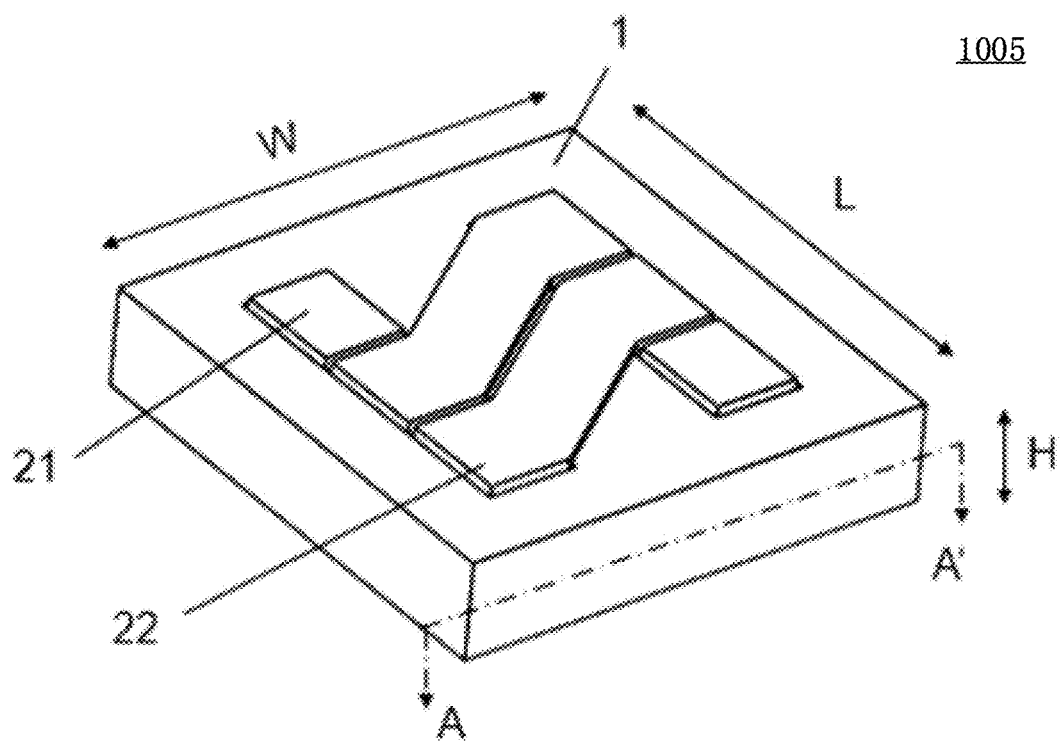
FIG. 32a is a schematic structural view of a coupled inductor according to an embodiment of the present disclosure.
Figure 32B:
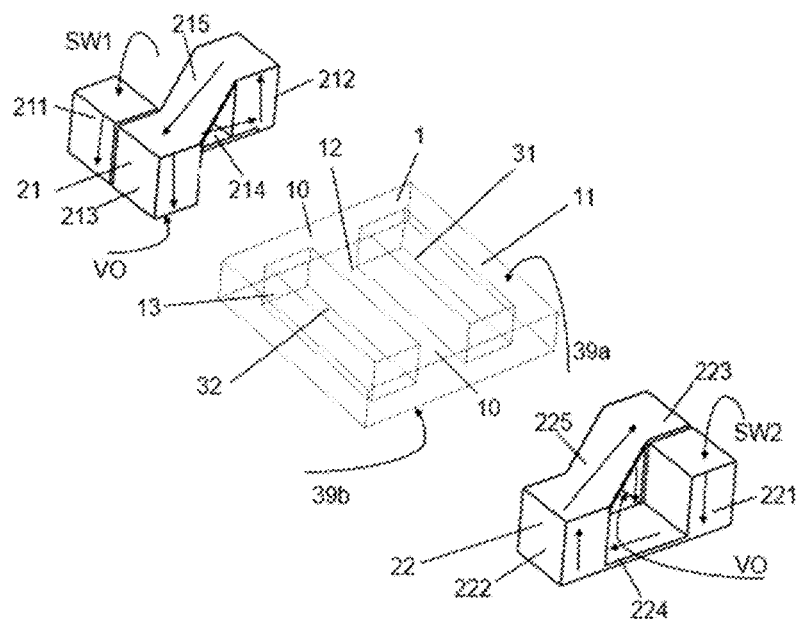
Figure 32C:
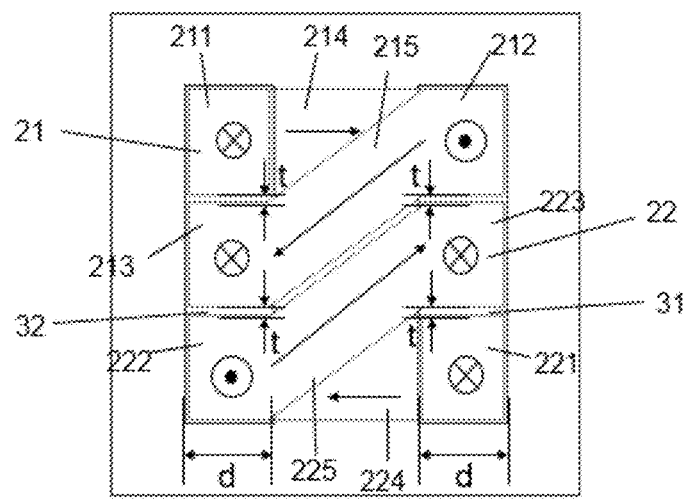

FIG. 32a shows an illustrative structure of a coupled inductor, FIG. 32b is an exploded view of the coupled inductor, and FIG. 32c is a top view of FIG. 32a. The coupled inductor 1005 shown in FIG. 32a to FIG. 32c differs from the inversely coupled inductor shown in FIG. 9 and FIG. 10 by that the first winding 21 and the second winding 22 of the coupled inductor 1005 in FIG. 32a do not intersect, which helps the coupled inductor 1005 to cut size in the height direction, improving applicability to occasions where low-profile is required. Additionally, insulation is not necessary between the first winding 21 and the second winding 22, simplifying the fabrication work.

Specifically, as shown in FIG. 32a to FIG. 32c, the coupled inductor 1005 includes: a magnetic core 1, a first winding 21 and a second winding 22. The magnetic core 1 includes three pillars, i.e., pillars 11 to 13, where two side legs 10 and the pillars 11 and 12 form the first passage 31, and the two side legs 10 and the pillars 12 and 13 form a second passage 32. That is, the magnetic core forms an "8" shaped magnetic loop. In some embodiments, the magnetic core may also be an "E" shaped magnetic core. The first passage 31 and the second passage 32 have two opposite end faces, namely a first end face 39a of the passage and a second end face 39b of the passage.

The magnetic core material that the magnetic core 1 is made from may be dust type core material with distributed air gaps, such as iron dust core, alloy dust core, amorphous dust core, nano-crystalline dust core, etc., or a combination thereof, which have low magnetic permeability, typically below 200.

The first winding 21 includes a first portion 211, a second portion 212, a third portion 213, a fourth portion 214 joining the first portion and the second portion, and a fifth portion 215 joining the second portion and the third portion. The second winding 22 includes a first portion 221, a second portion 222, a third portion 223, a fourth portion 224 joining the first portion and the second portion, and a fifth portion 225 joining the second portion and the third portion.

The second portion 212 of the first winding 21, the first portion 221 of the second winding 22 and the third portion 223 of the second winding 22 all penetrate the first passage 31. The first portion 211 of the first winding 21, the third portion 213 of the first winding 21 and the second portion 222 of the second winding 22 all penetrate the second passage 32.

The fifth portion 215 of the first winding 21 and the fifth portion 225 of the second winding 22 are both on the side of the first end face 39a outside the passage, respectively realizing electrical connections between the second portion 212 and the third portion 213 of the first winding 21, and between the second portion 222 and the third portion 223 of the second winding 22. The fourth portion 214 of the first winding 21 and the fourth portion 224 of the second winding 22 are both on the side of the second end face 39b outside the passage, respectively realizing electrical connections between the first portion 211 and the second portion 212 of the first winding 21, and between the first portion 221 and the second portion 222 of the second winding 22.

That is, the first winding 21 runs through the first passage 31 for one time and through the second passage 32 for two times, while the second winding 22 runs through the first passage 31 for two times and through the second passage 32 for one time. Of course, in some embodiments, the first winding and the second winding may also run through the first and second passages for more times, as long as the first winding runs through the first passage for N times and through the second passage for N+1 times while the second winding runs through the first passage for N+1 times and through the second passage for N times, where N is a natural number greater than or equal to one.

As shown in FIG. 32b, a pad (351) is formed at the first portion 211 of the first winding 21 in the first end face 39a outside the passage, and the first portion 211 serves as a first input terminal for the coupled inductor and is connected to the SW1. A pad (353) is also formed at the first portion 221 of the second winding in the first end face 39a outside the passage, and the first portion 221 serves as a second input terminal for the coupled inductor and is connected to the SW2. Thus, both input terminals SW1 and SW2 of the coupled inductor are provided in the same face 39a. A pad (352) is formed at the third portion 213 of the first winding in the second end face 39b outside the passage, and the third portion 213 serves as a first output terminal for the coupled inductor and is connected to the Vo. A pad 054) is also formed at the third portion 223 of the second winding in the second end face 39b outside the passage, and the third portion 223 serves as a second output terminal for the coupled inductor and is connected to the Vo. Thus, both output terminals Vo of the coupled inductor are also provided in the same face 39b. Since the first end face 39a and the second end face 39b are opposite faces, the two pads of the same winding are provided in different faces. When a current flows from SW1 and SW2 to Vo, the first winding and the second winding have opposite current directions in the first passage 31, as well as in the second passage 32. Thus, the first winding and the second winding create in the magnetic core magnetic fluxes that are in opposite directions and cancel out each other. That is, when SW1 and SW2 are provided in the same face as inputs, one of the pad (351) where SW1 is located and the pad (353) where SW2 is located is a dotted terminal for the coupled inductor while the other is a non-dotted terminal. That is, a dotted and a non-dotted terminal are provided in the same end face for the coupled inductor in this embodiment. It should be understood that this embodiment does not limit any other aspect such as the size, shape or material of the pads.

As shown in FIG. 32b and FIG. 32c, the arrows in the figures indicate the directions in which the electric currents flow through the first winding 21 and the second winding 22, i.e., from SW1 to Vo and from SW2 to Vo. Since the currents in the first winding 21 and the second winding 22 encircling the pillar 12 of the magnetic core are in opposite directions, the magnetic fluxes in the pillar created by the first winding 21 and the second winding 22 cancel out each other.

Figure 32D:
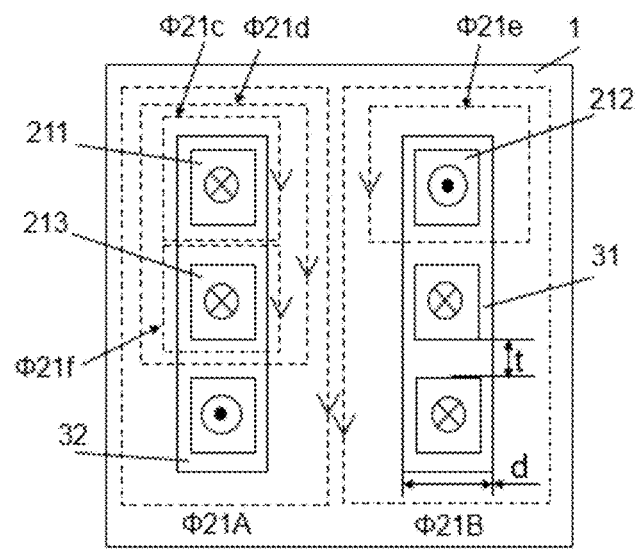
FIG. 32d is a sectional view along A-A' in FIG. 32a, showing magnetic flux distribution of the first winding.
Figure 32E:
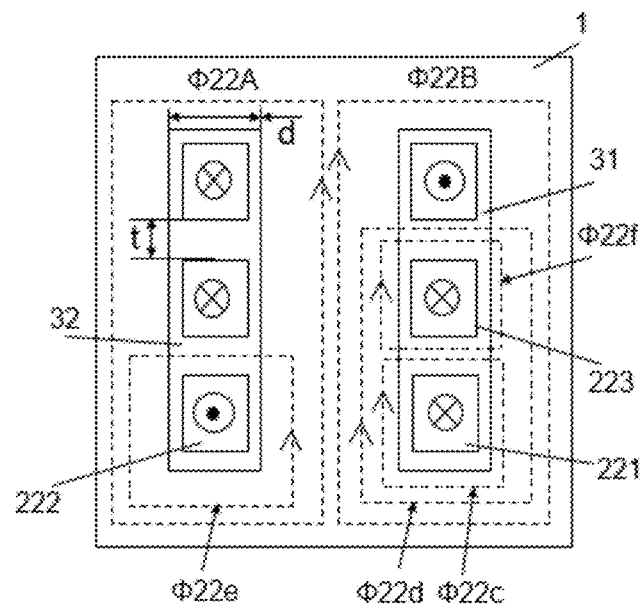
FIG. 32e is a sectional view along A-A' in FIG. 32a, showing magnetic flux distribution of the second winding.

Reference is made to both FIG. 32d and FIG. 32e, which are a sectional view and a distribution of magnetic flux along location A-A' of the coupled inductor in FIG. 32a. In FIG. 32d, dotted lines with arrows represent the distribution of magnetic flux of the first winding 21, $\Phi$21A and $\Phi$21B are main magnetic fluxes of the first winding 21, and $\Phi$21c, $\Phi$21d, $\Phi$21e and $\Phi$21f are leakage magnetic fluxes of the first winding. The main magnetic fluxes are defined as magnetic fluxes of the first winding that are coupled with the second winding, and the leakage magnetic fluxes are defined as magnetic fluxes of the first winding that are not coupled with the second winding. In FIG. 32e, dotted lines with arrows represent the distribution of magnetic flux of the second winding 22, $\Phi$22A and $\Phi$22B are main magnetic fluxes of the second winding 22, and $\Phi$22c, $\Phi$22d, $\Phi$22e and $\Phi$22f are leakage magnetic fluxes of the second winding. As can be known with reference to FIG. 32d and FIG. 32e, the main magnetic fluxes $\Phi$21A and $\Phi$21B in FIG. 32d are in an opposite direction of, and cancels out, the main magnetic fluxes $\Phi$22A and $\Phi$22B in FIG. 32e.

In this embodiment, as shown in FIG. 32c to FIG. 32e, the magnitudes of the leakage magnetic fluxes $\Phi$21c, $\Phi$21d, $\Phi$21e and $\Phi$21f of the first winding 21 are associated with: a spacing t between the third portion 213 of the first winding and the second portion 222 of the second winding 22; a spacing t between the second portion 212 of the first winding and the third portion 223 of the second winding; a width d of the first passage 31 of the magnetic core; and a width d of the second passage 32. Assuming the size of d remains unchanged, then a larger spacing t leads to a larger leakage inductance and a weaker coupling, while a smaller spacing t leads to a smaller leakage inductance and a stronger coupling. For the same reason, assuming the size of the spacing t remains unchanged, and then a larger passage width d leads to a smaller leakage inductance and a stronger coupling, while a smaller passage width d leads to a larger leakage inductance and a weaker coupling. The altering and toning of the leakage magnetic fluxes $\Phi$22c, $\Phi$22d, $\Phi$22e and $\Phi$22f of the second winding 22 is similar to those for the leakage magnetic flux of the first winding 21, which will not be repeated herein.

Figure 32F:
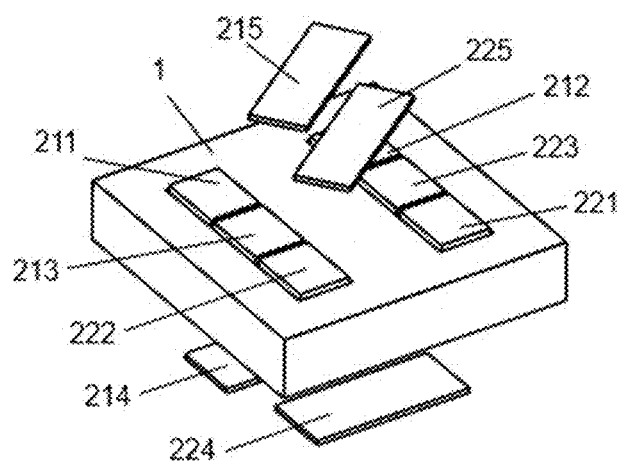

FIG. 32f illustrates an optional fabricating method for the coupled inductor in FIG. 32a. As shown in FIG. 32f, the magnetic core 1 is integrally formed from dust type core material with distributed air gaps. Then, the second portion 212 of the first winding, the first portion 221 and the third portion 223 of the second winding are assembled in the first passage 31 of the magnetic core 1. The first portion 211 and the third portion 213 of the first winding and the second portion 222 of the second winding are assembled in the second passage 32 of the magnetic core 1. Then, the portions 214 and 215, which join the first portion, second portion and third portion of the first winding 21, are assembled, e.g., by means of soldering, and the portions 224 and 225, which join the first portion, second portion and third portion of the second winding 22, are assembled by means of soldering, etc.

In some examples, the coupled inductor in FIG. 32a may also be fabricated using the following: integrally forming the first to third portions of the first winding 21, the first to third portions of the second winding 22, and the magnetic core 1 with distributed air gaps together, and then combining the portions 214 and 215, which join the first to third portions of the first winding 21, and the portions 224 and 225, which join the first to third portions of the second winding 22, by means such as soldering.

Figure 33A:
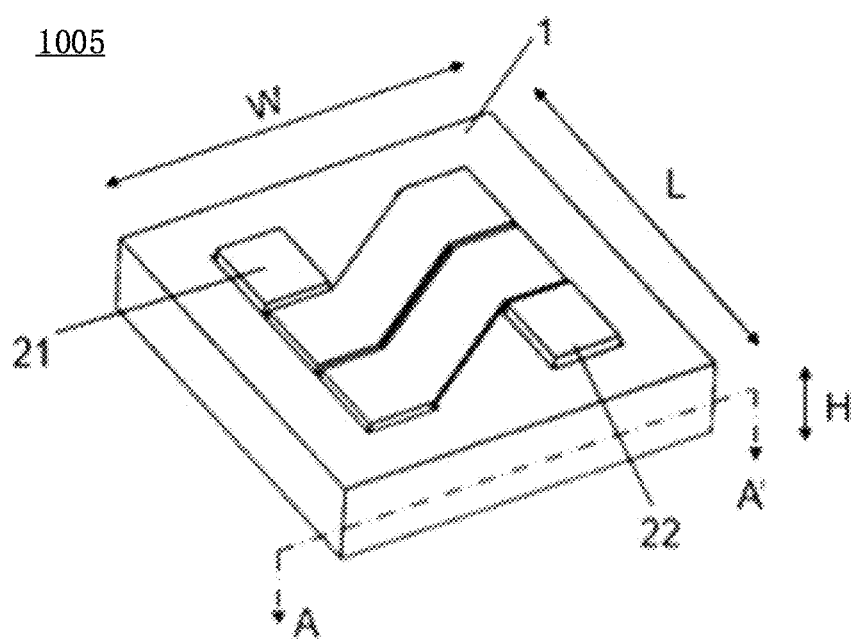
FIG. 33a is a schematic structural view of another coupled inductor according to an embodiment of the present disclosure.
Figure 33B:
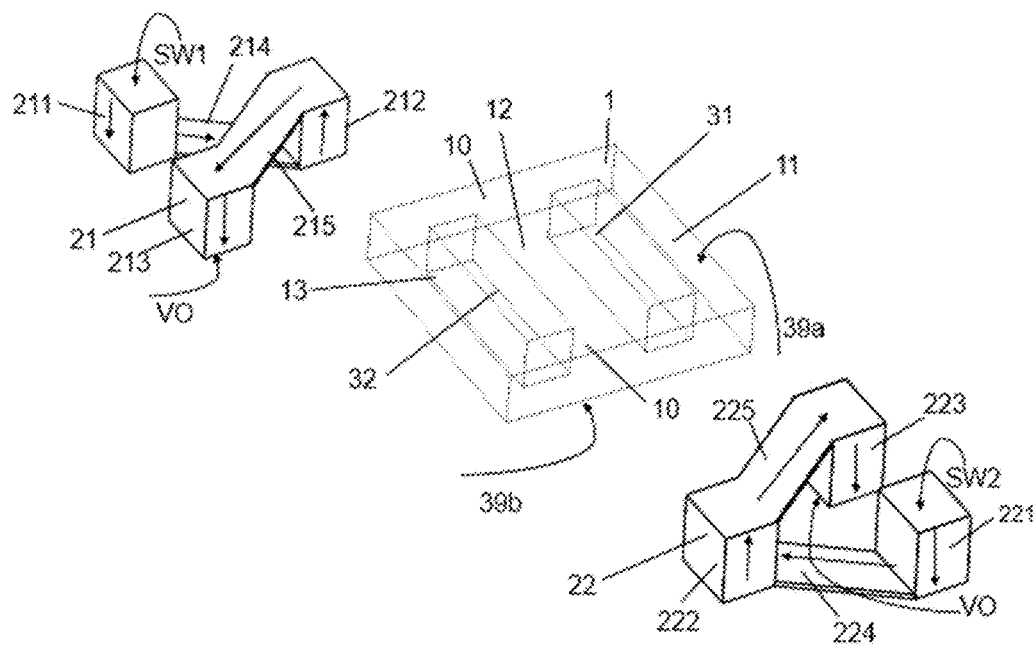
Figure 33C:
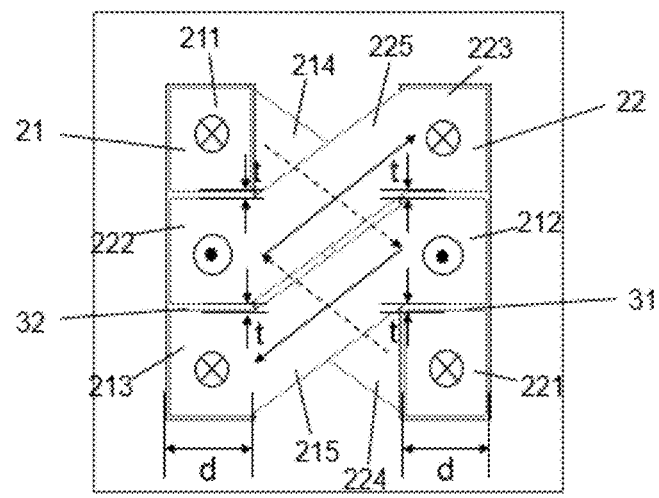
Figure 33D:
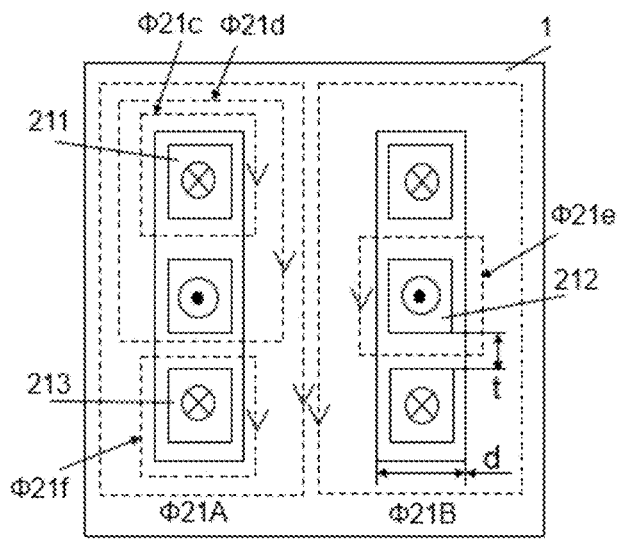
FIG. 33d is a sectional view along A-A' in FIG. 33a, showing magnetic flux distribution of the first winding.
Figure 33E:
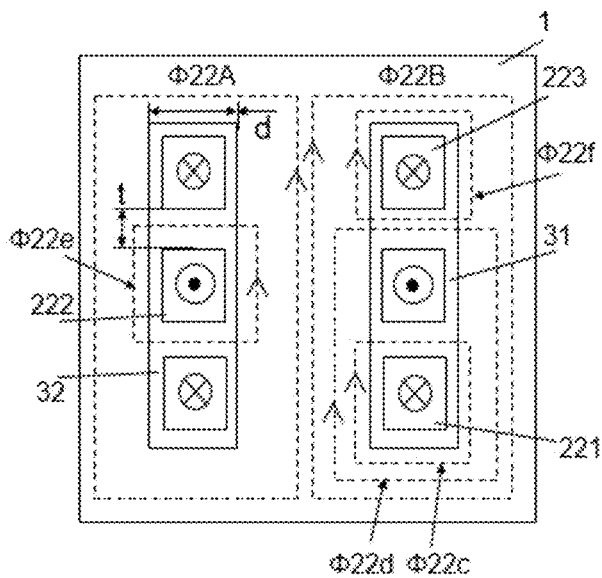
FIG. 33e is a sectional view along A-A' in FIG. 33a, showing a distribution of magnetic flux of the second winding.

FIG. 33a illustrates an exemplary structure of another coupled inductor. FIG. 33b is an exploded view of the inversely coupled inductor shown in FIG. 33a, FIG. 33c is a top view of the FIG. 33a, FIG. 33d and FIG. 33e are a sectional view and a distribution diagram of magnetic fluxes along location A-A' of FIG. 33a. The coupled inductor of this embodiment differs from the coupled inductor 1005 in FIG. 32a by the interleaving between the first winding 21 and the second winding 22 of the coupled inductor of this embodiment, which is intended to further reduce the leakage inductance and enhance the coupling.

Specifically, as compared with FIG. 32b, the second portion 212 of the first winding in FIG. 33b has swapped position with the third portion 223 of the second winding, and the third portion 213 of the first winding 21 has swapped position with the second portion 222 of the second winding 22. Correspondingly, the fourth and fifth portions 214, 215, 224 and 225, which join the first, second and third portions of the windings, have also been re-deployed.

As shown in FIGS. 33d to 33e, the magnetic flux paths have become somewhat different as the windings have changed places. Referring to FIG. 33d, the main magnetic fluxes $\Phi$21A and $\Phi$21B of the first winding 21 are distributed identically as the main magnetic fluxes of the first winding 21 in FIG. 32c. In this embodiment, $\Phi$21c, $\Phi$21e and $\Phi$21f are leakage magnetic fluxes of the first winding 21. The magnetic flux $\Phi$21d in this embodiment belongs to the main magnetic flux between the first portion of the first winding 21 and the second portion of the second winding. It should be noted in this embodiment that the main magnetic fluxes between the second portion of the first winding 21 and the first and third portions of the second winding 22, as well as the third portion of the first winding 21 and the second portion of the second winding 22, are not shown.

Referring to FIG. 33e, the main magnetic fluxes $\Phi$22A and $\Phi$22B of the second winding 22 are also distributed identically as the main magnetic fluxes of the second winding 22 in FIG. 32c. In this embodiment, $\Phi$22c, $\Phi$22e and $\Phi$22f are leakage magnetic fluxes of the second winding 22. The magnetic flux $\Phi$22d in this embodiment belongs to the main magnetic flux between the first portion of the second winding and the second portion of the first winding. For the same reason, in this embodiment, the main magnetic fluxes between the second portion of the second winding 22 and the first and third portions of the first winding 21, as well as the third portion of the second winding 22 and the second portion of the first winding 21, are not shown. In this embodiment, the magnitude of the leakage inductance is toned in the same way as the coupled inductor in FIG. 32a, so is the fabricating process of the coupled inductor, none of which will be repeated herein.

In this embodiment, as can be seen in FIG. 33c, the projection of the first winding 21 crosses with that of the second winding 22. For example, the projections on the top view by the fourth portion 214 of the first winding 21 and the fifth portion 225 of the second winding 22 intersect cross with each other, so do the fourth portion 224 of the second winding 22 and the fifth portion 215 of the first winding 21. By configuring the first winding 21 and the second winding 22 to intersect at their projections, vertical dimension is reduced, the need for insulation between the windings is also eliminated. Meanwhile, due to the intersection between the windings, the leakage inductance is further reduced, while the coupling is enhanced, allowing the coupled inductor to create an even smaller dynamic inductance, thereby improving the dynamic performance of the power supply module.

Figure 34A:
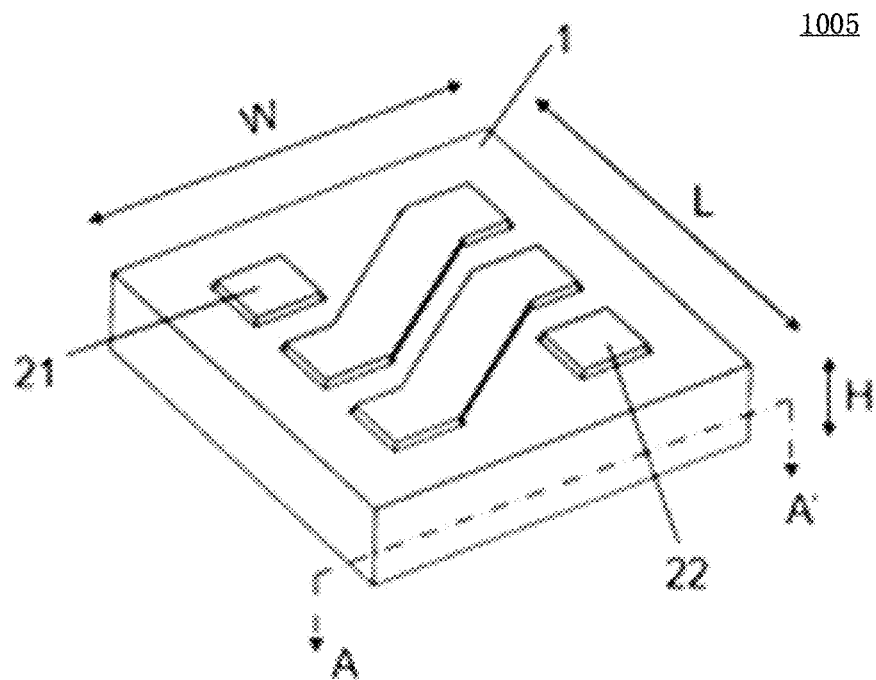
FIG. 34a is a schematic structural view of another coupled inductor according to an embodiment of the present disclosure.
Figure 34B:
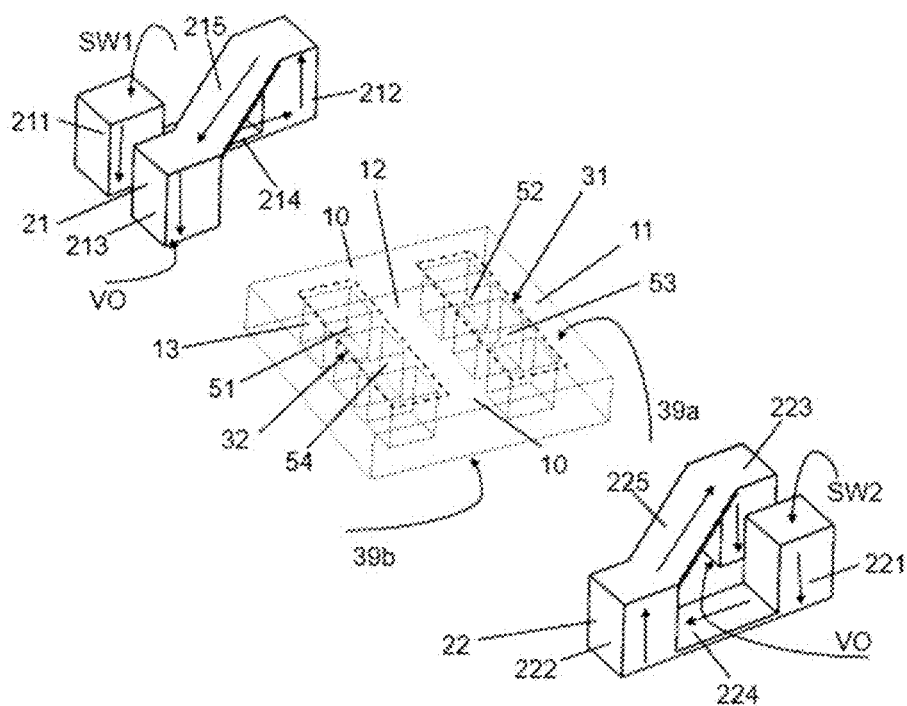
Figure 34C:
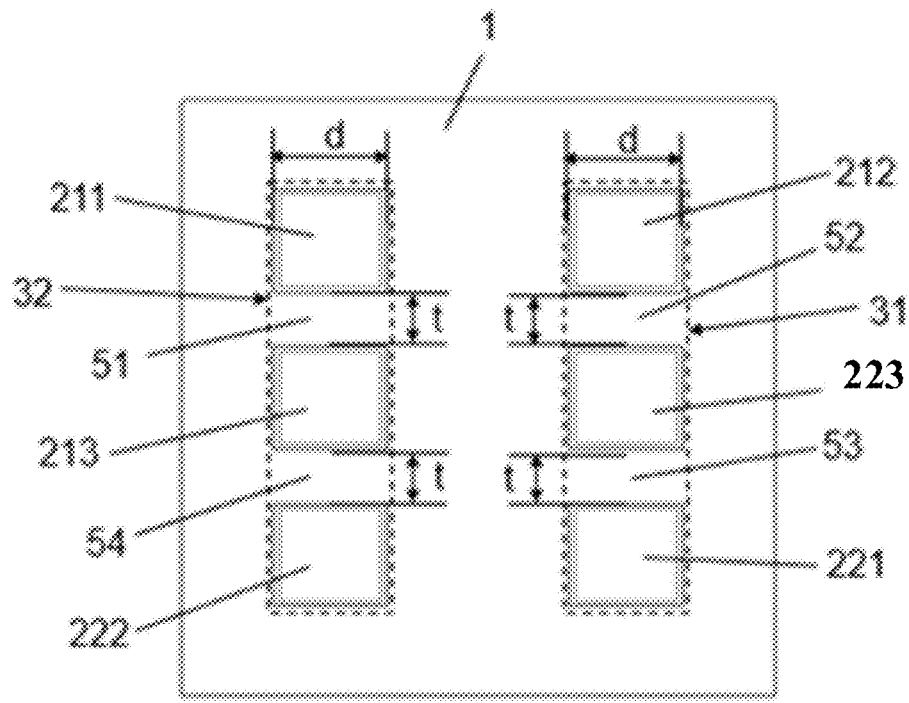

FIG. 34a illustrates an illustrative structure of another coupled inductor, FIG. 34b is an exploded view of the inversely coupled inductor in FIG. 34a, and FIG. 34c is a top view along location A-A' of FIG. 34a. As shown in FIG. 34a to FIG. 34c, the coupled inductor of this embodiment differs from the coupled inductor 1005 in FIG. 32a in that: in the first passage 31 of the magnetic core 1, a magnetic material 52 is filled between the second portion 212 of the first winding 21 and the third portion 223 of the second winding 22, and a magnetic material 53 is filled between the third portion 223 of the second winding 22 and the first portion 221 of the second winding 22. For the same reason, in the second passage 32 of the magnetic core 1, a magnetic material 51 is filled between the first portion 211 of the first winding 21 and the third portion 213 of the first winding 21, and a magnetic material 54 is filled between the third portion 213 of the first winding 21 and the second portion 222 of the second winding 22. It should be understood that the relative permeability of the magnetic materials 51, 52, 53 and 54 may be the same as or less than that of the magnetic material(s) of the magnetic core 1.

The magnetic flux distribution of this embodiment is the same as that of the coupled inductor in FIG. 32a, hence the leakage inductance may also be adjusted in the same way as shown in FIG. 34c, i.e., by adjusting the width d of the first passage 31 or the second passage 32, or the spacing t between the windings in the passage. Of course, the leakage inductance may also be adjusted by adjusting the relative permeability of the magnetic materials 51, 52, 53 and 54 in the first passage 31 and the second passage 32. This embodiment provides a more flexible adjustment for the leakage inductance that better fulfills the demand for variety in the leakage inductance.

Figure 35A:
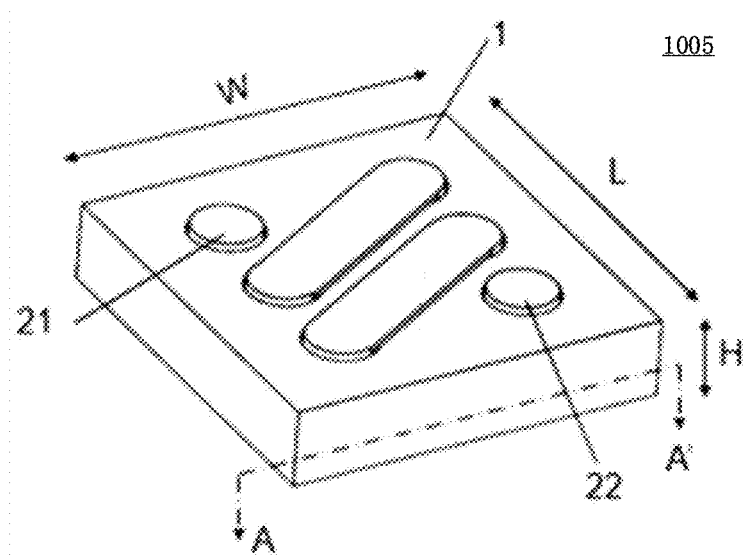
FIG. 35a is a schematic structural view of another coupled inductor according to an embodiment of the present disclosure.
Figure 35B:
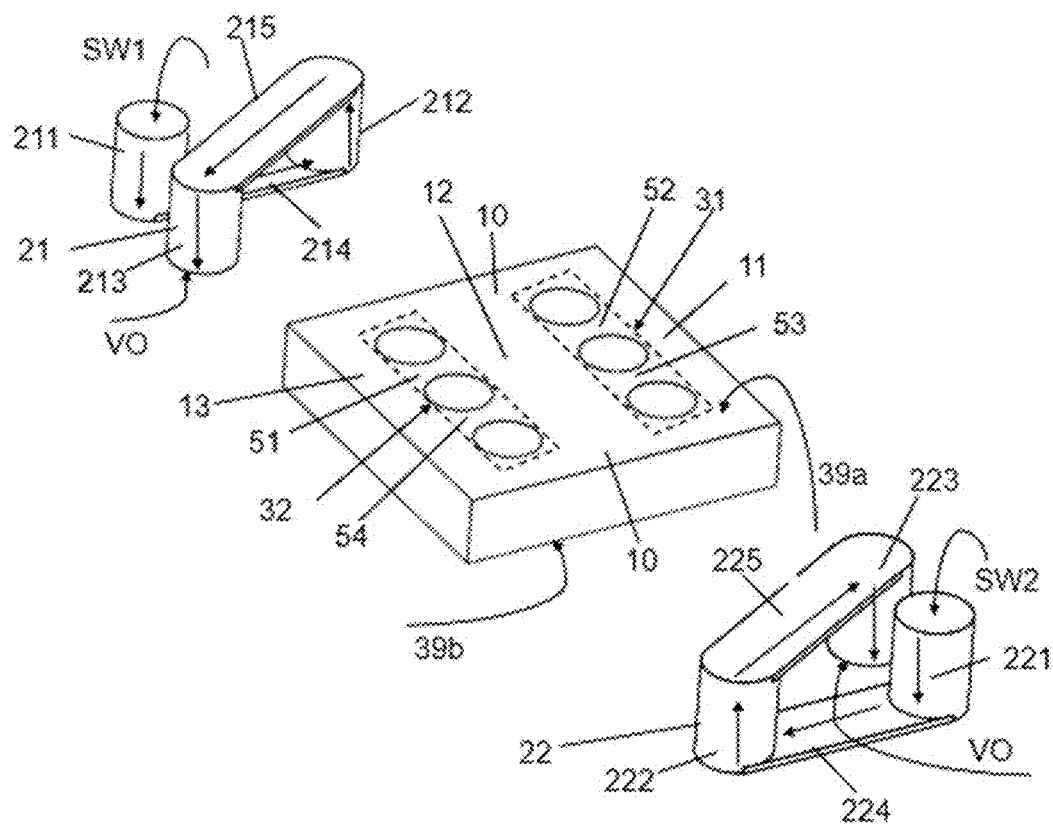
Figure 35C:
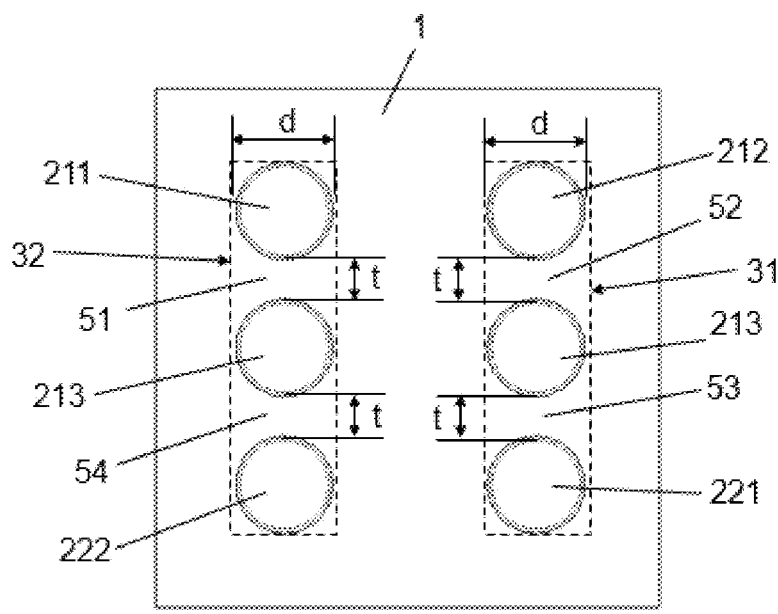

FIG. 35a illustrates an illustrative structure of still another coupled inductor, FIG. 35b is an exploded view of the coupled inductor in FIG. 35a, and FIG. 35c is a top view along location A-A' of FIG. 35a. As shown in FIGS. 35a to 35c, the coupled inductor of this embodiment differs from the coupled inductor in FIG. 34a in that: the portions of the first winding 21 and the second winding 22 located in the passages 31 and 32 are formed as cylinders, i.e., the first portion 211, second portion 212 and third portion 213 of the first winding and the first portion 221, second portion 222 and third portion 223 of the second winding are formed as cylinders.

According to the coupled inductor of this embodiment, the portions of the windings 21 and 22 in the passages 31 and 32 are cylinders instead of rectangular prisms, allowing for more magnetic materials to be filled into the passages 31 and 32, thereby increasing the bulk of the magnetic materials to reduce the loss of the magnetic core. Thus, the overall loss of the coupled inductor can be reduced without altering the DC impedance of the winding. Assuming the inductance remains unchanged, the systematic loss can be reduced, thereby improving the efficiency.

Similarly, the coupled inductor of this embodiment has the same distribution of magnetic flux and the manner for adjusting the leakage inductance as the coupled inductor in FIG. 34a.

Figure 36A:
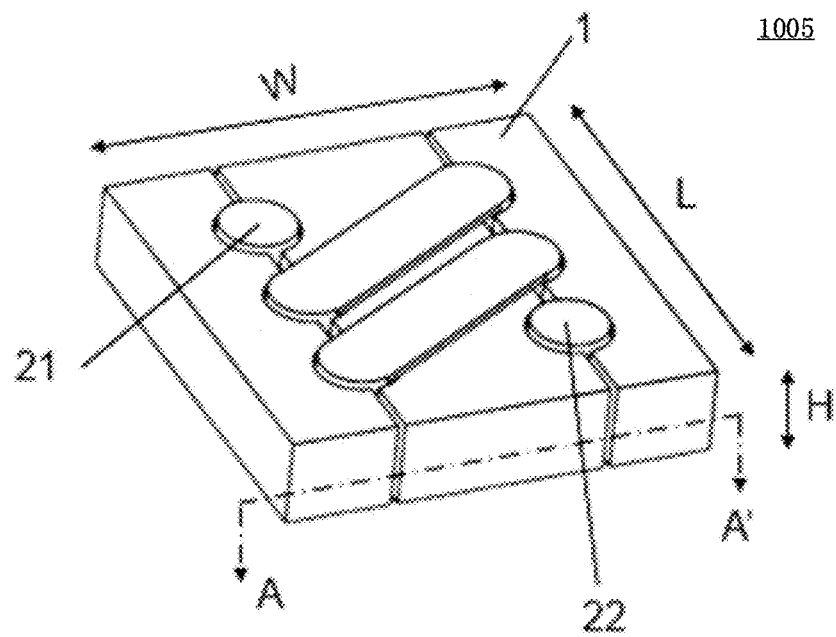
FIG. 36a is a schematic structural view of another coupled inductor according to an embodiment of the present disclosure.
Figure 36B:
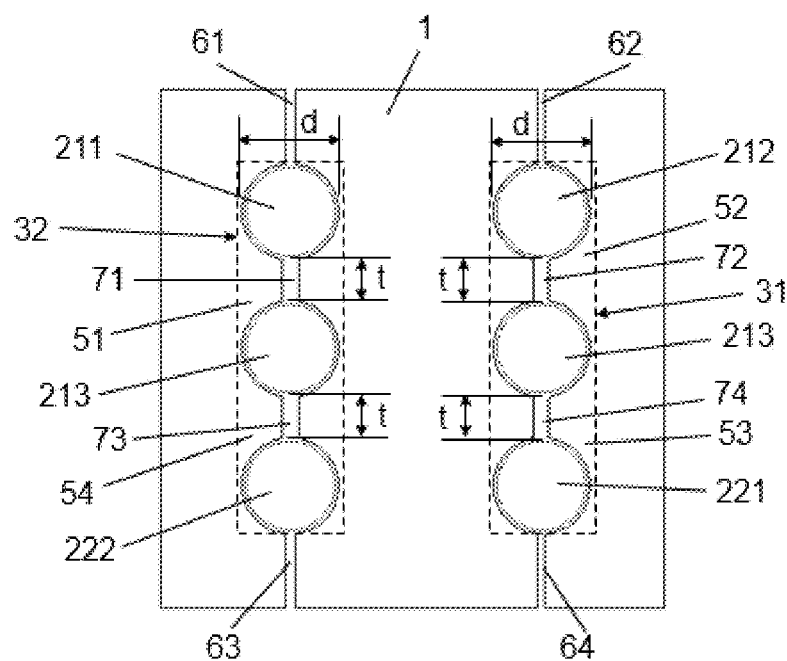

FIG. 36a illustrates an illustrative structure of another coupled inductor, and FIG. 36b is a sectional view along location A-A' of FIG. 36a. As shown in FIG. 36a and FIG. 36b, the coupled inductor of this embodiment differs from the coupled inductor in FIG. 35a in that: the coupled inductor of this embodiment is provided on the two side legs 10 of the magnetic core 1 with four air gaps 61, 62, 63 and 64; the magnetic materials 52 and 53 filled in the first passage 31 are provided with air gaps 72 and 74, and the magnetic materials 51 and 54 filled in the second passage 32 are provided with air gaps 71 and 73, where the magnetic materials 51-54 have high relative magnetic permeability of over 200, and may be of, e.g., ferrite. With the magnetic materials with high magnetic permeability, the leakage inductance and the coupling have a wider range of adjustment, enabling the coupled inductor to be applied in a wider frequency range. Meanwhile, since the air gaps are configured as such, the coupled inductor can also have improved saturation current properties.

The magnetic flux distribution of the coupled inductor in this embodiment is the same as that of the coupled inductor in FIG. 32a. The air gaps 61, 62, 63 and 64 on the side legs are used for adjusting the main magnetic fluxes, i.e., for adjusting the magnitude of the self-inductance. The air gaps 71, 72, 73 and 74 in the passages are used for adjusting the leakage magnetic fluxes, i.e., for adjusting the magnitude of the leakage inductance. By combining the usage of the air gaps 61 to 64 and 71 to 74, the leakage inductance and the coupling can be flexibly adjusted.

It should be noted that the magnetic materials with high magnetic permeability are not suitable for integral forming processes, and hence the inversely coupled inductor of this embodiment is adapted to assembling process. Moreover, the presence of the air gaps means the magnetic core may be split into three, which is also convenient in the assembling work.

Figure 37A:
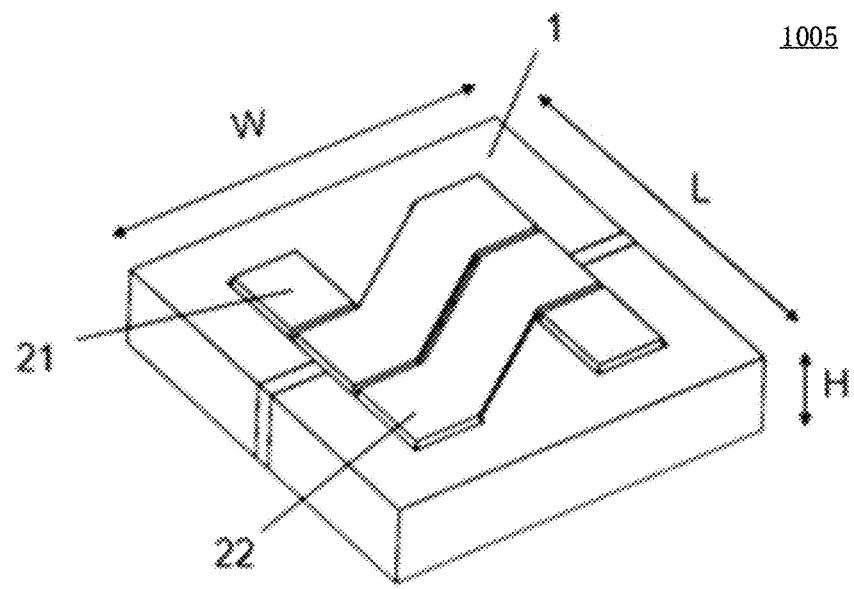
FIG. 37a is a schematic structural view of another coupled inductor according to an embodiment of the present disclosure.
Figure 37B:
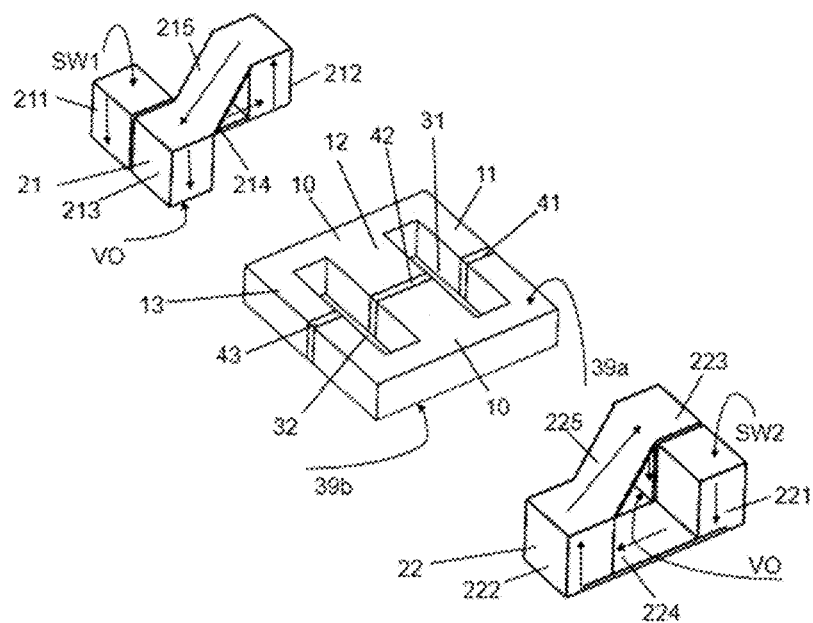
Figure 37C:
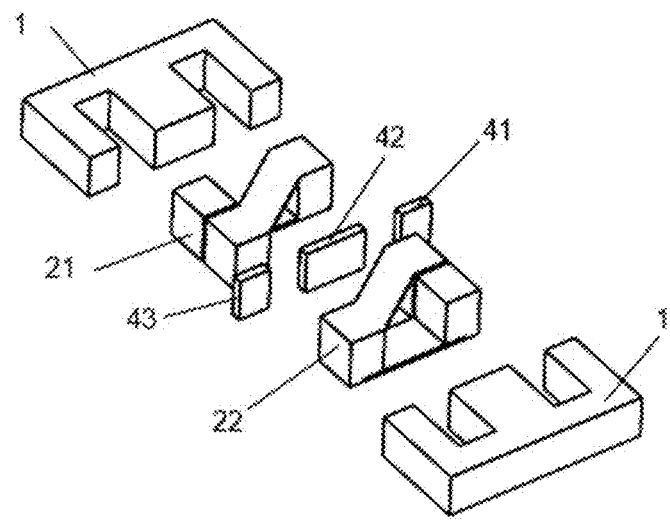

FIG. 37a illustrates an illustrative structure of another coupled inductor, FIG. 37b is an exploded view of the coupled inductor in FIG. 37a, and FIG. 37c is a schematic assembling diagram for the coupled inductor in FIG. 37a. As shown in FIG. 37a to FIG. 37c, the coupled inductor of this embodiment differs from the coupled inductor 1005 in FIG. 32a in that: the coupled inductor of this embodiment is provided with three air gaps 41, 42 and 43 on the three pillars 11, 12 and 13 of the magnetic core 1; meanwhile, the magnetic core 1 is made from a magnetic material having high relative magnetic permeability of over 200, e.g., ferrite. In this embodiment, the air gaps 41 and 43 have to be provided, while the air gap 42 may or may not be provided.

As shown in FIG. 37c, the magnetic core 1 is divided by the air gaps 41, 42 and 43 into two "E"-type magnetic cores. The windings 21 and 22 are pre-fabricated into the shape as shown in FIG. 37c, and are pre-sleeved over the "E"-type magnetic cores. Then, the two "E"-type magnetic cores are combined with each other, with a proper control of the size of the air gaps, accomplishing the assembling.

In this embodiment, the coupled inductor has the same magnetic flux distribution as that of the coupled inductor in FIG. 32a. In this embodiment, the leakage inductance is adjusted by means including adjusting the spacing t between the windings in the passage, adjusting the width d of the passages. The air gaps 41, 42 and 43 may also be used in adjusting the leakage inductance and the self-inductance.

The coupled inductor of this embodiment has a simple structure as well as fabrication process, with flexibility in the adjustment, facilitating mass production.

Figure 38A:
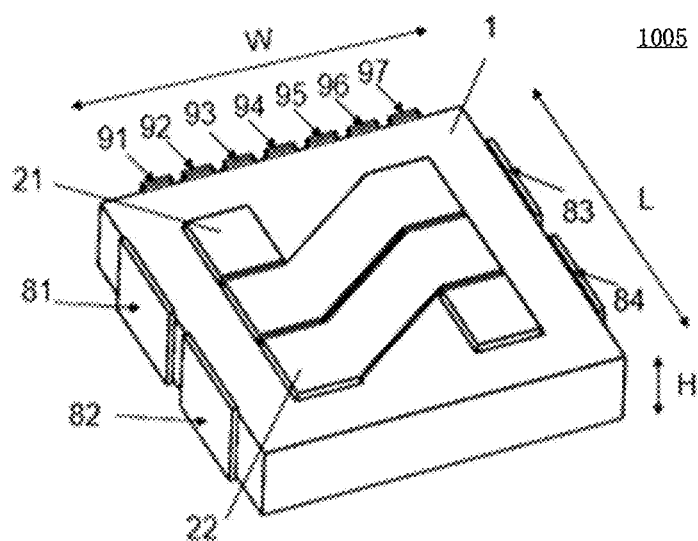
FIG. 38a is a schematic structural view of another coupled inductor according to an embodiment of the present disclosure.
Figure 38B:
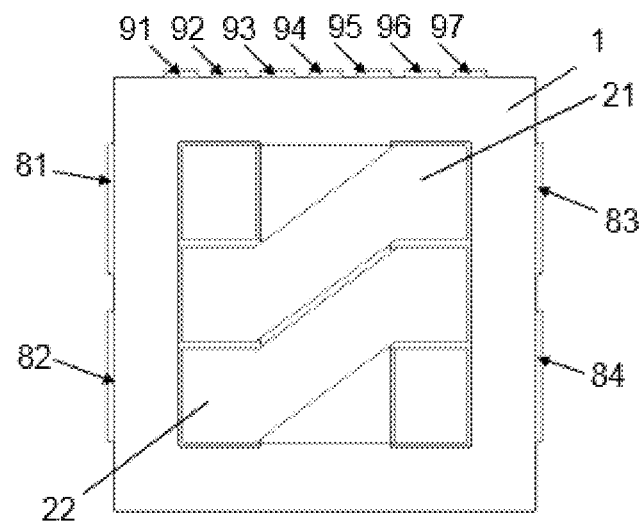

FIG. 38a illustrates an illustrative structure of another coupled inductor, and FIG. 38b is a top view of the coupled inductor shown in FIG. 38a. As shown in FIG. 38a and FIG. 38b, the coupled inductor of this embodiment differs from the inversely coupled inductor 1005 in FIG. 32a in that: the coupled inductor of this embodiment also serves as a carrier plate in addition to including the function of an inductor.

Reference is made to FIG. 31b, in order to realize electrical connection in that power supply module, a carrier plate or a part similar to a carrier plate (not shown in FIG. 31b) is needed between the coupled inductor and the packaged chip module (or IPM module), as well as between the inductor and the main board, for creating a connection. The carrier plate functions to connect the input on the main board to the IPM module, connect the IPM module to the SW pin of the winding of the coupled inductor, and connect the Vo pins of the inductor to the main board. Meanwhile, the carrier plate also includes connections for signal lines. As can be seen by putting FIG. 38a together with FIG. 38b, the magnetic core 1, first winding 21, second winding 22 are same as those of the coupled inductor in FIG. 32a, except that this embodiments further includes connections for connecting Pins 81, 82, 83 and 84, etc., which are used for power lines, e.g., input voltage, output voltage, GND, etc. Additionally, connections are further included for connecting Pins 91, 92, 93, 94, 95, 96, 97, etc., which are used for signal lines. The power Pin and the signal Pin may be adjusted as needed by those skilled in terms of dimensions, quantities and configurations, which are not limited to the cases shown in FIG. 38a and FIG. 38b.

In this embodiment, the features of the coupled inductor itself are no different from the coupled inductor in FIG. 32a. However, since the connection Pins are integrated into the inversely coupled inductor of this embodiment, the space surrounding the inductor, which had been conserved for making connections, can be utilized to expand the size of the inductor, i.e., to expand the size of the inductor magnetic core and windings, thereby reducing the loss for the inductor. Meanwhile, after the connection Pins have been integrated into the inductor, the fabricating process of the modular power can become simpler, effectively lowering the cost.

Figure 39A:
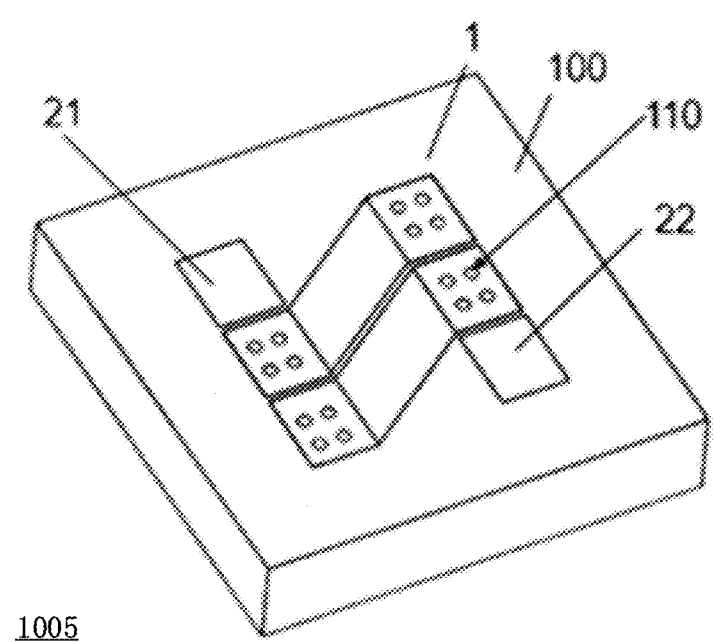
FIG. 39a is a schematic structural view of another coupled inductor according to an embodiment of the present disclosure.
Figure 39B:
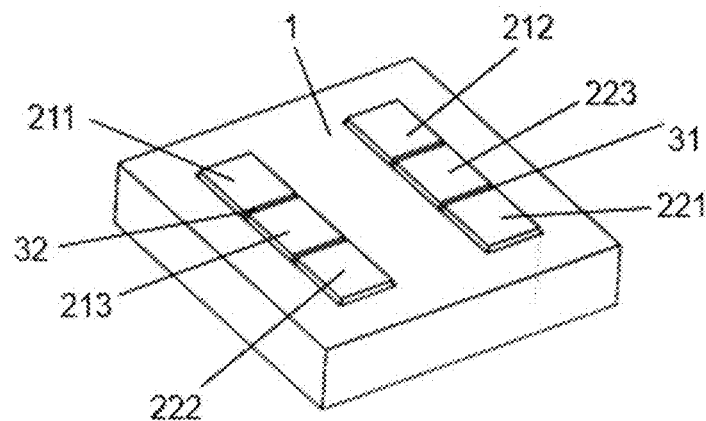
Figure 39C:
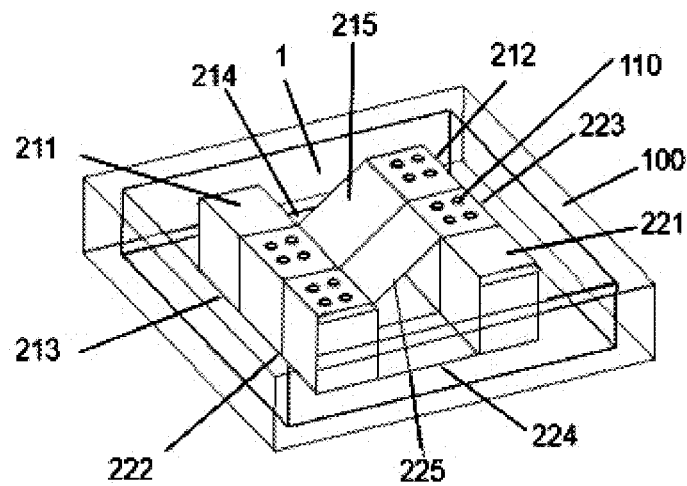

FIG. 39a illustrates an illustrative structure of another coupled inductor, FIG. 39b is a perspective view of the magnetic core and part of the windings of the coupled inductor in FIG. 39a, and FIG. 39c is a perspective view for the coupled inductor shown in FIG. 39a. As shown in FIG. 39a to FIG. 39c, the coupled inductor of this embodiment differs from the coupled inductor in FIG. 32a in that: the winding of the coupled inductor of this embodiment is fabricated using a method different from that of the coupled inductor in FIG. 32a. Specifically, the windings in this embodiment are fabricated using a printed circuit board printing process (PCB trace).

As shown in FIG. 39a and FIG. 39c, where 100 indicates a PCB substrate, the magnetic core 1, first portion 211 of the first winding 21, second portion 212 of the first winding 21, third portion 213 of the first winding 21, first portion 221 of the second winding 22, second portion 222 of the second winding 22, and third portion 223 of the second winding 22 as shown in FIG. 39b are embedded within the PCB substrate 100. Then, with the PCB process, PCB traces are fabricated as the fourth portion 214 and fifth portion 215 of the first winding, and the fourth portion 224 and fifth portion 225 of the second winding. Then, a PCB printing process is used to fabricate, e.g., the via-hole 110, etc., in FIG. 39c, so as to use the via-hole 110, etc., to join various parts of the windings, making the windings in this embodiment to have the same winding structure in FIG. 32a.

By using the PCB printing process in this embodiment to fabricate the coupled inductor, the operation can be simple, and the PCB substrate can, in addition to embedding the coupled inductor, contain the power Pins and signal Pins, which are needed in the power supply module of FIG. 31, in the form of via-holes provided in the PCB substrate. In addition, as long as the current density falls within the requirement, the first portion 211, second portion 212 and third portion 213 of the first winding 21 and the first portion 221, second portion 222 and third portion 223 of the second winding 22 may all be substituted by via-holes in the PCB. That is, all that is needed is to bury within the PCB the magnetic core 1 having the first passage 31 and the second passage 32, and various portions of the first winding 21 and the second winding 22 can be implemented using the PCB printing process. Of course, the coupled inductors in FIG. 34a and FIG. 35a may also be embedded within the PCB. For example, a magnetic core 1 without any passage may be embedded within the PCB substrate 100, and when the PCB printing process is used to fabricate the first portion 211 to third portion 213 of the first winding 21 and the first portion 221 to third portion 223 of the second winding 22, one may simply create holes on the magnetic core 1 and then fabricate the via-holes as the windings.

Other features of the coupled inductor of this embodiment are same as those of the coupled inductor 1005 of FIG. 32a, which will not be repeated herein.

Figure 40A:
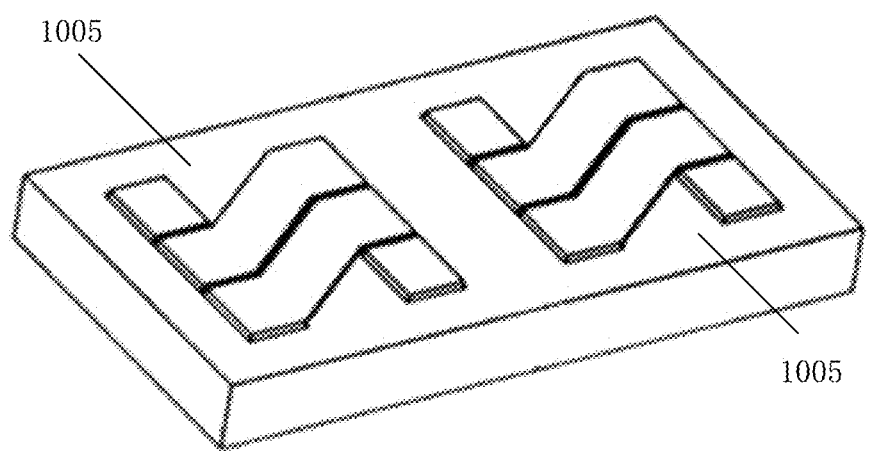
FIG. 40a is a schematic structural view of a four-phase coupled inductor according to an embodiment of the present disclosure.
Figure 40B:
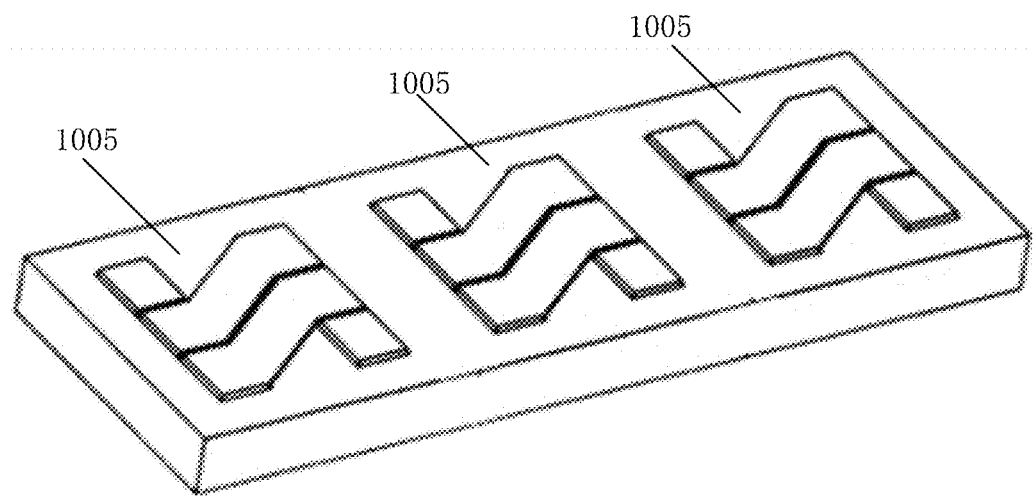
FIG. 40b is a schematic structural view of a six-phase coupled inductor according to an embodiment of the present disclosure.
Figure 40C:
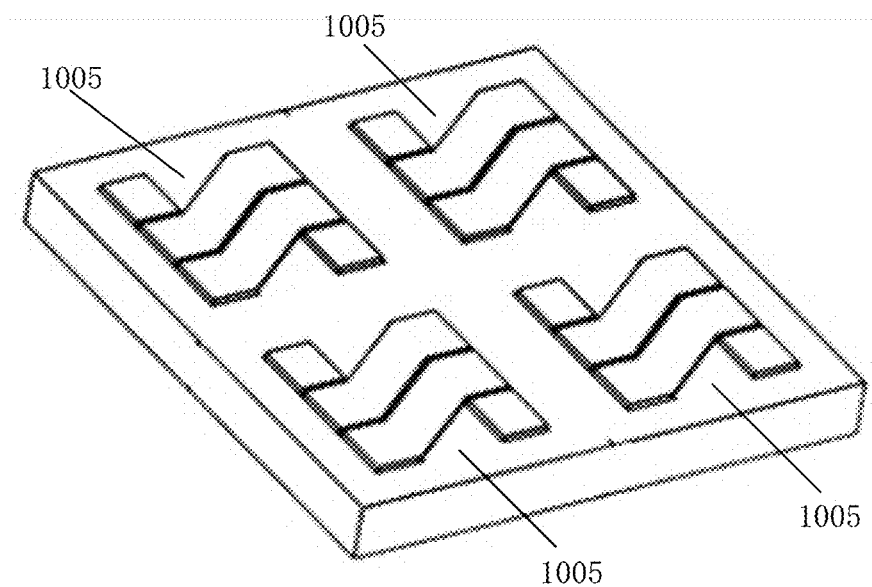
FIG. 40c is a schematic structural view of an eight-phase coupled inductor according to an embodiment of the present disclosure.

FIG. 40a illustrates a four-phase coupled inductor created by combining two coupled inductors 1005 of FIG. 32a. There is no coupling or very weak coupling between the two coupled inductors 1005. Similarly, FIG. 40b illustrates a six-phase coupled inductor created by combining three coupled inductors 1005 of FIG. 32a. Of course, there is no coupling or very weak coupling among the three coupled inductors 1005. FIG. 40c illustrates an eight-phase coupled inductor created by combining four coupled inductors 1005 of FIG. 32a. Still, there is no coupling or very weak coupling among the four coupled inductors 1005. It can be appreciated that the coupled inductors of any of the foregoing embodiments may be combined into a multi-phase coupled inductor. A multi-phase coupled inductor may be joined with an integrated multi-phase power chip module to form a multi-phase power supply module to provide higher power output. Compared with discrete two-phase power supply modules, a multi-phase integrated power supply module can further conserve space on the main board.

Power density is also increased.

Finally, it should be noted that the foregoing embodiments are merely intended for describing, rather than limiting, the technical solutions of the present disclosure. Although the present disclosure has been described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present disclosure.

What is claimed is:

1. A coupled inductor, comprising: a magnetic core, a first winding and a second winding, wherein:
a first passage and a second passage, which extend along a first direction, are formed in the magnetic core; the magnetic core comprises a first end face and a second end face, which are oppositely arranged; the second passage is arranged in parallel with the first passage, and both the first passage and the second passage extend from the first end face to the second end face;
each of the first winding and the second winding has a portion penetrating the first passage and a portion penetrating the second passage, wherein the first winding runs through the first passage for N times while the second winding runs through the first passage for N+1 times, and the second winding runs through the second passage for N times while the first winding runs through the second passage for N+1 times, wherein N is an integer greater than or equal to one;
two terminals of the first winding are provided on the first end face and the second end face, respectively, forming a first terminal and a second terminal of the coupled inductor; two terminals of the second winding are provided on the first end face and the second end face, respectively, forming a third terminal and a fourth terminal of the coupled inductor, wherein one of the first terminal and the third terminal of the coupled inductor is a dotted terminal, while the other one is a non-dotted terminal, and the first terminal and the third terminal are both provided on the first end face.

2. The coupled inductor according to claim 1, wherein the first terminal to the fourth terminal of the coupled inductor comprise a first pad to a fourth pad for electrical connections.

3. The coupled inductor according to claim 1, wherein the first direction is a height direction.

4. The coupled inductor according to claim 1, wherein the magnetic core is a flat type magnetic core.

5. The coupled inductor according to claim 1, wherein the portion of the first winding located in the first passage and the portion of the second winding located in the first passage are provided alternatively with each other, and the portion of the first winding located in the second passage and the portion of the second winding located in the second passage are provided alternatively with each other.

6. The coupled inductor according to claim 1, wherein the first winding further comprises a connecting portion for connecting the portions of the first winding that penetrate the first passage and the second passage, and the second winding further comprises a connecting portion for connecting the portions of the second winding that penetrate the first passage and the second passage.

7. The coupled inductor according to claim 6, wherein the connecting portion of the first winding is located on the same side of the first end face or the second end face of the magnetic core and is exposed to air, and the connecting portion of the second winding is located on the same side of the first end face or the second end face of the magnetic core and is exposed to air.

8. The coupled inductor according to claim 6, wherein the connecting portions of the first winding and the second winding which are located on the same side of the first end face are arranged in parallel, and the connecting portions of the first winding and the second winding which are located on the same side of the second end face are arranged in parallel.

9. The coupled inductor according to claim 6, wherein the connecting portion of the first winding on the same side of the first end face crosses with the connecting portion of the second winding on the same side of the second end face, and the connecting portion of the first winding on the same side of the second end face crosses with the connecting portion of the second winding on the same side of the first end face.

10. The coupled inductor according to claim 6, wherein the first passage and the second passage are both filled with a magnetic material which dads the portions of the first winding and the second winding that are located in the first passage and the second passage.

11. The coupled inductor according to claim 6, wherein the portions of the first winding and the second winding that are located in the first passage and the second passage are both formed as cylinders.

12. The coupled inductor according to claim 1, wherein the magnetic core is a dust type magnetic core having a relative permeability of less than 200 and distributed air gaps.

13. The coupled inductor according to claim 6, wherein the magnetic core comprises two side legs which are oppositely arranged, and at least three pillars arranged between the two side legs, and the first passage and the second passage are defined by the adjacent pillars and the two side legs.

14. The coupled inductor according to claim 13, wherein air gaps are formed in both of the two side legs to communicate with the first passage and the second passage.

15. The coupled inductor according to claim 14, wherein the first passage and the second passage are both filled with a magnetic material, and the air gaps run through the magnetic material.

16. The coupled inductor according to claim 13, wherein an air gap is formed in two pillars which are separated by one pillar, respectively, to communicate with the first passage and the second passage.

17. The coupled inductor according to claim 16, wherein an air gap is formed in the pillar separating the two pillars, and the air gap communicating at two ends with the first passage and the second passage, respectively.

18. The coupled inductor according to claim 17, wherein one of the side legs and a portion of the three pillars are integrally formed into an "E" shaped magnetic core.

19. The coupled inductor according to claim 13, wherein the magnetic core is a ferrite type magnetic core having a relative permeability of more than 200.

20. The coupled inductor according to claim 6, wherein an outer surface of the magnetic core is provided with a pin for electrical connection.

* * * * *